(12) United States Patent
Kimura

(10) Patent No.: US 10,531,040 B2
(45) Date of Patent: Jan. 7, 2020

(54) INFORMATION PROCESSING DEVICE AND INFORMATION PROCESSING METHOD TO IMPROVE IMAGE QUALITY ON A LARGE SCREEN

(71) Applicant: SONY CORPORATION, Tokyo (JP)

(72) Inventor: Seiji Kimura, Chiba (JP)

(73) Assignee: SONY CORPORATION, Tokyo (JP)

( * ) Notice: Subject to any disclaimer, the term of this patent is extended or adjusted under 35 U.S.C. 154(b) by 17 days.

(21) Appl. No.: 15/560,173

(22) PCT Filed: Feb. 3, 2016

(86) PCT No.: PCT/JP2016/053140
§ 371 (c)(1),
(2) Date: Sep. 21, 2017

(87) PCT Pub. No.: WO2016/158001
PCT Pub. Date: Oct. 6, 2016

(65) Prior Publication Data
US 2018/0115745 A1    Apr. 26, 2018

(30) Foreign Application Priority Data

Mar. 30, 2015  (JP) ................................ 2015-068691

(51) Int. Cl.
*G06K 9/00* (2006.01)
*H04N 7/14* (2006.01)
(Continued)

(52) U.S. Cl.
CPC ......... *H04N 7/147* (2013.01); *G06K 9/00771* (2013.01); *G09G 5/00* (2013.01);
(Continued)

(58) Field of Classification Search
CPC ....................................................... G09G 5/02
See application file for complete search history.

(56) References Cited

U.S. PATENT DOCUMENTS 9,298,980 B1 *  3/2016  Yuan ................. G06K 9/00456
2010/0110069 A1 *  5/2010  Yuan ....................... G06T 15/20
345/419
(Continued)

FOREIGN PATENT DOCUMENTS

CN       102077585 A       5/2011
JP    2007-259149 A      10/2007
(Continued)

OTHER PUBLICATIONS

Hashimoto, et al., "Wide View-Angle Image Projection with Convex Mirrors for Everyday Surfaces", 2010, vol. 64, No. 4, pp. 594-601.

(Continued)

*Primary Examiner* — Oneal R Mistry
(74) *Attorney, Agent, or Firm* — Chip Law Group

(57) ABSTRACT

An information processing device including: a quality analyzer that generates video viewing quality information indicating a favorability degree of a video viewing condition of a viewer; a gaze target region information generation unit that generates gaze target region information indicating a gaze target region to be gazed at by the viewer in a video to be viewed; and a quality improvement processing unit that improves viewing quality of the gaze target region based on the video viewing quality information.

20 Claims, 50 Drawing Sheets

(51) Int. Cl.
| | |
|---|---|
| G09G 5/00 | (2006.01) |
| G09G 5/02 | (2006.01) |
| H04N 5/66 | (2006.01) |
| H04N 21/422 | (2011.01) |
| G09G 5/14 | (2006.01) |
| H04N 21/4402 | (2011.01) |
| H04N 21/442 | (2011.01) |
| H04N 7/01 | (2006.01) |
| G11B 20/10 | (2006.01) |
| H04N 5/14 | (2006.01) |

(52) U.S. Cl.
CPC ............. *G09G 5/02* (2013.01); *G09G 5/026* (2013.01); *G09G 5/14* (2013.01); *H04N 5/66* (2013.01); *H04N 7/0117* (2013.01); *H04N 21/42202* (2013.01); *H04N 21/4402* (2013.01); *H04N 21/44218* (2013.01); *G09G 2340/10* (2013.01); *G09G 2340/12* (2013.01); *G09G 2340/125* (2013.01); *G11B 2020/10537* (2013.01); *H04N 5/144* (2013.01)

(56) References Cited

U.S. PATENT DOCUMENTS

| | | | |
|---|---|---|---|
| 2011/0081132 A1 | 4/2011 | Iwata et al. | |
| 2012/0134543 A1* | 5/2012 | Fedorovskaya | H04N 13/0033 382/107 |
| 2012/0207357 A1* | 8/2012 | Bedros | G06K 9/00597 382/117 |
| 2013/0108175 A1* | 5/2013 | Ptucha | G06T 11/60 382/199 |
| 2014/0152792 A1* | 6/2014 | Krueger | A61M 21/00 348/78 |
| 2014/0363043 A1 | 12/2014 | Bernal et al. | |
| 2016/0342206 A1* | 11/2016 | Shazly | A61B 5/1114 |
| 2018/0115745 A1* | 4/2018 | Kimura | G09G 5/00 |

FOREIGN PATENT DOCUMENTS

| | | |
|---|---|---|
| JP | 2010-050645 A | 3/2010 |
| JP | 2012-019387 A | 1/2012 |
| JP | 2012-063547 A | 3/2012 |
| JP | 2013-012181 A | 1/2013 |
| WO | 2010/109900 A1 | 9/2010 |

OTHER PUBLICATIONS

Honda, et al., "Real-time Reconstruction of Pseudo Wide-angle Images Using an Approximating Depth Model", The Institute of Image Information and Television Engineers, 2008, vol. 62, No. 4, pp. 550-557.

International Search Report and Written Opinion of PCT Application No. PCT/JP2016/053140, dated Apr. 26, 2016, 18 pages of ISRWO.

Hashimoto, et al., "Wide View-Angle Image Projection with Convex Mirrors for Everyday Surfaces" Journal of the Institute of Image Information and Television, vol. 64, No. 4, 2010, pp. 564-601.

Honda, et al., "Real-time Reconstruction of Pseudo Wide-angle Images using an Approximating Depth Model", The Institute of Image Information and Television Engineers, vol. 62, No. 4, 2008, pp. 550-557.

* cited by examiner

FIG. 37
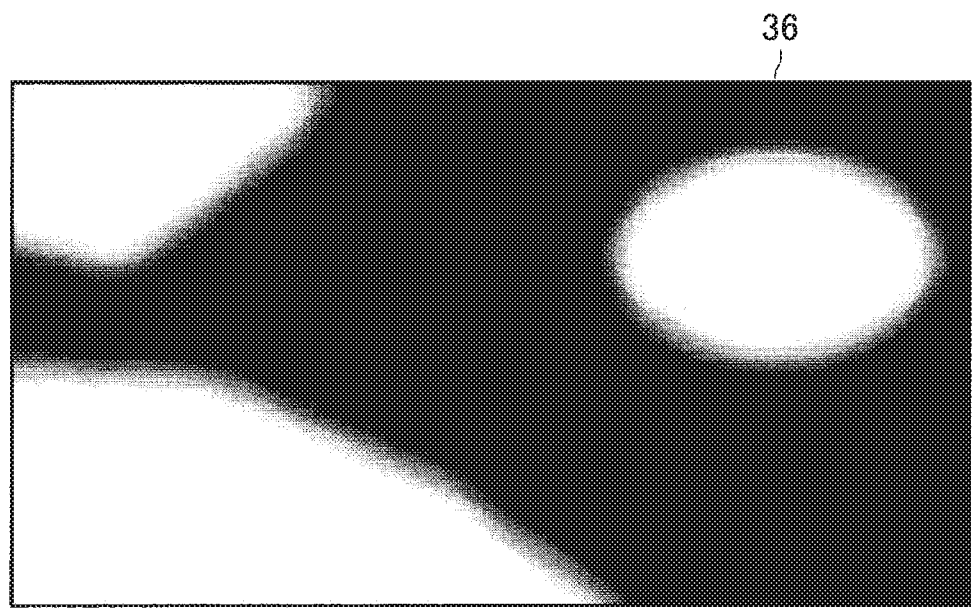
⟨VIDEO MOTION SICKNESS INDUCING DEGREE MAP⟩
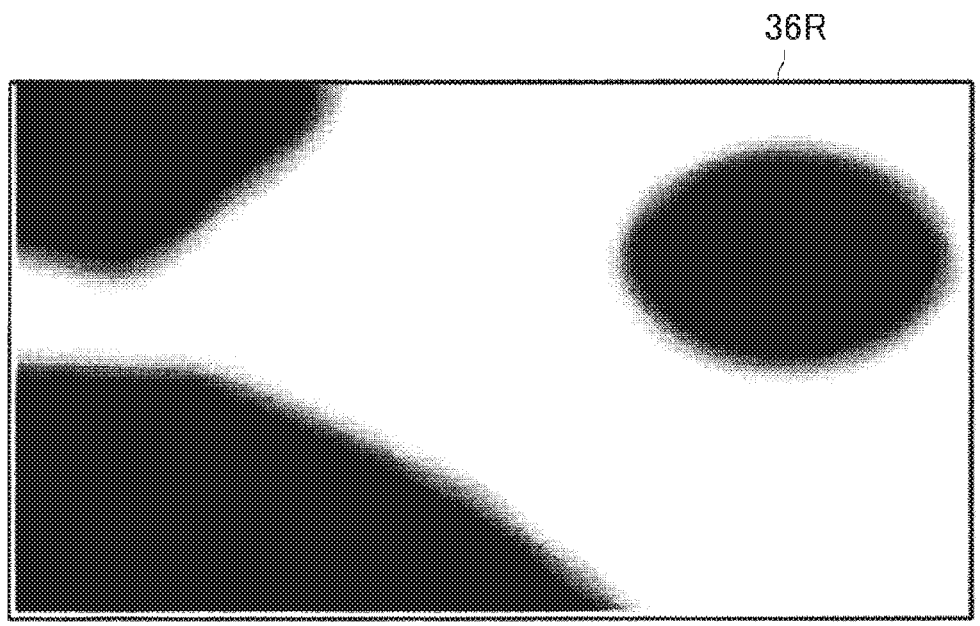
⟨REVERSAL OF VIDEO MOTION SICKNESS INDUCING DEGREE MAP⟩

INFORMATION PROCESSING DEVICE AND INFORMATION PROCESSING METHOD TO IMPROVE IMAGE QUALITY ON A LARGE SCREEN

CROSS REFERENCE TO RELATED APPLICATIONS

This application is a U.S. National Phase of International Patent Application No. PCT/JP2016/053140 filed on Feb. 3, 2016, which claims priority benefit of Japanese Patent Application No. JP 2015-068691 filed in the Japan Patent Office on Mar. 30, 2015. Each of the above-referenced applications is hereby incorporated herein by reference in its entirety.

TECHNICAL FIELD

The present disclosure relates to an information processing device, an information processing method, a program, and a recording medium.

BACKGROUND ART

Recently, occasions in which so-called wide-field videos, such as videos produced at wide angles of view (e.g., videos captured at wide angles, panoramic videos, whole-sky videos, entire-celestial-sphere videos, free view point videos, game content, and the like) or videos whose angles of view have been widened to be quasi-wide angles (externally inserted images and mosaic images), are viewed on wide screens at wide viewing angles are increasing. A viewer can view an area of a screen that he or she wants to see by scrolling to or zooming in on the area using a controller, for example, a mouse, a remote controller, or the like in an interactive manner. However, for example, when a plurality of viewers view a video 2 displayed on a large screen as illustrated in FIG. 55, and one (a viewer P1) of them operates a controller 4 to scroll or zoom in on the video, it is difficult for the other viewers (viewers P2 to P4) who are not operating the controller 4 to anticipate a motion of the video, which may cause video motion sickness.

With regard to this, for example, Patent Literature 1 discloses a technology for reducing video motion sickness of a viewer by displaying a video in which a motion displayed on a small screen of a controller is relatively suppressed on a large screen display when a view point is changed through an interactive operation. In addition, Patent Literature 2 discloses a technology for reducing video motion sickness by lowering quality of a whole video on the basis of motion information of the video.

Conversely, Non-Patent Literature 1, for example, discloses a system in which a projector projects a video on a plurality of planes to display the video in a mode in which a wide-field video is viewed at a wide viewing angle on a large screen. In addition, Non-Patent Literature 2 discloses a technology for converting a video which is practically captured at a narrow angle of view into a video with a quasi-wide angle of view using information of a motion or the like. If a video is displayed at a wide viewing angle on a large screen as described above, viewers can get a feeling of immersion from the video.

CITATION LIST

Patent Literature

Patent Literature 1: JP 2013-12181A
Patent Literature 1: JP 2010-50645A

Non-Patent Literature

Non-Patent Literature 1: "Development of indoor wide visual field projection system using convex mirror," Academic Journal of the Institute of Image Information and Television Engineers, Vol. 64 (2010), No. 4, p. 594-601
Non-Patent Literature 2: "Real-time generation of quasi-wide-field video using depth model," Academic Journal of the Institute of Image Information and Television Engineers; Image Information and Television Engineering 62(4), p. 550-557, Apr. 1, 2008

DISCLOSURE OF INVENTION

Technical Problem

However, although video motion sickness can be reduced in the situation illustrated in FIG. 55 according to the above-described Patent Literature 1, there is a possibility of a sensitivity of an operation such as switching a view point or zooming in being perceived as deteriorated in a large screen display. In addition, although video motion sickness is reduced by lowering quality of a whole video according to the above-described Patent Literature 2, there are also possibilities of visibility being worsened due to lowered image quality of an entire screen, which may cause a viewer to be frustrated.

Furthermore, it is assumed that, for example, a region Z0 that includes a motion that may cause video motion sickness of a video Z that includes a fast moving motion is enlarged and displayed as illustrated in FIG. 56 by a controller 4 being erroneously operated. If a viewer views a video Z1 obtained by enlarging the region (Z0) on a full screen through the operation, the viewer may suffer video motion sickness. According to the above-described Patent Literature 1 and Patent Literature 2, it is not possible to prevent such a region of a video, which may cause video motion sickness and may be erroneously displayed, from being displayed in advance.

In addition, if wide-field videos are projected by a projector using walls S1 to S5 of an indoor space V as screens as illustrated in FIG. 57 according to the technology of the above-described Patent Literature 1, for example, the projected videos may be excessively bright or may have lowered contrast. The reason for this is that such projection is affected by materials of planes (the walls S1 to S5 and pillars C1 and C2) and interreflection of the planes.

Furthermore, when a current video is converted to generate a video with a quasi-wide angle of view using the above-described Non-Patent Literature 2, the generated wide-angle video is constituted by an original video 6o and an externally inserted predictive video 6e that is generated by estimating the original video 6o as illustrated in FIG. 58. At this time, the externally inserted predictive video 6e is likely to include an artifact or an unnatural motion, and thus a lowered feeling of immersion of a viewer who is viewing the wide-angle video or video motion sickness that may be induced due to such a factor are also considered.

Therefore, the present disclosure proposes a novel and improved information processing device, information processing method, program, and recording medium which enable a wide-field video to be viewed comfortably with high image quality on a wide screen at a wide viewing angle.

Solution to Problem

According to the present disclosure, there is provided an information processing device including: a quality analyzer configured to generate video viewing quality information indicating a favorability degree of a video viewing condition of a viewer; a gaze target region information generation unit configured to generate gaze target region information indicating a gaze target region to be gazed at by the viewer in a video to be viewed; and a quality improvement processing unit configured to improve viewing quality of the gaze target region on the basis of the video viewing quality information.

Further, according to the present disclosure, there is provided an information processing method including: generating video viewing quality information indicating a favorability degree of a video viewing condition of a viewer; generating gaze target region information indicating a gaze target region to be gazed at by the viewer in a video to be viewed; and improving viewing quality of the gaze target region on the basis of the video viewing quality information.

Moreover, according to the present disclosure, there is provided a program causing a computer to function as an information processing device including a quality analyzer configured to generate video viewing quality information indicating a favorability degree of a video viewing condition of a viewer, a gaze target region information generation unit configured to generate gaze target region information indicating a gaze target region to be gazed at by the viewer in a video to be viewed, and a quality improvement processing unit configured to improve viewing quality of the gaze target region on the basis of the video viewing quality information.

Further, according to the present disclosure, there is provided a computer readable recording medium having a program recorded thereon, the program causing a computer to function as an information processing device which including a quality analyzer configured to generate video viewing quality information indicating a favorability degree of a video viewing condition of a viewer, a gaze target region information generation unit configured to generate gaze target region information indicating a gaze target region to be gazed at by the viewer in a video to be viewed, and a quality improvement processing unit configured to improve viewing quality of the gaze target region on the basis of the video viewing quality information.

Advantageous Effects of Invention

According to the present disclosure described above, a wide-field video can be viewed comfortably at high image quality on a large screen at a wide viewing angle. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 37 shows illustrative diagrams showing examples of a video motion sickness inducing degree map and a map obtained through a contrast reversal.

MODE(S) FOR CARRYING OUT THE INVENTION

Figure 1:
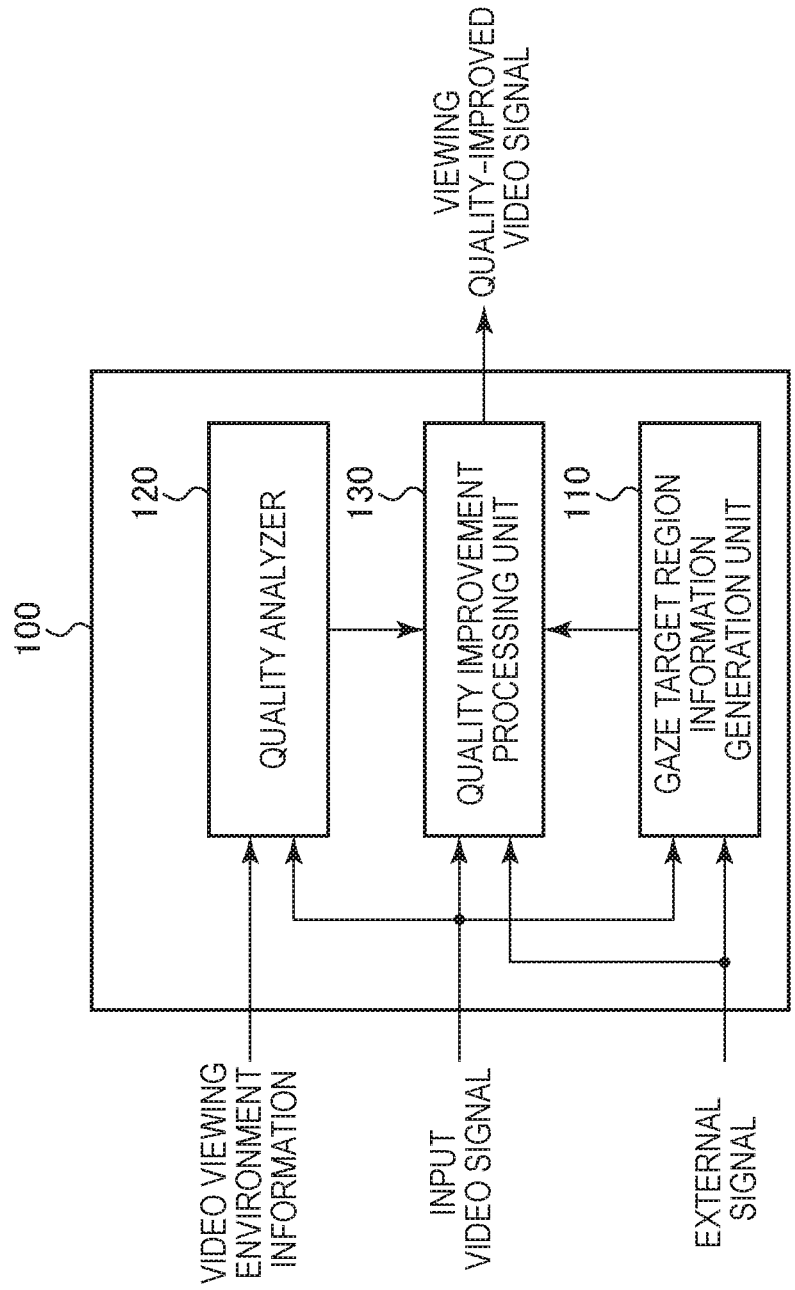
FIG. 1 is a functional block diagram showing a schematic configuration of an information processing device according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. First embodiment (display of quasi-wide angle video)
1.1. Schematic configuration of information processing device
1.2. Gaze target region information generation process
1.3. Video viewing quality analysis process
1.4. Video viewing quality improvement process
1.5. Conclusion
2. Second embodiment (display of wide visual field angle video)
2.1. Schematic configuration of information processing device
2.2. Gaze target region information generation process
2.3. Video viewing quality analysis process
2.4. Video viewing quality improvement processing unit
2.5. Conclusion 3. Third embodiment (display of wide visual field angle video: video motion sickness alarm information)
3.1. Schematic configuration of information processing device
3.3. Video viewing quality analysis process
3.3. Gaze target region information generation process
3.4. Video viewing quality improvement process
3.5. Conclusion
4. Fourth embodiment (display of quasi-wide angle video with using projection of projector)
4.1. Schematic configuration of information processing device
4.2. Gaze target region information generation process
4.3. Video viewing quality analysis process
4.4. Video viewing quality improvement process
4.5. Conclusion
5. Final conclusion
6. Hardware configuration The present disclosure relates to an information processing device which provides a wide-field video such as a video produced at a wide angle of view (a panoramic video, a whole-sky video, an entire-celestial-sphere video, a free view point video, game content, and the like), and a video whose angle of view is widened to be a quasi-wide angle (an externally inserted image and a mosaic image). When a wide-field video is viewed on a wide screen at a wide viewing angle, such an information processing device first analyzes a situation in which image quality may deteriorate or video motion sickness may occur and which is affected by a display environment in which the video is displayed and a video signal, and acquires video viewing quality. Then, the information processing device performs video signal processing on the basis of information of a region of the video to be gazed at by a viewer so that the analyzed viewing quality is improved. Accordingly, the video can be comfortably viewed at high quality when viewed on a wide screen at a wide viewing angle.

Information processing devices according to embodiments and image signal processing performed thereby will be described below in detail.

<1. First Embodiment>

First, an information processing device according to a first embodiment of the present disclosure and image signal processing performed thereby will be described with reference to FIGS. 1 to 23. In the present embodiment, a case in which a video with a quasi-wide angle, which is constituted by an original video and an externally inserted predictive video displayed around the original video, is displayed on a large screen at a wide viewing angle.

[1.1. Schematic Configuration of Information Processing Device]

Figure 2:
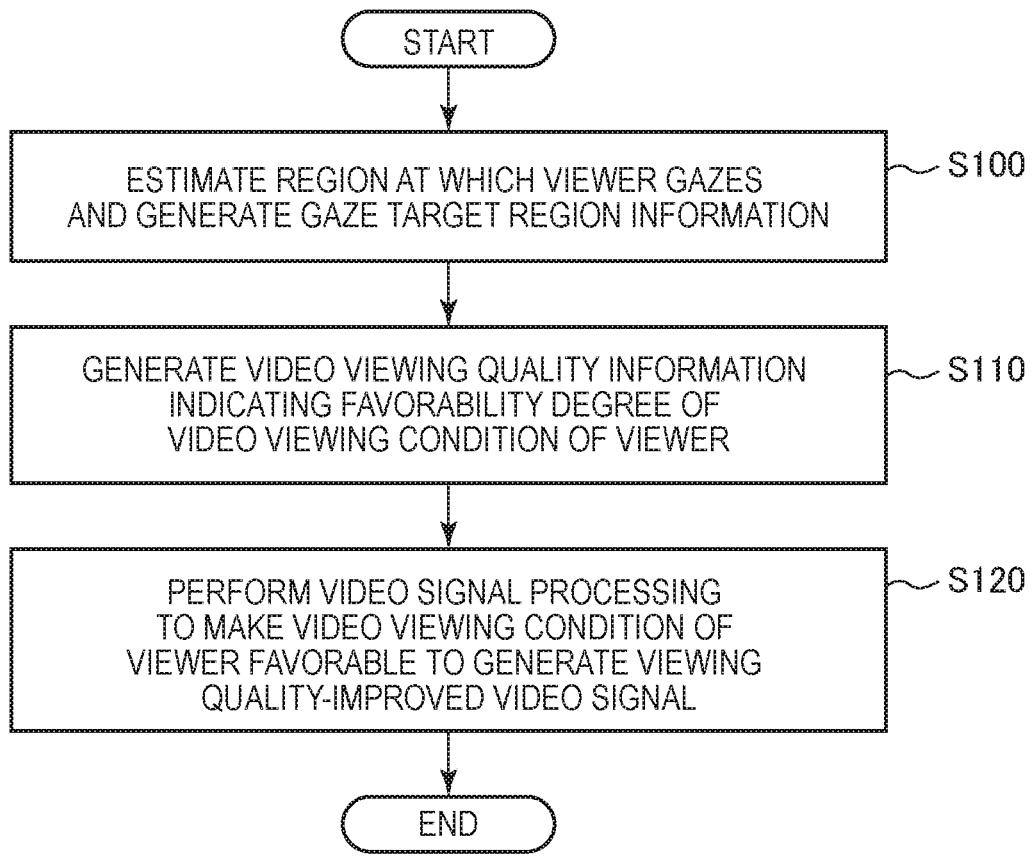
FIG. 2 is a flowchart showing an overview of image signal processing performed by the information processing device according to the embodiment.

First, a schematic configuration of the information processing device according to the first embodiment according to the present disclosure will be described with reference to FIGS. 1 and 2. Note that FIG. 1 is a functional block diagram showing the schematic configuration of the information processing device 100 according to the present embodiment. FIG. 2 is a flowchart showing an overview of image signal processing performed by the information processing device 100 according to the present embodiment.

The information processing device 100 according to the present embodiment is constituted by a gaze target region information generation unit 110, a quality analyzer 120, and a quality improvement processing unit 130, as shown in FIG. 1.

Figure 58:
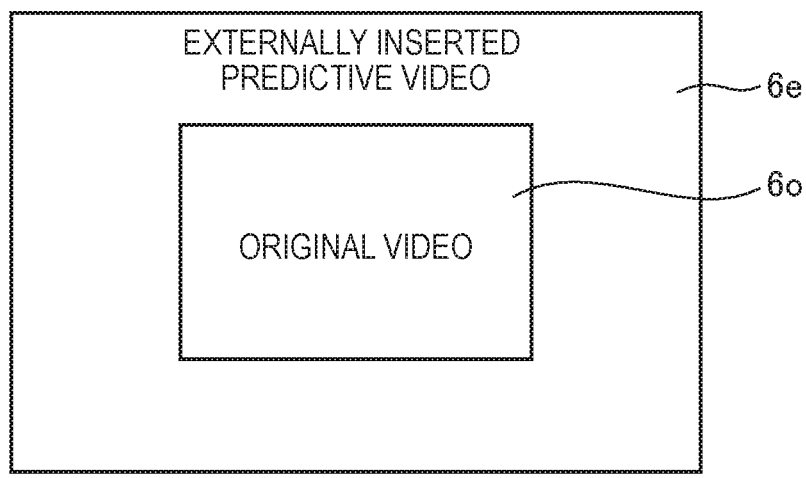
FIG. 58 is an illustrative diagram showing a configuration of a video with a quasi-wide angle that is generated by converting a current video.

The gaze target region information generation unit 110 estimates a region at which a viewer is likely to gaze (or is gazing) (which will also be referred to as a "gaze target region" below) on the basis of an input video signal and an external signal to set gaze target region information. Here, the input video signal is a signal indicating a video to be displayed on a display screen. In the present embodiment, a video based on the input video signal is a quasi-wide angle video which has a widened angle of view to be a quasi-wide angle and which is composed of an original video whose angle of view is not yet widened to be the quasi-wide angle and an externally inserted predictive video, as shown in FIG. 58. In addition, the external signal is a control signal for identifying an original signal indicating the original video and an externally inserted predictive signal indicating an externally inserted predictive video.

The gaze target region information generation unit 110 detects a characteristic subject region that is estimated to be gazed at by the viewer from the input video signal, and generates a saliency map which represents the subject region detected in the video. In addition, the gaze target region information generation unit 110 generates a signal identification map for identifying the original signal and the externally inserted predictive signal on the basis of the external signal. Then, the gaze target region information generation unit 110 generates a gaze target map that represents regions to be gazed at by the viewer (the gaze target region information) from the saliency map and the signal identification map.

The quality analyzer 120 generates video viewing quality information that indicates a favorability degree of a video viewing condition of the viewer on the basis of the input video signal and video viewing environment information. The video viewing environment information is information including, for example, a size of a display on which a video is displayed, a visual range of the viewer to the display, brightness information of the display, brightness information of an indoor place, and the like. The quality analyzer 120 analyses a condition that affects a video viewing quality from a state of an environment in which the video is viewed and generates the video viewing quality information.

The quality improvement processing unit 130 performs video signal processing on the basis of the input video signal, the external signal, the gaze target region information, and the video viewing quality information so that a video viewing condition of the viewer is favorable, thereby generating a viewing quality-improved video signal. When a video is analyzed as inducing video motion sickness, for example, the quality improvement processing unit 130 adjusts quality of a portion of the original video or superimposes a portion with a pattern thereon to make the original video more conspicuous than the externally inserted predictive video, thereby suppressing video motion sickness and generating a viewing quality-improved video signal of which the video has improved viewing quality.

The gaze target region information generation unit 110 of the information processing device 100 first estimates a gaze target region from an input video signal and an external signal input from outside as shown in FIG. 2, and generates gaze target region information (S100). The gaze target region information generation unit 110 outputs the generated gaze target region information to the quality improvement processing unit 130.

Meanwhile, the quality analyzer 120 generates video viewing quality information indicating a favorability degree of a video viewing condition of a viewer from the input video signal and video viewing environment information input from outside (S110). The quality analyzer 120 outputs the generated video viewing quality information to the quality improvement processing unit 130.

Then, the quality improvement processing unit 130 performs video signal processing with the input video signal and the external signal input from the outside, the gaze target region information, and the video viewing quality information to make the video viewing condition of the viewer favorable, thereby generates a final viewing quality-improved video signal (S120).

A viewing environment and a video signal can be analyzed by performing such image signal processing when a quasi-wide angle video, which is obtained by externally inserting an externally inserted predictive video around an original video, is viewed, and when the quasi-wide angle video is likely to induce video motion sickness, video motion sickness can be suppressed by making the original video more conspicuous than the externally inserted predictive video, and thereby viewing quality can be improved. Functions of the constituent elements will be described in detail below.

[1.2. Gaze Target Region Information Generation Process]

Figure 3:
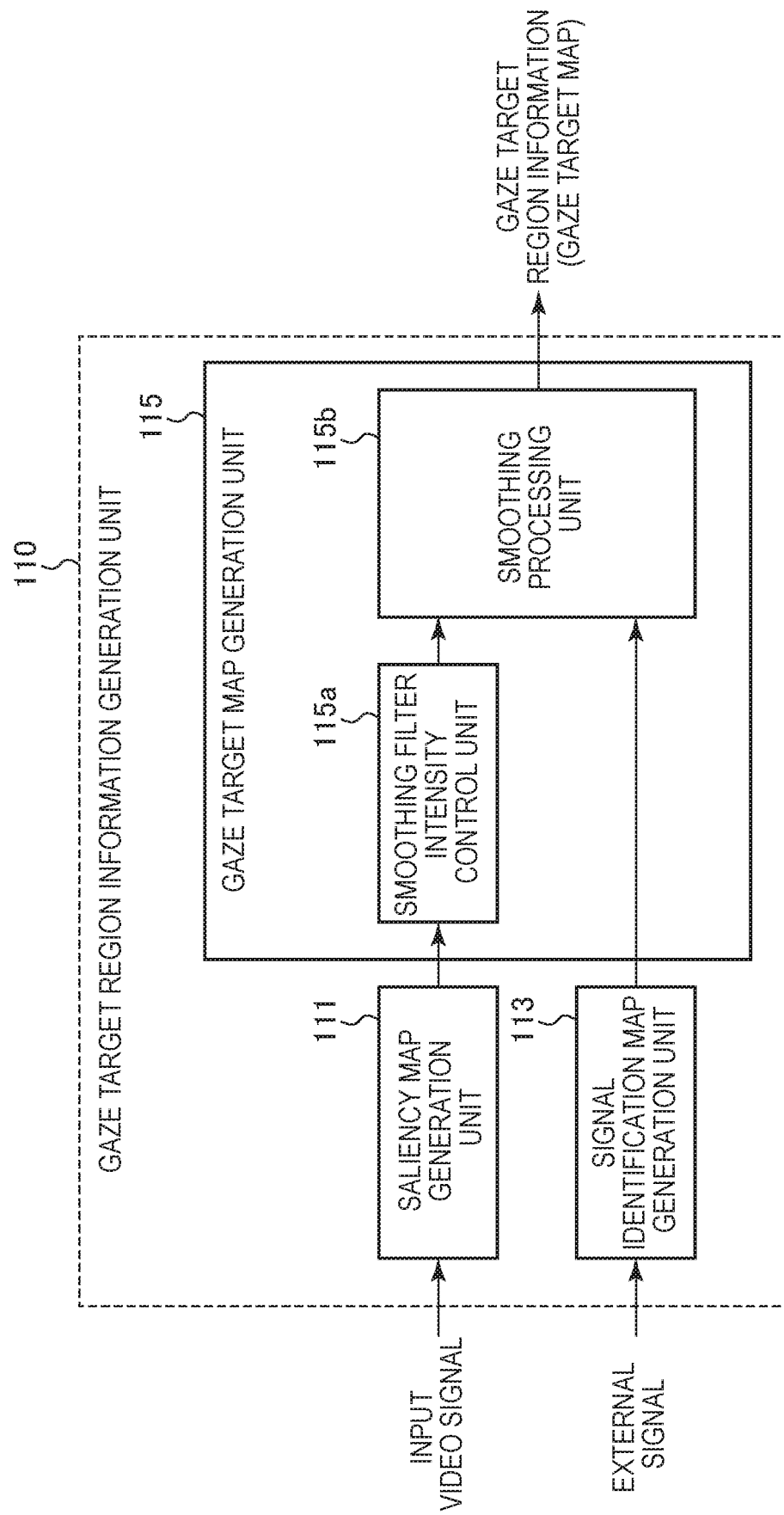
FIG. 3 is a functional block diagram showing a functional configuration of a gaze target region information generation unit according to the embodiment.
Figure 4:
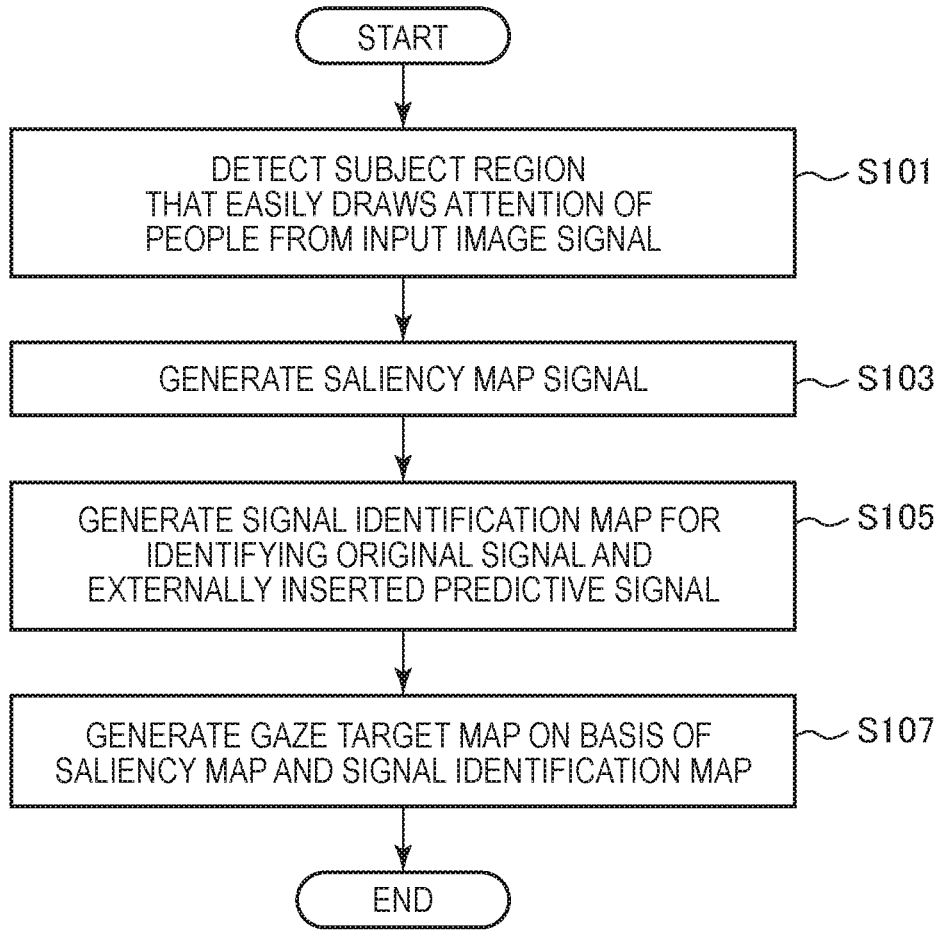
FIG. 4 is a flowchart showing a gaze target region information generation process performed by the gaze target region information generation unit according to the embodiment.
Figure 5:
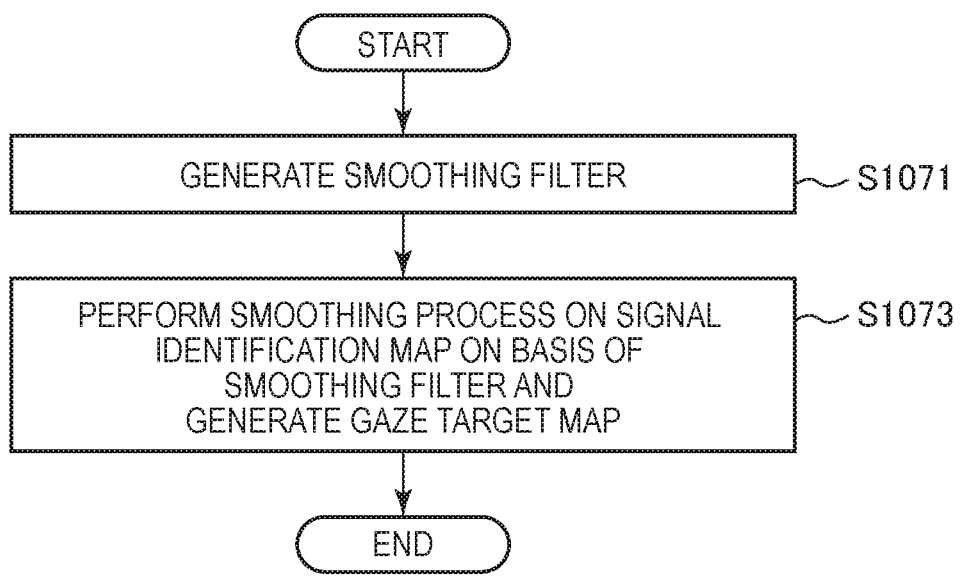
FIG. 5 is a flowchart showing a gaze target map generation process.
Figure 6:
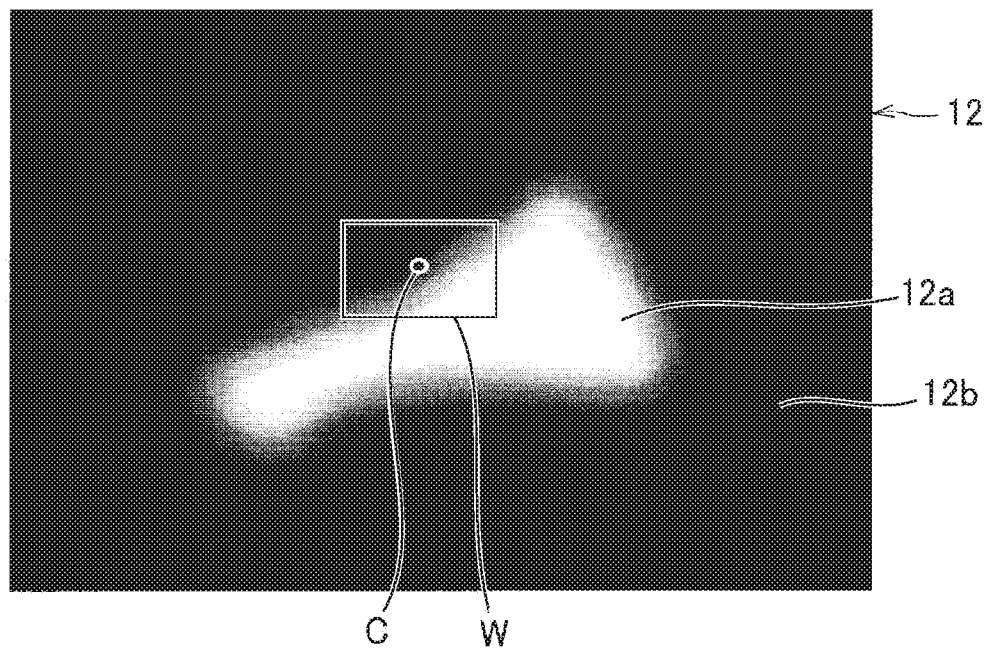
FIG. 6 is an illustrative diagram for describing a process of generating a gaze target map using a saliency map as an example of a saliency map.
Figure 7:
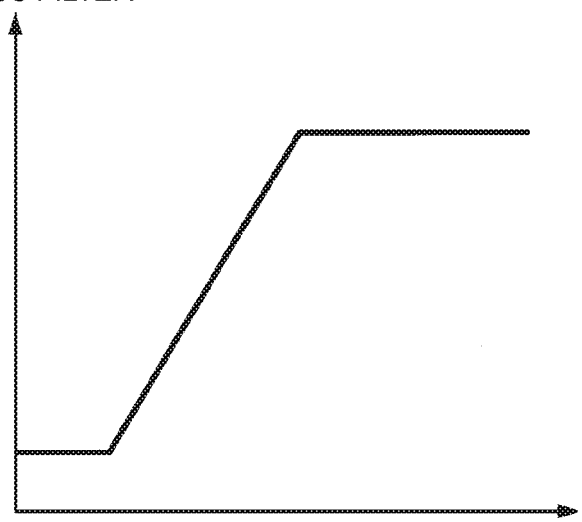
FIG. 7 is a graph showing an example of a smoothing filter intensity control signal.
Figure 8:
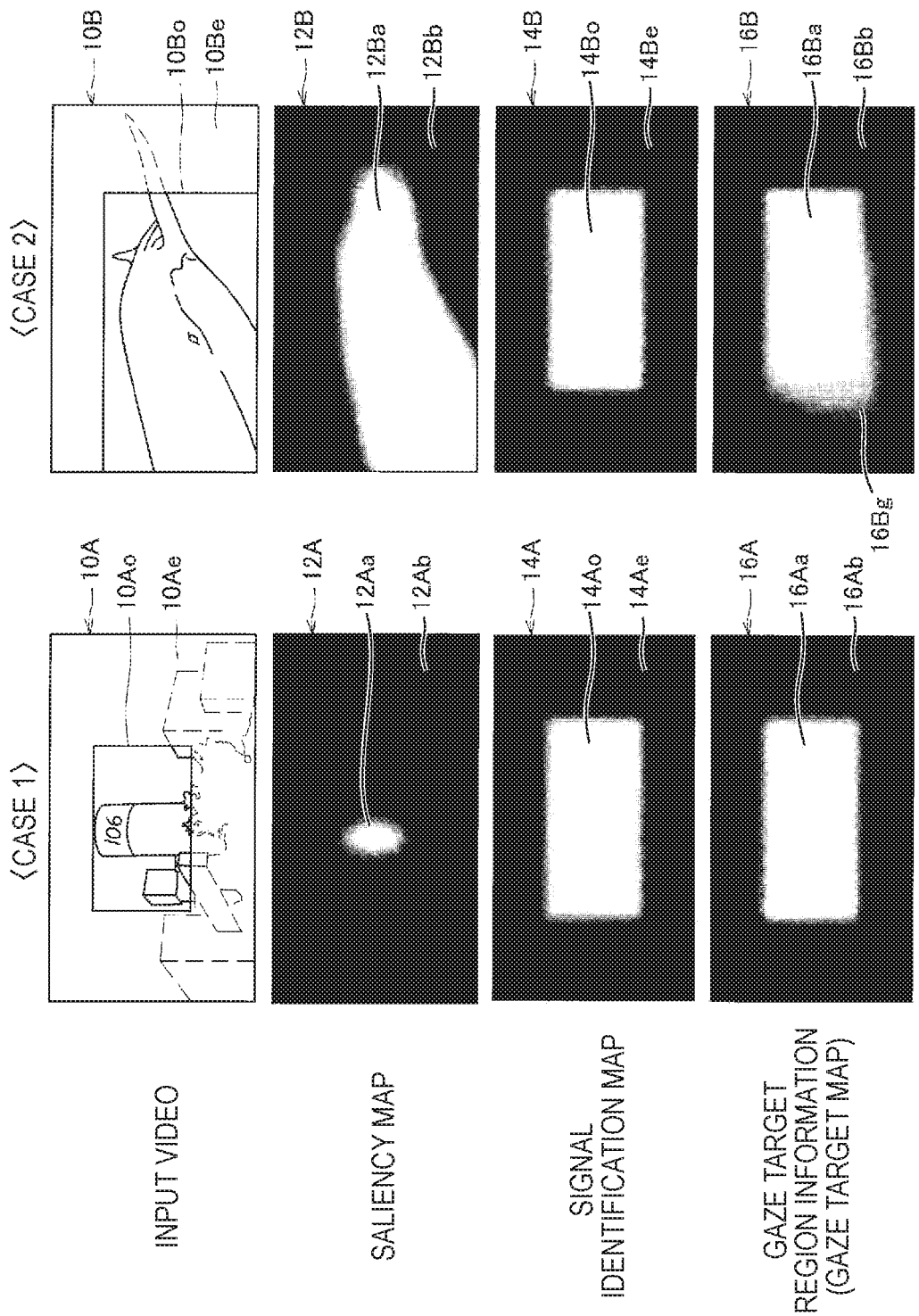
FIG. 8 shows illustrative diagrams showing examples of an input video, a saliency map, a signal identification map, and a gaze target map.
Figure 9:
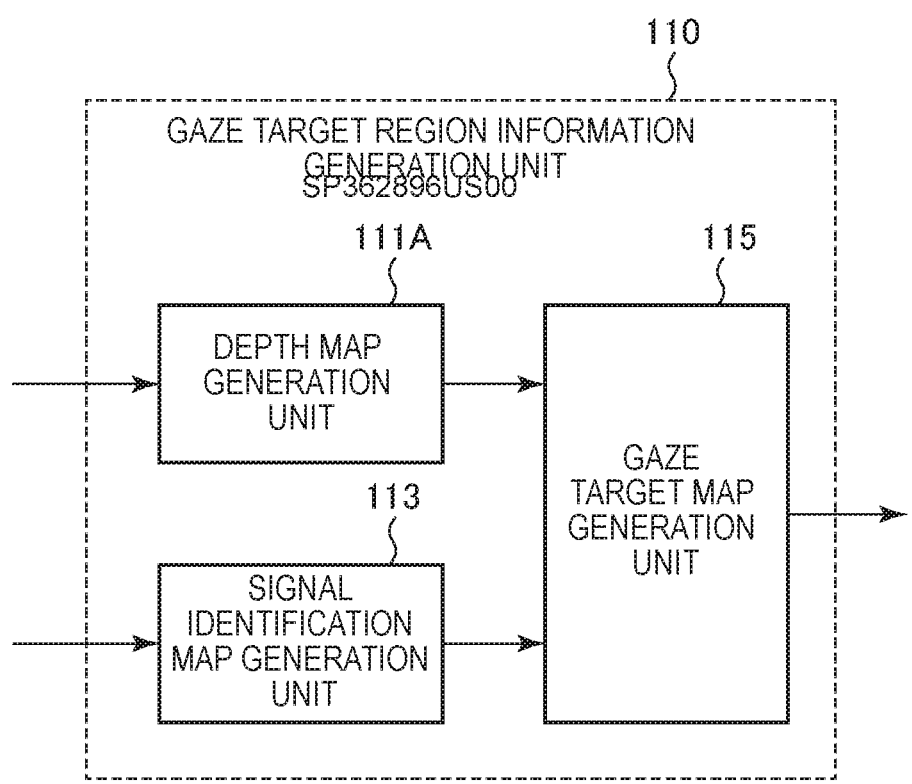
FIG. 9 is a functional block diagram showing a configuration of the gaze target region information generation unit when a depth map is used.

First, a configuration of the gaze target region information generation unit 110 of the information processing device 100 according to the present embodiment and processes performed thereby will be described with reference to FIGS. 3 to 9. Note that FIG. 3 is a functional block diagram showing a functional configuration of the gaze target region information generation unit 110 according to the present embodiment. FIG. 4 is a flowchart showing a gaze target region information generation process performed by the gaze target region information generation unit 110 according to the present embodiment. FIG. 5 is a flowchart showing a gaze target map generation process. FIG. 6 is an illustrative diagram for describing a process of generating a gaze target map using a saliency map as an example of a saliency map. FIG. 7 is a graph showing an example of a smoothing filter intensity control signal. FIG. 8 shows illustrative diagrams showing examples of an input video, a saliency map, a signal identification map, and a gaze target map. FIG. 9 is a functional block diagram showing a configuration of the gaze target region information generation unit 110 when a depth map is used.

(1) Functional Configuration

The gaze target region information generation unit 110 according to the present embodiment includes a saliency map generation unit 111, a signal identification map generation unit 113, and a gaze target map generation unit 115, as shown in FIG. 3.

The saliency map generation unit 111 detects a characteristic subject region that easily draws attention of a human from an input video signal and generates a saliency map that represents the subject region detected from a video. The saliency map generation unit 111 detects the subject region using a subject detection function of detecting a position or a size of the subject region in the video. A known technology can be applied to the subject detection function, and for example, the technology disclosed in JP 2010-262506A may be applied thereto. The saliency map generation unit 111 outputs the saliency map generated for the detected subject region to the gaze target map generation unit 115 as a saliency map signal.

The signal identification map generation unit 113 generates a signal identification map for identifying an original signal and an externally inserted predictive signal on the basis of an external signal. The signal identification map generation unit 113 generates an identification signal map that represents a region of an original video and a region of an externally inserted predictive video with respect to the video from the external signal, and outputs the map to the gaze target map generation unit 115 as a signal identification map signal.

The gaze target map generation unit 115 generates a gaze target map (gaze target region information) that represents regions to be gazed at by a viewer on the basis of the saliency map and the signal identification map. The gaze target map generation unit 115 includes a smoothing filter intensity control unit 115a and a smoothing processing unit 115b, as shown in FIG. 3.

The smoothing filter intensity control unit 115a generates a smoothing filter having a characteristic of intensifying smoothing on a portion having high saliency (i.e., a portion that is highly likely to be the subject region) on the basis of the saliency map. The smoothing processing unit 115b generates a gaze target map that indicates a region to be gazed at by the viewer on the basis of the smoothing filter generated by the smoothing filter intensity control unit 115a and the signal identification map.

(2) Process Details

The gaze target region information generation unit 110 shown in FIG. 3 starts the process shown in FIG. 4 when an input video signal is input. First, the saliency map generation unit 111 detects a subject region that easily draws attention of people from an input video signal as shown in FIG. 4 (S101). The saliency map generation unit 111 detects a position and a size of the subject region, and generates a saliency map on the basis of values and likelihoods of the position and size (S103). The saliency map is an image in which, for example, every pixel is expressed as having a value from 0 to 255, and as a pixel has a greater value, the subject region is more likely to be present at a spatial position of the pixel.

FIG. 6 shows an example of the saliency map. A saliency map 12 shown in FIG. 6 represents a region in which a subject region is present in a video, and as a signal value of a pixel approaches 0, a color thereof becomes darker, and as a single value of a pixel approaches 255, a color thereof becomes lighter. That is, a black region on the saliency map 12 shown in FIG. 6 is a region 12b in which no subject is present, and a white region is a region 12a in which a subject is present. The blurry boundary between the region 12a and the region 12b indicate that the presence of a subject is difficult to confirm. The saliency map generation unit 111 outputs the generated saliency map to the gaze target map generation unit 115 as a saliency map signal.

Next, the signal identification map generation unit 113 generates a signal identification map for identifying an original video of a quasi-wide angle video and an externally inserted predictive video from the external signal (S105). The signal identification map may be expressed with binary signals, for example, 1, which is set for an original signal indicating the original video, and 0, which is set for an externally inserted predictive signal indicating the externally inserted predictive video, or with consecutive values of 0 to 255 having a transition region disposed at a boundary part of the original signal and the externally inserted predictive signal. When the signal identification map is expressed with the consecutive values, a boundary of the original signal and the externally inserted predictive signal has a value of 128, and values of the original signal on the map approach 255 as they recede from the boundary, and values of the externally inserted predictive signal approach 0 as they recede from the boundary. The signal identification map generation unit 113 outputs the generated signal identification map to the gaze target map generation unit 115 as a signal identification map signal.

Then, the gaze target map generation unit 115 generates a gaze target map on the basis of the saliency map and the signal identification map (S107). In a process of generating the gaze target map, first, the smoothing filter intensity control unit 115a generates a smoothing filter as shown in FIG. 5 (S1071). The smoothing filter intensity control unit 115a generates a smoothing filter having a characteristic of intensifying smoothing of a portion having high saliency (i.e. a portion that is highly likely to be a subject region).

When the smoothing filter is generated using the saliency map 12 shown in FIG. 6, for example, the smoothing filter intensity control unit 115a sets a determination region W having a pixel as the center C for each of pixels of the saliency map 12, and calculates a cumulative value of signal values of pixels included in the determination region W. Then, the smoothing filter intensity control unit 115a generates a smoothing filter that more intensifies the smoothing performed by the smoothing processing unit 115b, which will be described below, as the cumulative value increases. When the smoothing filter has a tap length of a lowpass filter, for example, the filter is set to have a characteristic shown in FIG. 7.

Then, the smoothing processing unit 115b performs a smoothing process on the signal identification map on the basis of the smoothing filter to generate a gaze target map (gaze target region information) (S1073). The smoothing process may be performed using, for example, a finite impulse response (FIR) lowpass filter or the like. The smoothed signal identification map turns into the gaze target map that represents a region to be gazed at by a viewer, and is output to the quality improvement processing unit 130 as the gaze target region information.

Here, examples of saliency maps, signal identification maps, and gaze target maps generated from input video signals in the gaze target region information generation process will be shown in FIG. 8.

An input video signal 10A of Case 1 shown on the left of FIG. 8 is constituted by an original video 10Ao, in which a characteristic subject is present, at the center thereof and an externally inserted predictive video 10Ae that is externally inserted around the original video 10Ao. That is, the original video 10Ao is disposed at the center of the video 10A, which is a quasi-wide angle video. A saliency map 12A of this video 10A is made by detecting the characteristic subject positioned at the center of the video to include a region 12Aa, in which the subject is present, at the center thereof and a region 12Ab in which the subject is not present around the aforementioned region. Meanwhile, a signal identification map 14A is made to include a region 14Ao of the original video at the center thereof and a region of the externally inserted predictive video 14Ae around the aforementioned region using an external signal.

When the saliency map 12A and the signal identification map 14A are compared, values of the saliency map 12A are set to be low near a boundary of the region 14Ao of the original video on the signal identification map 14A and the region 14Ae of the externally inserted predictive video. Thus, a gaze target map 16A generated in Case 1 is substantially the same as the signal identification map 14A.

Conversely, an input video signal 10B of Case 2 shown on the right of FIG. 8 includes a characteristic subject from a lower left side to the center of a video and is constituted by an original video 10Bo of the center and an externally inserted predictive video 10be that is externally inserted around the original video 10Bo. A saliency map 12B of this video 10B is made by detecting the characteristic subject from the lower left side of the video to the center to include a region 12Ba, in which the subject is present, from the lower left side to the center and a region 12Bb, in which the subject is not present, around the aforementioned region. Meanwhile, a signal identification map 14B is made to include a region 14Bo of the original video at the center and a region of the externally inserted predictive video 14Be around the aforementioned region using an external signal.

When the saliency map 12B and the signal identification map 14B are compared, values of the saliency map 12B are set to be high near a part of a boundary of a region 14Bo of the original video on the signal identification map 14B and a region 14be of the externally inserted predictive video. Thus, a gaze target map 16B generated in Case 2 has a blurry lower-left portion 16Bg in which values of the saliency map 12B are high on the boundary of the region 14Bo of the original video and the region 14Be of the externally inserted predictive video of the signal identification map 14B. A region 16a indicating a gaze target region is expanded on the gaze target map 16B as described above, which is different from the signal identification map 14B.

(3) Gaze Target Region Information Generation Process Using Depth Map

Although the gaze target region information generation unit 110 is described as generating the gaze target region information using the saliency map above, the gaze target region information may be generated using a depth map instead of the saliency map. That is, the gaze target region information generation unit 110 may be configured to include a depth map generation unit 111A, the signal identification map generation unit 113, and the gaze target map generation unit 115, as shown in FIG. 9.

The depth map generation unit 111A detects depth information of a video from an input video signal and generates a depth map. The depth map is, for example, an image with pixels having values of 0 to 255, and a pixel having a greater value indicates that the pixel has a shallower depth at a spatial position thereof. For example, when the input video signal is a 3D stereo video signal, parallax between left and right images is detected and then the depth map can be generated. In addition, when the input video signal is a 2D single-eye video signal, the depth map can be generated using a known depth estimation technology (refer to, e.g., JP 2013-172214A).

Note that the signal identification map generation unit 113 and the gaze target map generation unit 115 perform processes similar to the above processes.

The configuration of the gaze target region information generation unit 110 according to the present embodiment and the processes performed thereby have been described above.

[1.3. Video Viewing Quality Analysis Process]

Figure 10:
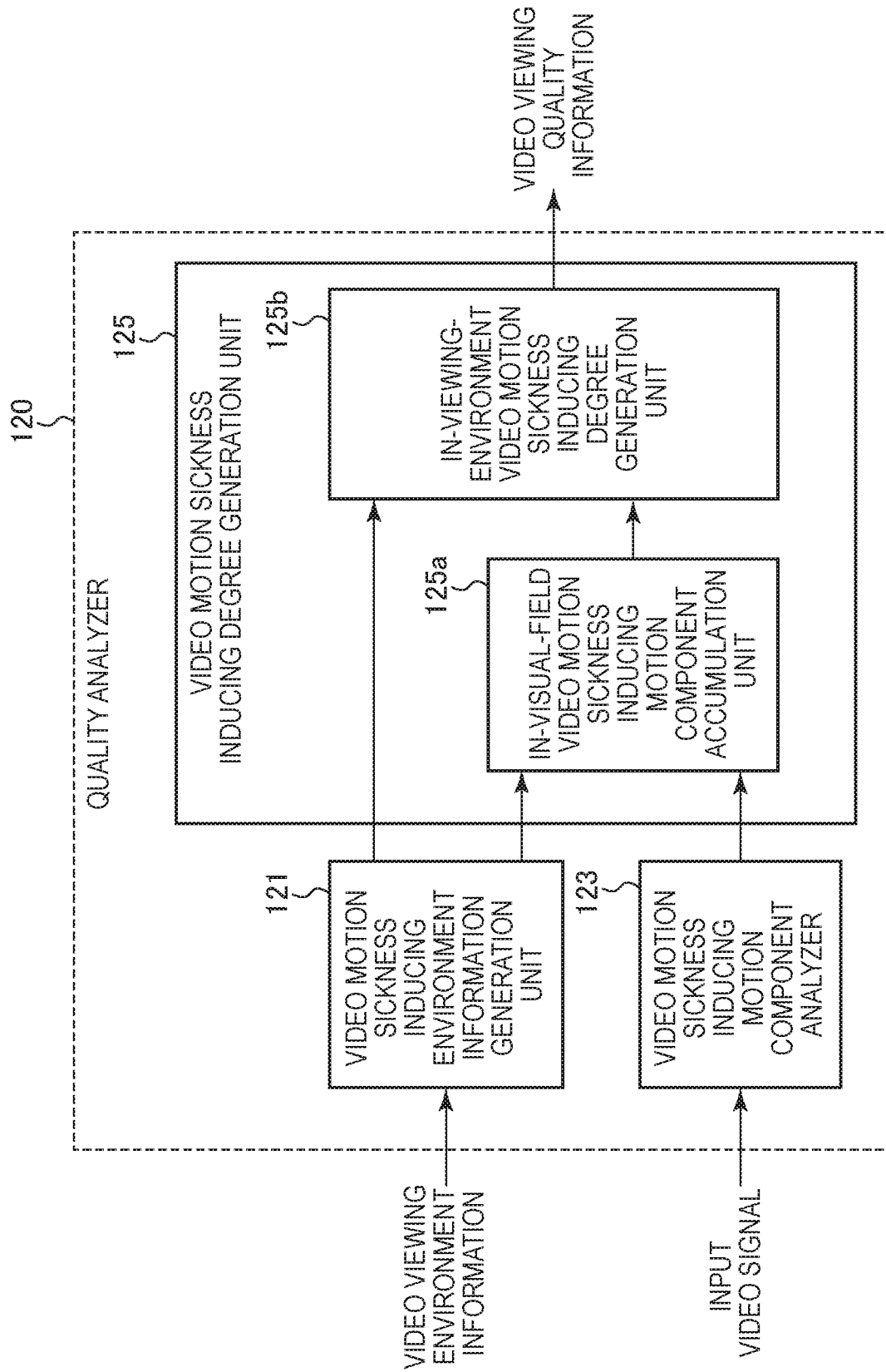
FIG. 10 is a functional block diagram showing a functional configuration of a quality analyzer according to the embodiment.
Figure 11:
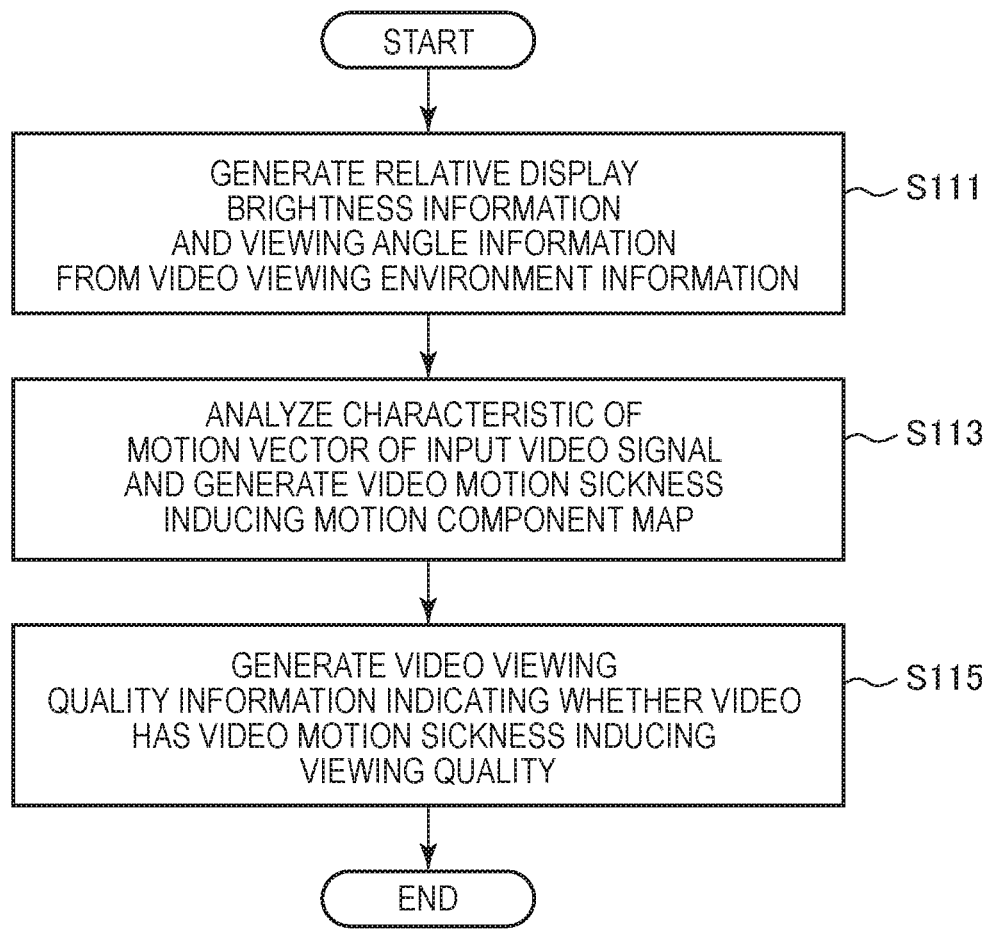
FIG. 11 is a flowchart showing a video viewing quality analysis process performed by the quality analyzer according to the embodiment.
Figure 12:
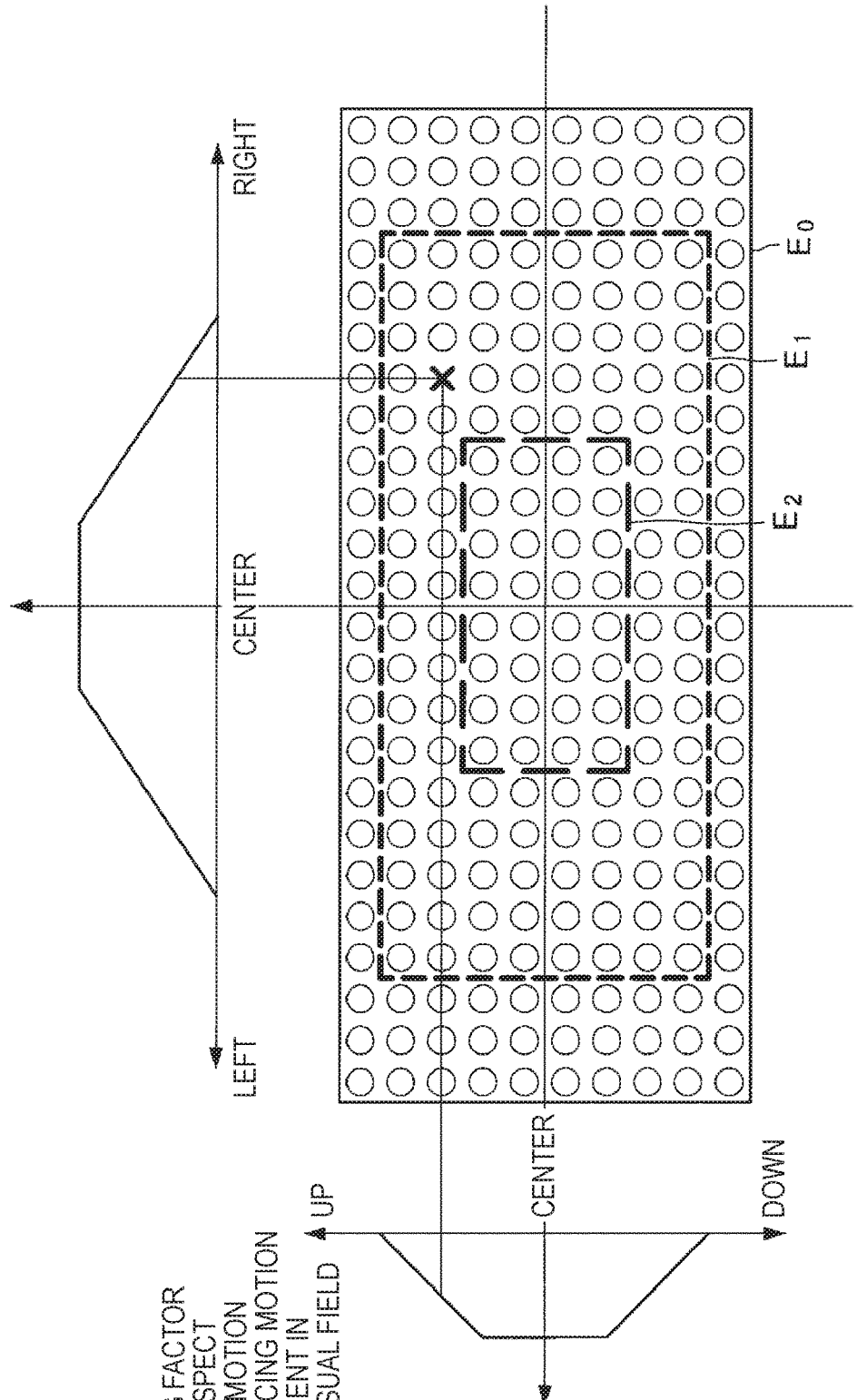
FIG. 12 is an illustrative diagram for a process of generating a video motion sickness induction degree signal within a visual field.
Figure 13:
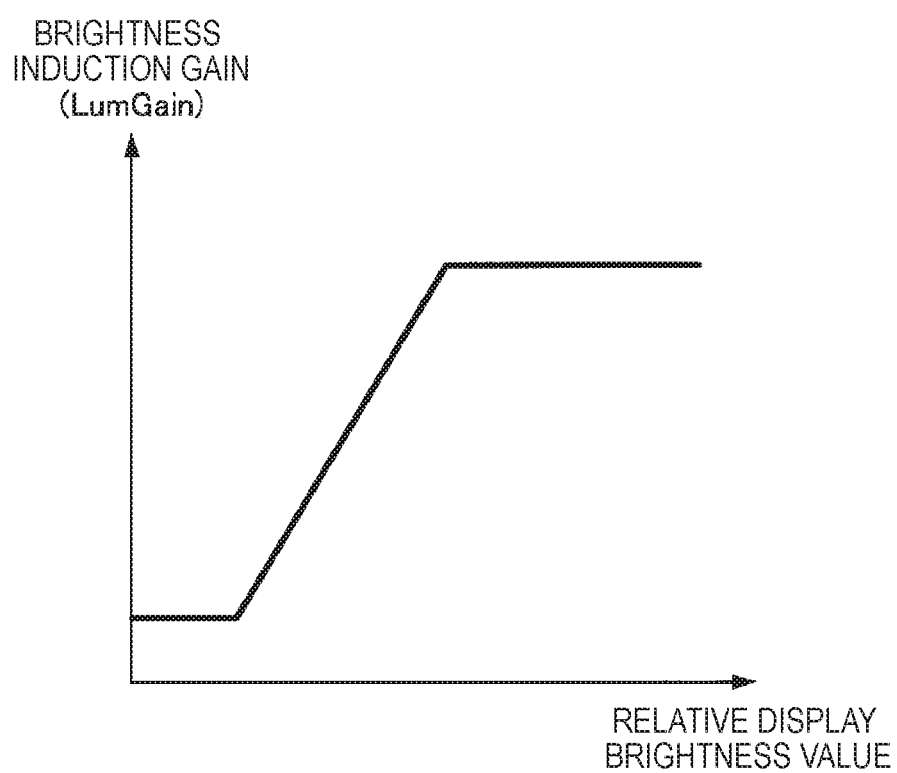
FIG. 13 is a graph showing a relation between relative display brightness information and brightness induction gains.

Next, a configuration of the quality analyzer 120 of the information processing device 100 according to the present embodiment and a process performed thereby will be described with reference to FIGS. 10 to 13. Note that FIG. 10 is a functional block diagram showing a functional configuration of the quality analyzer 120 according to the present embodiment. FIG. 11 is a flowchart showing a video viewing quality analysis process performed by the quality analyzer 120 according to the present embodiment. FIG. 12 is an illustrative diagram for a process of generating a video motion sickness induction degree signal within a visual field. FIG. 13 is a graph showing a relation between relative display brightness information and brightness induction gains.

(1) Functional Configuration

The quality analyzer 120 according to the present embodiment includes a video motion sickness inducing environment information generation unit 121, a video motion sickness inducing motion component analyzer 123, and a video motion sickness inducing degree generation unit 125, as shown in FIG. 10.

The video motion sickness inducing environment information generation unit 121 generates relative display brightness information and viewing angle information on the basis of video environment information. The video viewing environment information is information including, for example, a size of a display on which a video is displayed, a visual range of a viewer to the display, brightness information of the display, brightness information of an indoor place, and the like. The video motion sickness inducing environment information generation unit 121 analyzes an influence degree of a state of an environment in which a video is viewed on viewing quality of the video and generates video viewing quality information. The video motion sickness inducing environment information generation unit 121 outputs the generated relative display brightness information and viewing angle information to the video motion sickness inducing degree generation unit 125.

The video motion sickness inducing motion component analyzer 123 analyzes a characteristic of a motion vector of the video and generates a video motion sickness inducing motion component map. The video motion sickness inducing motion component analyzer 123 detects a video motion sickness inducing region that includes a motion that is likely to cause video motion sickness in the video and represents a position of the video motion sickness inducing region in the video as the video motion sickness inducing motion component map. The video motion sickness inducing motion component analyzer 123 outputs the generated video motion sickness inducing motion component map to the video motion sickness inducing degree generation unit 125.

The video motion sickness inducing degree generation unit 125 generates video viewing quality information that indicates whether the video has a viewing quality which induces video motion sickness. The video motion sickness inducing degree generation unit 125 includes an in-visual-field video motion sickness inducing motion component accumulation unit 125a and an in-viewing-environment video motion sickness inducing degree generation unit 125b, as shown in FIG. 10.

The in-visual-field video motion sickness inducing motion component accumulation unit 125a generates an in-visual-field video motion sickness inducing degree signal on the basis of the viewing angle information and the video motion sickness inducing motion component map. The in-visual-field video motion sickness inducing motion component accumulation unit 125a discretely maps the video motion sickness inducing motion component map to a video range at a viewing angle, and obtains a weighted cumulative value of information of the video motion sickness inducing motion component map. The in-visual-field video motion sickness inducing motion component accumulation unit 125a normalizes the calculated cumulative value and outputs the value to the in-viewing-environment video motion sickness inducing degree generation unit 125b as an in-visual-field video motion sickness inducing degree signal.

The in-viewing-environment video motion sickness inducing degree generation unit 125b generates video viewing quality information on the basis of the relative display brightness information and the in-visual-field video motion sickness inducing degree signal. The in-viewing-environment video motion sickness inducing degree generation unit 125b sets a brightness induction gain from the relative display brightness information and sets a signal, which is obtained by multiplying the brightness induction gain and the in-visual-field video motion sickness inducing degree signal and then reversing the multiplication result, as the video viewing quality information.

(2) Process Details

The quality analyzer 120 shown in FIG. 10 starts the process shown in FIG. 11 when video viewing environment information is input. First, the video motion sickness inducing environment information generation unit 121 generates relative display brightness information and viewing angle information from the video viewing environment information as shown in FIG. 11 (S111). The video viewing environment information is information including a size of a display, a visual range of a viewer to the display, brightness information of the display, brightness information of an indoor place, and the like. The size of the display and the brightness information of the display are acquired from, for example, the display. The visual range of the viewer to the display is acquired from, for example, a distance sensor provided in the vicinity of a display screen of the display or the like. Note that, when there are a plurality of viewers, an average of visual ranges of the viewers, a mean, or a value of a viewer who is closest to the display may be used. In addition, the brightness information of the indoor place is acquired from, for example, a luminance sensor installed in the indoor place or the like.

The video motion sickness inducing environment information generation unit 121 generates the relative display brightness information indicating a ratio of brightness of the display to brightness of the indoor place from the brightness information of the display and the brightness information of the indoor place. That is, as the indoor place becomes darker and the display becomes brighter, a value of the relative display brightness information becomes greater. In addition, the video motion sickness inducing environment information generation unit 121 calculates a range of a human-perceivable visual field in which a video is perceived from the size of the display and the visual range of the viewer to display and sets the range as viewing angle information. The generated relative display brightness information and viewing angle information are output to the video motion sickness inducing degree generation unit 125.

Next, the video motion sickness inducing motion component analyzer 123 analyzes a characteristic of a motion vector of a video indicated by an input video signal and generates a video motion sickness inducing motion component map (S113). The video motion sickness inducing motion component map is, for example, an image in which signal values of pixels are normalized to be 0 255, and represents that motions at spatial positions of the pixels are more likely to induce video motion sickness as the values thereof increase. The video motion sickness inducing motion component map can be generated using a known technique (e.g., JP 2013-21455A). The video motion sickness inducing motion component analyzer 123 outputs the generated video motion sickness inducing motion component map to the video motion sickness inducing degree generation unit 125.

Then, the video motion sickness inducing degree generation unit 125 generates video viewing quality information indicating whether the video has video motion sickness inducing viewing quality on the basis of the relative display brightness information, the viewing angle information, and the video motion sickness inducing motion component map (S115).

In Step S115, first, the in-visual-field video motion sickness inducing motion component accumulation unit 125a generates an in-visual-field video motion sickness inducing degree signal on the basis of the viewing angle information and the video motion sickness inducing motion component map. As described in detail with reference to FIG. 12, first, the in-visual-field video motion sickness inducing motion component accumulation unit 125a first calculates a range E of a human-perceivable visual field in which a video is perceived from the viewing angle information including two kinds of information with respect to a horizontal direction and a vertical direction of a screen. With respect to a range $E_0$ of a full human-perceivable visual field, the perceivable video range E is, for example, a range $E_2$ on a central visual field side when a viewing angle is narrow, and a range $E_1$ that expands toward peripheral visual field sides when the viewing angle is wide.

Then, the in-visual-field video motion sickness inducing motion component accumulation unit 125a maps information of the video motion sickness inducing motion component map discretely to the video range at the viewing angle and obtains a weighted cumulative value of the information of the video motion sickness inducing motion component map. That is, first, a discrete data sample of the video motion sickness inducing motion component map is set in the horizontal and vertical directions with a preset resolution at a full visual field angle (e.g., 180°) as illustrated in FIG. 12, and scaling process is performed on the video motion sickness inducing motion component map in accordance with a resolution corresponding to the viewing angle. Then, the in-visual-field video motion sickness inducing motion component accumulation unit 125a multiplies values of the discrete data sample that is mapped to a range corresponding to the viewing angle by a weighting factor set such that a weight increases as a position approaches a central visual field in each of the horizontal and vertical directions. Then, the in-visual-field video motion sickness inducing motion component accumulation unit 125a accumulates weighted values of the discrete data sample in the range corresponding to the viewing angle. An in-visual-field video motion sickness inducing degree signal calculated as described above has a greater value as the viewing angle widens in the case of the same video motion sickness inducing motion component map.

Then, the in-visual-field video motion sickness inducing motion component accumulation unit 125a normalizes the cumulative value of the weighted discrete data sample and outputs the result to the in-viewing-environment video motion sickness inducing degree generation unit 125b as the in-visual-field video motion sickness inducing degree signal. The normalization process for the cumulative value is performed so that, for example, the cumulative value has a value of 0.0 to 1.0.

When the in-visual-field video motion sickness inducing motion component accumulation unit 125a generates the in-visual-field video motion sickness inducing degree signal, the in-viewing-environment video motion sickness inducing degree generation unit 125b generates video viewing quality information on the basis of the relative display brightness information and the in-visual-field video motion sickness inducing degree signal. First, the in-viewing-environment video motion sickness inducing degree generation unit 125b sets a brightness induction gain (LumGain) using the relative display brightness information. The brightness induction gain is a positive coefficient having a value that increases as a value of the relative display brightness increases. The brightness induction gain is multiplied by the in-visual-field video motion sickness inducing degree signal, and reflects the ease of inducing video motion sickness in accordance with the relative display brightness. When, for example, an indoor place is dark and a display is bright, it is likely for a viewer to suffer video motion sickness, thus the brightness induction gain is set to a large coefficient greater than or equal to 1.0. Conversely, when the indoor place is bright but the display is dark, a video seems to be dim, which rarely causes the viewer to suffer video motion sickness, and thus the brightness induction gain is set to a small coefficient less than 1.0. The brightness induction gain is set on the basis of, for example, a relation between the relative display brightness information and the brightness induction gain, as shown in FIG. 13.

The in-viewing-environment video motion sickness inducing degree generation unit 125b outputs a signal, which is obtained by multiplying the set brightness induction gain and the in-visual-field video motion sickness inducing degree signal and reversing the multiplication result, to the quality improvement processing unit 130 as video viewing quality information.

The configuration of the quality analyzer 120 according to the present embodiment and the process performed thereby have been described above.

[1.4. Video Viewing Quality Improvement Process]

Figure 14:
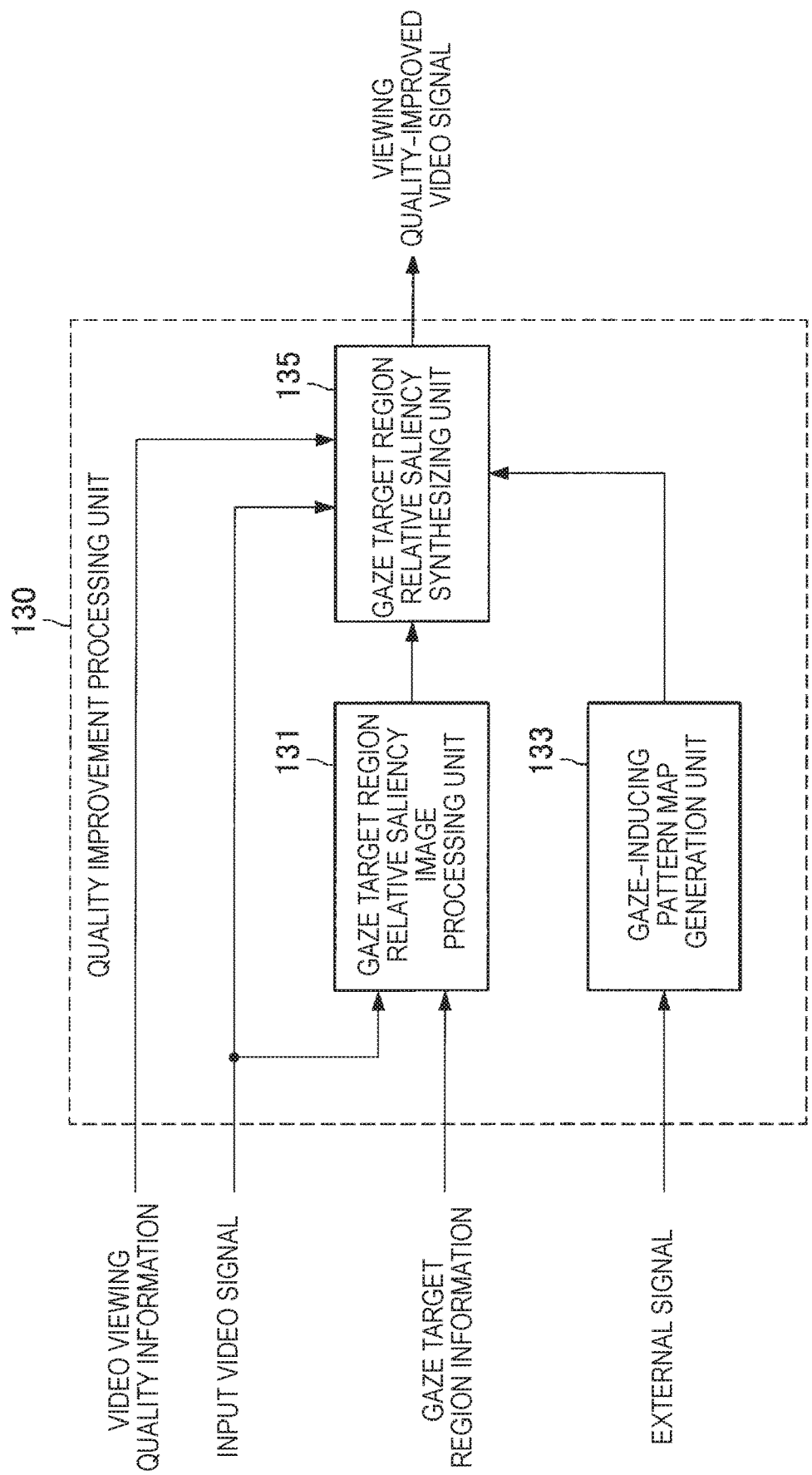
FIG. 14 is a functional block diagram showing a functional configuration of a quality improvement processing unit according to the embodiment.
Figure 15:
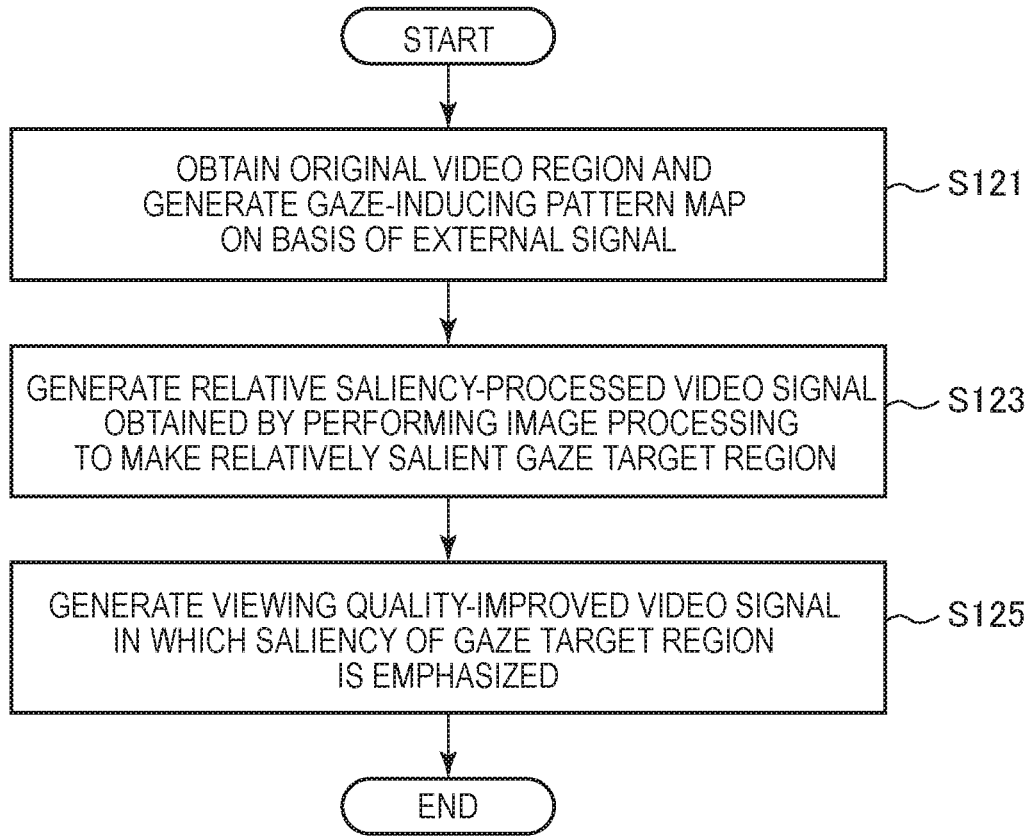
FIG. 15 is a flowchart showing a video viewing quality improving process performed by the quality improvement processing unit according to the embodiment.
Figure 16:
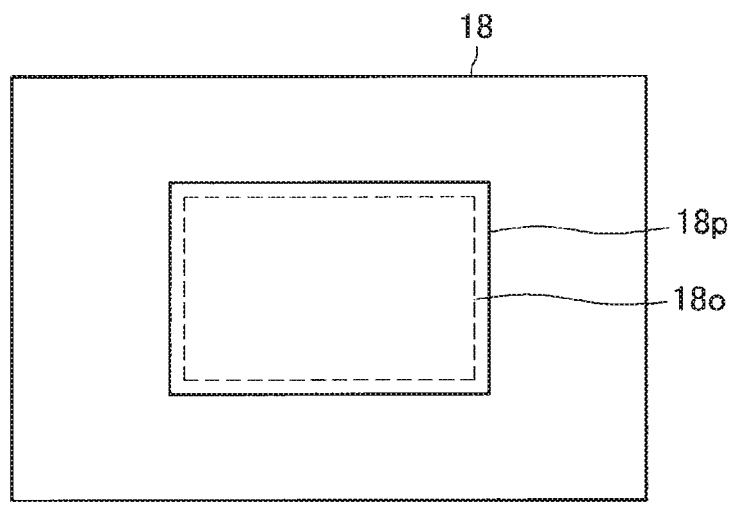
FIG. 16 is an illustrative diagram showing an example of a gaze-inducing pattern map.
Figure 17:
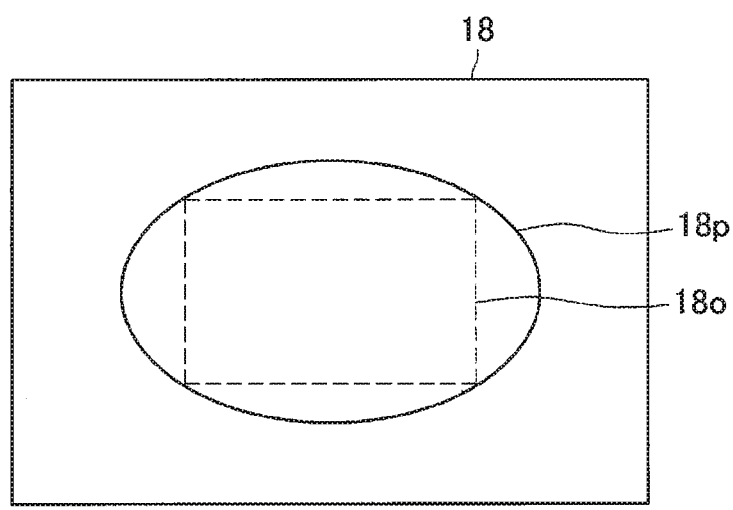
FIG. 17 is an illustrative diagram showing another example of the gaze-inducing pattern map.
Figure 18:
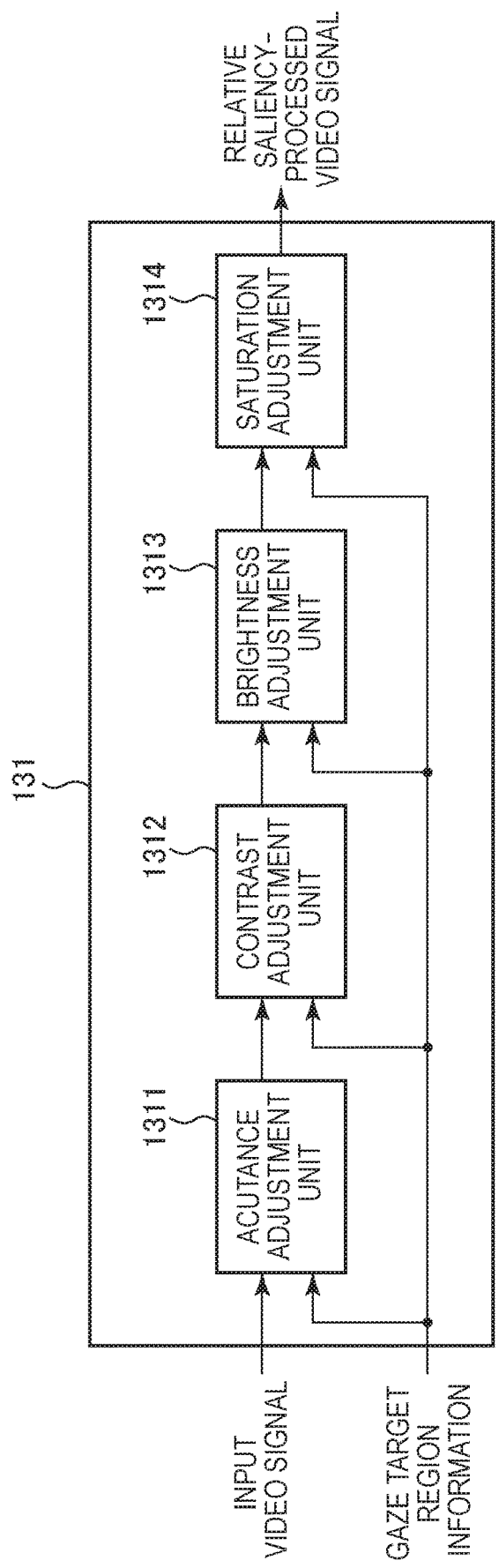
FIG. 18 is a functional block diagram showing an example of a configuration of a gaze target region relative saliency image processing unit.
Figure 19:
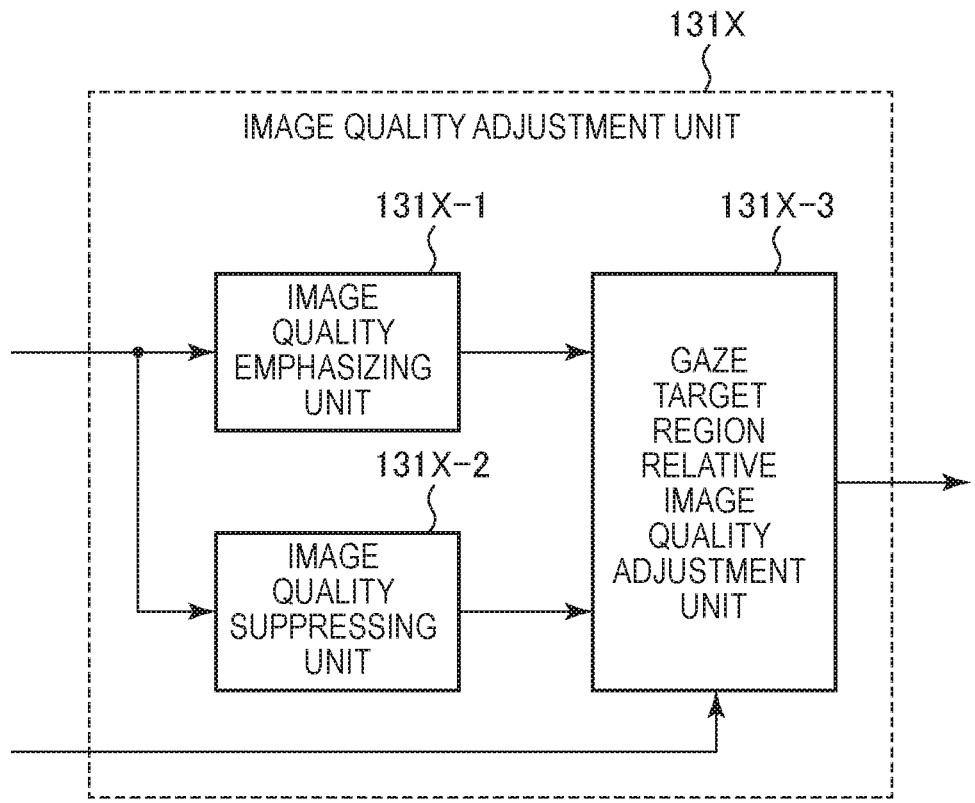
FIG. 19 is a functional block diagram showing a configuration of functional units of the gaze target region relative saliency image processing unit.
Figure 20:
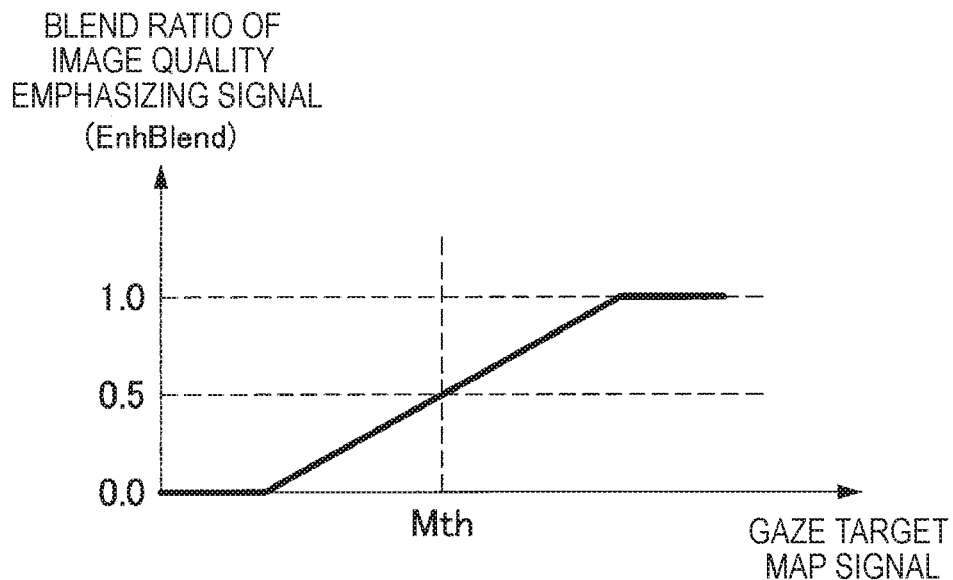
FIG. 20 is a graph showing an example of a relation between a gaze target map signal and a blend ratio of an image quality emphasizing signal.
Figure 21:
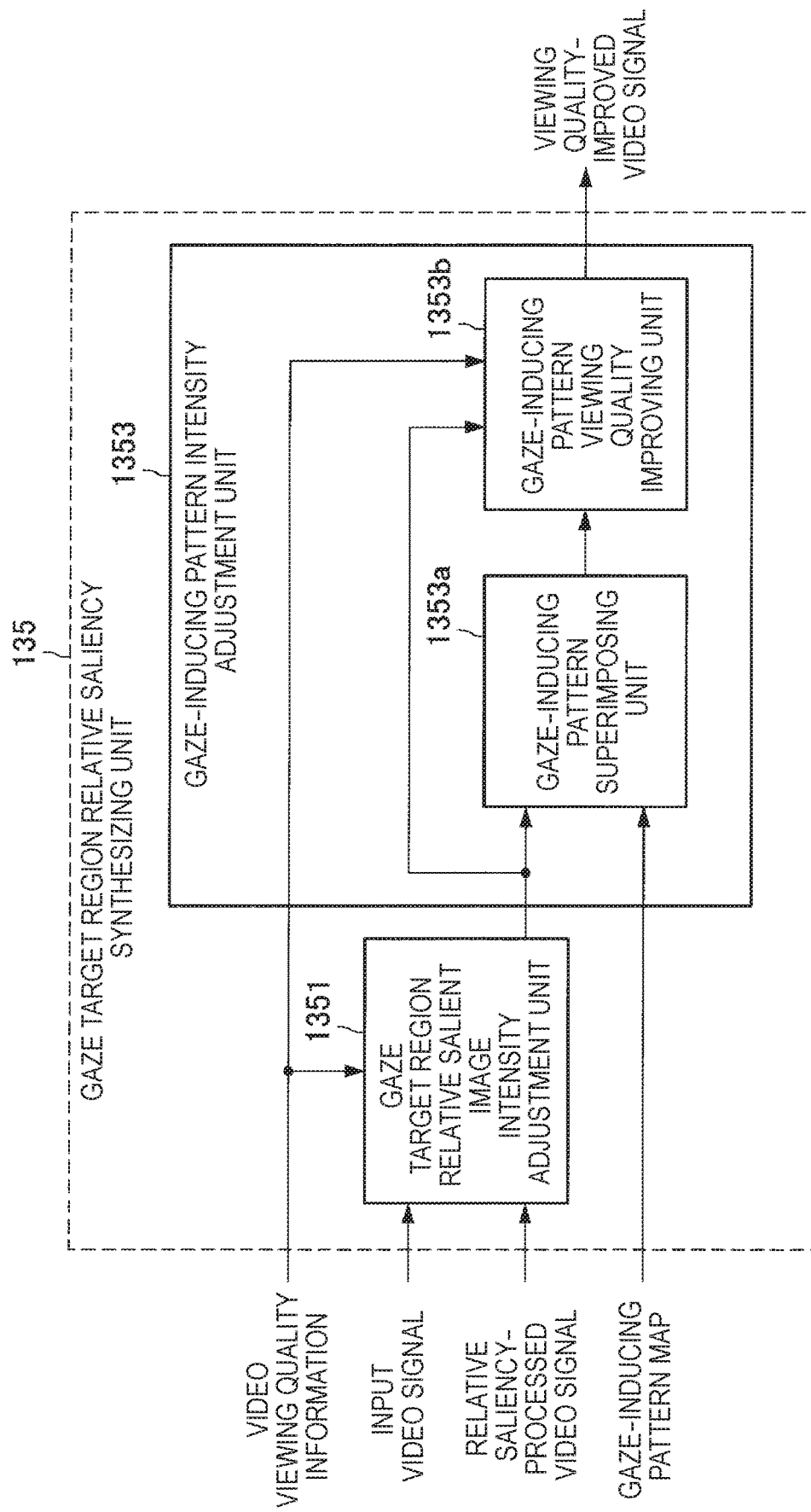
FIG. 21 is a functional block diagram showing a configuration of a gaze target region relative saliency synthesizing unit.
Figure 22:
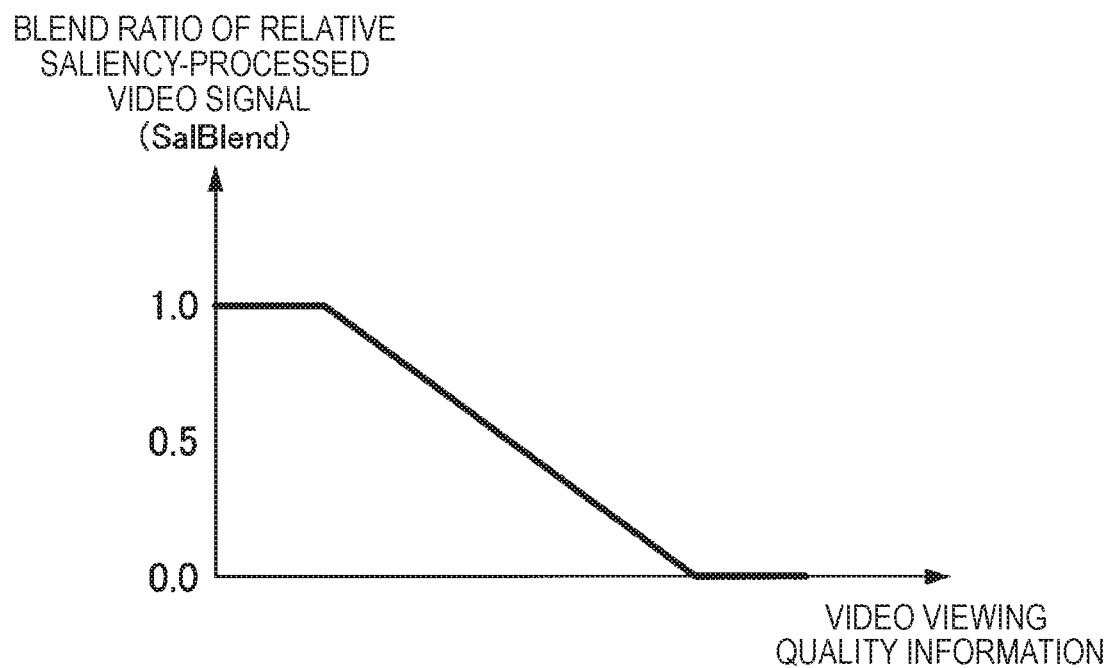
FIG. 22 is a graph showing an example of a relation between video viewing quality information and a blend ratio of a relative saliency-processed video signal.
Figure 23:
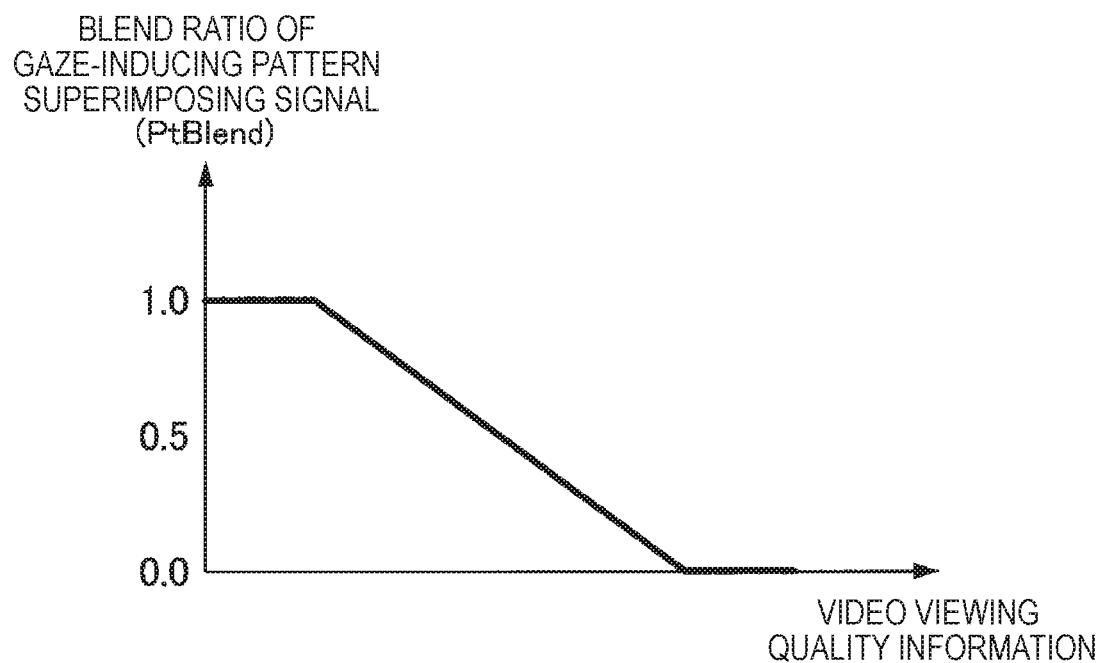
FIG. 23 is a graph showing an example of a relation between video viewing quality information and a blend ratio of a gaze-inducing pattern superimposed signal.

Next, a configuration of the quality improvement processing unit 130 of the information processing device 100 according to the present embodiment and a process performed thereby will be described with reference to FIGS. 14 to 23. Note that FIG. 14 is a functional block diagram showing a functional configuration of the quality improvement processing unit 130 according to the present embodiment. FIG. 15 is a flowchart showing a video viewing quality improving process performed by the quality improvement processing unit 130 according to the present embodiment. FIGS. 16 and 17 are illustrative diagrams showing examples of gaze-inducing pattern maps. FIG. 18 is a functional block diagram showing an example of a configuration of a gaze target region relative saliency image processing unit 131. FIG. 19 is a functional block diagram showing a configuration of functional units of the gaze target region relative saliency image processing unit 131. FIG. 20 is a graph showing an example of a relation between a gaze target map signal and a blend ratio of an image quality emphasizing signal. FIG. 21 is a functional block diagram showing a configuration of a gaze target region relative saliency synthesizing unit 135. FIG. 22 is a graph showing an example of a relation between video viewing quality information and a blend ratio of a relative saliency-processed video signal. FIG. 23 is a graph showing an example of a relation between video viewing quality information and a blend ratio of a gaze-inducing pattern superimposed signal.

(1) Functional Configuration

The quality improvement processing unit 130 according to the present embodiment includes a gaze target region relative saliency image processing unit 131, a gaze-inducing pattern map generation unit 133, and a gaze target region relative saliency synthesizing unit 135, as shown in FIG. 14.

The gaze target region relative saliency image processing unit 131 generates a relative saliency-processed video signal obtained by performing image processing to make a relatively salient gaze target region on the basis of an input video signal and gaze target region information (a gaze target map). This process of the gaze target region relative saliency image processing unit 131 will be described below in more detail. The gaze target region relative saliency image processing unit 131 outputs the generated relative saliency-processed video signal to the gaze target region relative saliency synthesizing unit 135.

The gaze-inducing pattern map generation unit 133 obtains a region of an original video in a quasi-wide angle video on the basis of an external signal, and generates a gaze-inducing pattern map in which a gaze-inducing pattern is set so that the region of the original video is included therein. The gaze-inducing pattern map is information indicating a region to be gazed at by a viewer. The gaze-inducing pattern map generation unit 133 outputs the generated gaze-inducing pattern map to the gaze target region relative saliency synthesizing unit 135.

The gaze target region relative saliency synthesizing unit 135 generates a viewing quality-improved video signal in which the saliency of a gaze target region is emphasized on the basis of the relative saliency-processed video signal, the gaze-inducing pattern map, input video signal, and video viewing quality information. The viewing quality-improved video signal is a video signal obtained by suppressing video motion sickness in the input video signal, and thus improving viewing quality thereof. The gaze target region relative saliency synthesizing unit 135 generates, for example, a viewing quality-improved video signal in which the saliency of a gaze target region is more emphasized as a value of the viewing quality information decreases (i.e., as a video includes a scene that is likely to easily induce video motion sickness). A viewer can comfortably view a high quality wide-field video on a wide screen at a wide viewing angle when the viewing quality-improved video signal is displayed on a display.

(2) Process Details

First, the gaze-inducing pattern map generation unit 133 of the quality improvement processing unit 130 shown in FIG. 14 generates a gaze-inducing pattern map on the basis of an external signal as shown in FIG. 15 (S121). The gaze-inducing pattern map generation unit 133 obtains a region of an original video expressed with an original signal whose angle of view is not yet widened to be a quasi-wide angle from the external signal, and generates a gaze-inducing pattern map on which a gaze-inducing pattern is set to surround the region.

When, for example, a region 18o of an original video is rectangular on a gaze-inducing pattern map 18, as shown in FIG. 16, a rectangular pattern 18p may be set to surround the region 18o of the original video. Alternatively, an oval pattern 18p may be set to surround the region 18o of the original video, as shown in FIG. 17, so that the gaze-inducing pattern map 18 may be generated. For example, map values of pixels on the gaze-inducing pattern map 18 may be set to be 0 to 255. In that case, a map value indicating a gaze target pattern 18p is a value close to 255. Note that, when the gaze-inducing pattern map 18 is a binary map, the gaze target pattern 18p is expressed with only 0 and 255, and when the gaze-inducing pattern map 18 includes gradation, the gaze target pattern 18p is expressed with values of 0 to 255.

The gaze-inducing pattern map generation unit 133 outputs the generated gaze-inducing pattern map 18 to the gaze target region relative saliency synthesizing unit 135.

Next, the gaze target region relative saliency image processing unit 131 generates a relative saliency-processed video signal obtained by performing image processing to make a relatively salient gaze target region on the basis of an input video signal and gaze target region information (a gaze target map) (S123). The gaze target region relative saliency image processing unit 131 is configured, for example, as shown in FIGS. 18 and 19, and performs image processing on an input quasi-wide angle video using image quality adjustment units 1311 to 1314.

An internal configuration of the gaze target region relative saliency image processing unit 131 includes, for example, an acutance adjustment unit 1311, a contrast adjustment unit 1312, a brightness adjustment unit 1313, and a saturation adjustment unit 1314, as shown in FIG. 18. The acutance adjustment unit 1311, the contrast adjustment unit 1312, the brightness adjustment unit 1313, and the saturation adjustment unit 1314 are connected in a cascade form, and thus an output of each of the image quality adjustment units is input to the next image quality adjustment unit. A form in which the image quality adjustment units perform processing in parallel and results thereof are combined at a later stage may of course be possible.

An internal configuration of each of the image quality adjustment units 1311 to 1314 can be expressed, for example, as a generalized image quality adjustment unit 131X shown in FIG. 19. The image quality adjustment unit 131X includes an image quality emphasizing unit 131X-1, an image quality suppressing unit 131X-2, and a relative image quality adjustment unit 131X-3.

That is, the image quality emphasizing unit 131X-1 of the acutance adjustment unit 1311 which performs an acutance emphasizing process performs, for example, an unsharp masking process or a super-resolution process to generate an image quality emphasizing signal. In addition, the image quality suppressing unit 131X-2 performs a smoothing process using a lowpass filter to generate an image quality suppressing signal.

The image quality emphasizing unit 131X-1 of the contrast adjustment unit 1312, which performs a contrast emphasizing process performs, for example, a contrast emphasizing process through an expansion of a dynamic range of histogram to generate the image quality emphasizing signal. In addition, the image quality suppressing unit 131X-2 performs a contrast suppressing process through a reduction of a dynamic range of histogram to generate the image quality-suppressed signal.

The image quality emphasizing unit 131X-1 of the brightness adjustment unit 1313, which performs a brightness emphasizing process performs, for example, an increasing process for a Y signal of a YUV signal or for a V signal of an HSV space to generate the image quality emphasizing signal. In addition, the image quality suppressing unit 131X-2 performs a reduction process for the Y signal of the YUV signal or for the V signal of the HSV space to generate the image quality suppressing signal.

The image quality emphasizing unit 131X-1 of the saturation adjustment unit 1314, which performs a saturation emphasizing process performs, for example, an increasing process for an S signal in an HSV space to generate the image quality emphasizing signal. In addition, the image quality suppressing unit 131X-2 performs a reduction process for the S signal in the HSV space to generate the image quality suppressing signal.

Then, the relative image quality adjustment unit 131X-3 of each of the image quality adjustment units 131X receives inputs of the image quality emphasizing signal generated by the image quality emphasizing unit 131X-1, the image quality suppressing signal generated by the image quality suppressing unit 131X-2, and the gaze target region information (the gaze target map). The relative image quality adjustment unit 131X-3 executes alpha blending of the image quality emphasizing signal and the image quality suppressing signal. The relative image quality adjustment unit 131X-3 performs the alpha blending of the image quality emphasizing signal and the image quality suppressing signal on the basis of, for example, a relation between a gaze target map signal and a blend ratio of the image quality emphasizing signal (EnhBlend), as shown in FIG. 20.

In FIG. 20, a signal value of the gaze target region information (the gaze target map) is set to increase as the blend ratio of the image quality emphasizing signal increases. For example, when the gaze target region information (the gaze target map) is set to have values 0 to 255, a value Mth of the gaze target map at which the blend ratio (EnhBlend) is 0.5 is set to, for example, 128.

By performing alpha blending using the blend ratio as described above, a region on the gaze target map having a higher value (e.g., the white regions 16Aa and 16Ba on the gaze target maps 16A and 16B in FIG. 8) has more emphasized image quality (e.g., contrast, acutance, saturation, brightness, etc.). Conversely, a region on the gaze target map having a smaller value (the dark regions 16Ab and 16Bb on the gaze target maps 16A and 16B in FIG. 8) has suppressed image quality.

Note that, in the configuration of the image quality adjustment unit 131X shown in FIG. 19, either the image quality emphasizing signal or the image quality suppressing signal may be an output signal which is an input signal from the image quality adjustment unit 131X of the previous stage passed therethrough as it is.

The relative saliency-processed video signal generated by the gaze target region relative saliency image processing unit 131 as described above is output to the gaze target region relative saliency synthesizing unit 135.

Returning to the description of FIG. 15, when the processes of Steps S121 and S123 end, the gaze target region relative saliency synthesizing unit 135 generates a viewing quality-improved video signal in which the saliency of a gaze target region is emphasized on the basis of the relative saliency-processed video signal, the gaze-inducing pattern map, the input video signal, and the video viewing quality information (S125).

When described in detail, the gaze target region relative saliency synthesizing unit 135 includes, for example, a gaze target region relative salient image intensity adjustment unit 1351 and a gaze-inducing pattern intensity adjustment unit 1353, as shown in FIG. 21.

The gaze target region relative salient image intensity adjustment unit 1351 performs alpha blending on the basis of the input video signal, the relative saliency-processed video signal, and the video viewing quality information to generate a gaze target region relative salient image intensity adjusting signal. The gaze target region relative salient image intensity adjustment unit 1351 performs, for example, alpha blending of the input video signal and the relative saliency-processed video signal on the basis of a relation between the video viewing quality information and a blend ratio of the relative saliency-processed video signal (SalBlend), as shown in FIG. 22. In FIG. 22, the blend ratio of the relative saliency-processed video signal is set to increase as a value of the video viewing quality information decreases. The gaze target region relative salient image intensity adjustment unit 1351 outputs the gaze target region relative salient image intensity adjusting signal generated by the alpha blending to the gaze-inducing pattern intensity adjustment unit 1353.

The gaze-inducing pattern intensity adjustment unit 1353 includes a gaze-inducing pattern superimposing unit 1353a and a gaze-inducing pattern viewing quality improving unit 1353b, as shown in FIG. 21. The gaze-inducing pattern superimposing unit 1353a generates a gaze-inducing pattern superimposed signal on the basis of a gaze target region relative salient image intensity adjusting signal and a gaze-inducing pattern map. The gaze-inducing pattern superimposed signal is a video signal obtained by superimposing a gaze-inducing pattern indicated on the gaze-inducing pattern map on a video of the gaze target region relative salient image intensity adjusting signal. The gaze-inducing pattern superimposing unit 1353a performs alpha blending on a pixel value of color (e.g., red) for drawing a pre-designated gaze target pattern and a pixel value of the gaze target region relative salient image intensity adjusting signal at a blend ratio having a value obtained by normalizing the gaze-inducing pattern map to values of 0.0 to 1.0.

It is assumed that, for example, values of R, and B colors for drawing the gaze target pattern are Rp, Gp, and Bp, and values of specific R, and B pixels of the gaze target region relative salient image intensity adjusting signal are Re, Ge, and Be. At this time, for example, if a value on the gaze-inducing pattern map corresponding to the same spatial position as a pixel of the gaze target region relative salient image intensity adjusting signal is 0.9, values Rs, Gs, and Bs of the gaze-inducing pattern superimposed signal are calculated as follows.

$Rs=0.9\times Rp+0.1\times Re$ $Gs=0.9\times Gp+0.1\times Ge$ $Bs=0.9\times Bp+0.1\times Be$ The gaze-inducing pattern superimposing unit 1353a outputs an image generated through the alpha blending to the gaze-inducing pattern viewing quality improving unit 1353b as a gaze-inducing pattern superimposing signal.

The gaze-inducing pattern viewing quality improving unit 1353b performs alpha blending of the gaze-inducing pattern superimposed signal and the gaze target region relative salient image intensity adjusting signal to generate a viewing quality improving video signal. For example, the gaze-inducing pattern viewing quality improving unit 1353b performs the alpha blending of the gaze-inducing pattern superimposed signal and the gaze target region relative salient image intensity adjusting signal on the basis of a relation between the video viewing quality information and a blend ratio (PtBlend) of the gaze-inducing pattern superimposed signal, as shown in FIG. 23. In FIG. 23, the blend ratio of the gaze-inducing pattern superimposed signal is set increase as a value of the video viewing quality information decreases. By performing alpha blending as described above, a more salient gaze-inducing pattern superimposed on a gaze target region can be obtained as a value of the video viewing quality information decreases (i.e., as a video has a scene that is likely to easily induce video motion sickness). Specifically, a more salient gaze-inducing pattern superimposed on a gaze target region can be obtained as a color of the gaze-inducing pattern superimposed of the gaze target region darkens.

When a quasi-wide angle video includes a video that is likely to induce video motion sickness, a region of an original video can be made to be more conspicuous than a region of an externally inserted predictive video by performing image quality adjustment and superimposition of a pattern on the region of the original video as described above. Accordingly, it is possible to provide a quasi-wide angle video that suppresses video motion sickness and has improved viewing quality.

The configuration of the quality improvement processing unit 130 according to the present embodiment and the process performed thereby have been described above.

[1.5. Conclusion]

The information processing device 100 according to the first embodiment of the present disclosure and the image signal processing performed thereby have been described above. According to the present embodiment, when a quasi-wide angle video to be viewed is analyzed with respect to a viewing environment and a video signal and the quasi-wide angle video includes a video that is likely to induce video motion sickness, image quality adjustment and superimposition of a pattern are performed on a region of the original video so that the region can be more conspicuous than a region of an externally inserted predictive video. By displaying a viewing quality-improved video signal generated as described above on a display, a viewer can comfortably view a high quality wide-field video on a wide screen at a wide viewing angle.

<2. Second Embodiment>

Next, an information processing device according to a second embodiment of the present disclosure and image signal processing performed thereby will be described with reference to FIGS. 24 to 30. In the present embodiment, an input video signal is assumed to be of a video produced at a wide angle of view (a wide-angle captured video, a panoramic video, a whole-sky video, an entire-celestial-sphere video, a free view point video, a game content video, and the like, which will be referred to as a "wide-field video"). In addition, an external signal includes, with respect to wide-field video data, cropping coordinate information for designating a region to be displayed on a display through a user interaction operation and gaze target region information on the display designated through a user interaction operation. Below, an information processing device 200 which generates a viewing quality-improved video signal for a wide-field video which suppresses video motion sickness and entails a favorable video viewing condition, and image signal processing performed thereby will be described.

[2.1. Schematic Configuration of Information Processing Device]

Figure 24:
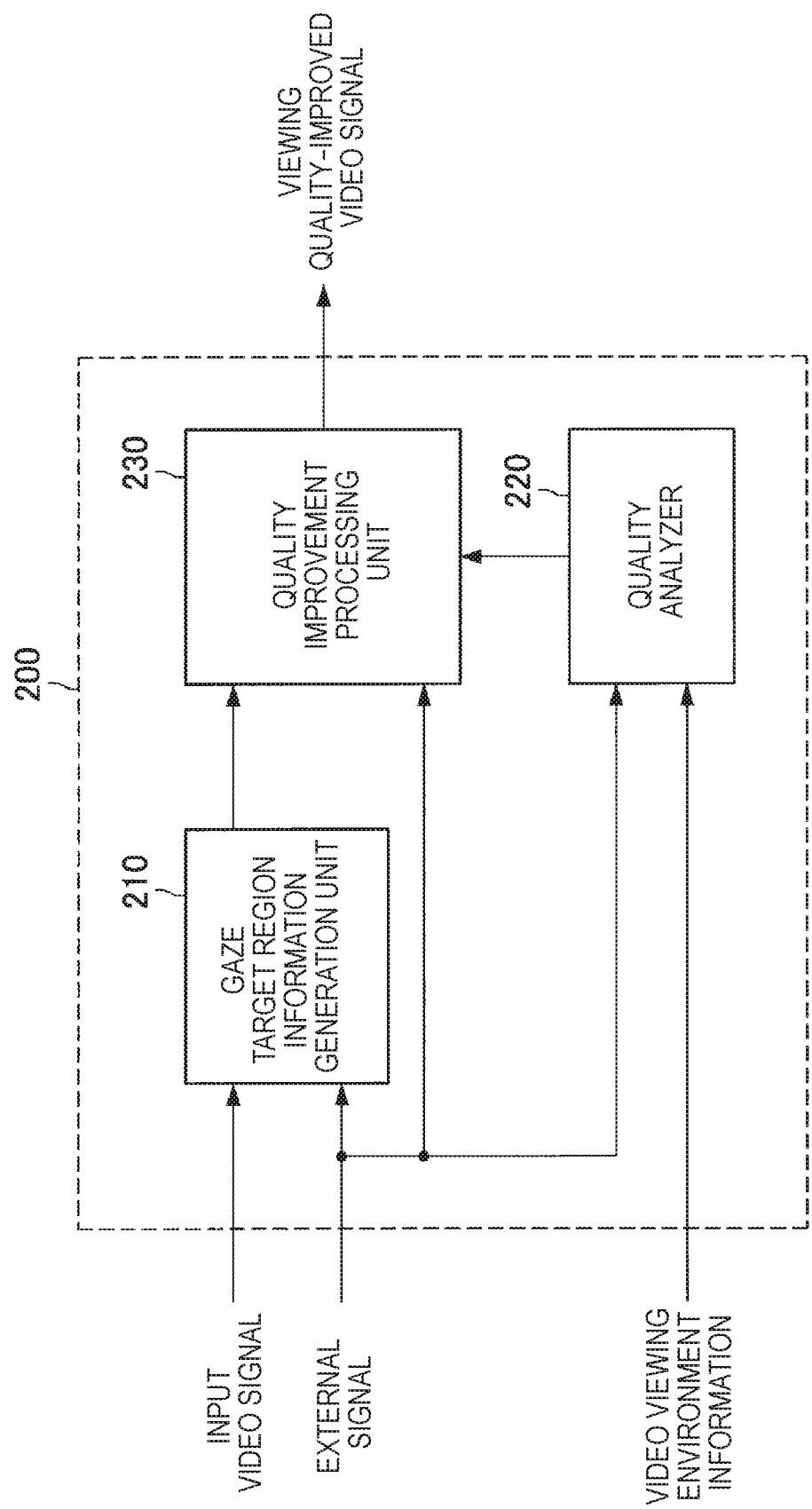
FIG. 24 is a functional block diagram showing a schematic configuration of an information processing device according to a second embodiment of the present disclosure.
Figure 25:
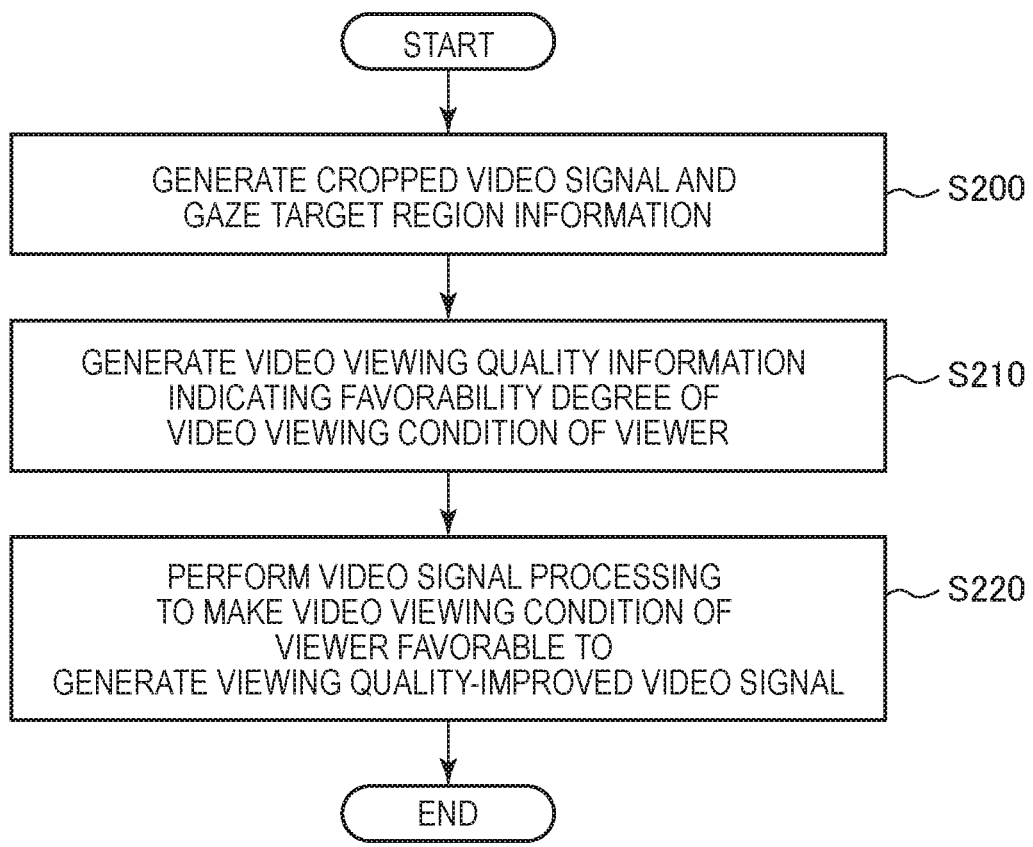
FIG. 25 is a flowchart showing an overview of image signal processing performed by the information processing device according to the embodiment.

First, a schematic configuration of the information processing device according to the second embodiment of the present disclosure will be described with reference to FIGS. 24 and 25. Note that FIG. 24 is a functional block diagram showing a schematic configuration of the information processing device 200 according to the present embodiment. FIG. 25 is a flowchart showing an overview of image signal processing performed by the information processing device 200 according to the present embodiment. Detailed description with respect to the same configuration and the same function as the information processing device 100 according to the first embodiment will be omitted below.

The information processing device 200 according to the present embodiment is constituted by a gaze target region information generation unit 210, a quality analyzer 220, and a quality improvement processing unit 230, as shown in FIG. 24.

The gaze target region information generation unit 210 estimates a cropped video signal of a wide-field video, which indicates a region to be displayed on a display, and a gaze target region at which a viewer is likely to gaze (or is gazing) on the basis of an input video signal and an external signal, and sets the signal and the region as gaze target region information. The generated gaze target region information is output to the quality improvement processing unit 230.

The quality analyzer 220 generates video viewing quality information indicating a degree of a favorability degree of a video viewing condition of a viewer on the basis of the external signal and video viewing environment information. The quality analyzer 220 analyzes a degree of a viewing environment state of a video affecting viewing quality of the video and generates the video viewing quality information. The video viewing quality information is also assumed to indicate viewing quality that may induce video motion sickness in the present embodiment.

The quality improvement processing unit 230 performs video signal processing so that a video viewing condition of the viewer is favorable on the basis of the cropped video signal, the external signal, the gaze target region information, and the video viewing quality information to generate a viewing quality-improved video signal.

First, the gaze target region information generation unit 210 of the information processing device 200 first generates the cropped video signal and gaze target region information from the input video signal and the external signal input from the outside as shown in FIG. 25 (S200). Note that details of processes of generating the information will be described below. The gaze target region information generation unit 210 outputs the generated cropped video signal and the gaze target region information to the quality improvement processing unit 230.

Meanwhile, the quality analyzer 220 generates the video viewing quality information indicating a favorability degree of a video viewing condition of a viewer from the input video signal and the video viewing environment information input from outside (S210). The quality analyzer 220 outputs the generated video viewing quality information to the quality improvement processing unit 230.

Then, the quality improvement processing unit 230 performs video signal processing with the cropped video signal, the external signal, the gaze target region information, and the video viewing quality information so that the video viewing condition of the viewer is favorable to generate a final viewing quality improving video signal (S220).

When a wide-field video is viewed in accordance with a user interaction operation, a viewing environment and a user interaction operation are analyzed, and the wide-field video is likely to induce video motion sickness, a gaze target region displayed on a display can be made conspicuous through image quality adjustment and superimposition of a pattern by performing the image signal processing as described above. Accordingly, video motion sickness that a viewer not performing the user interaction operation may suffer can be suppressed and viewing quality can be improved. Functions of the constituent elements will be described below in detail.

[2.2. Gaze Target Region Information Generation Process]

Figure 26:
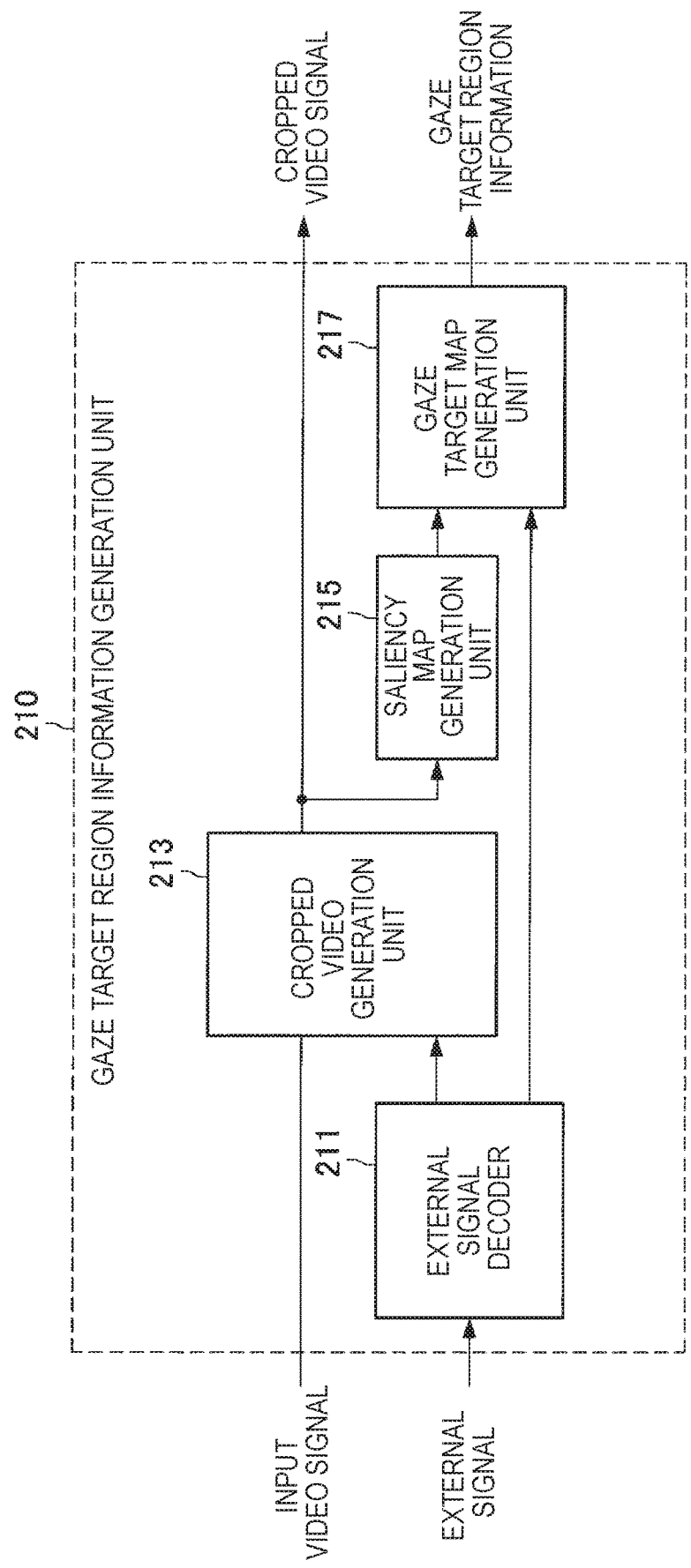
FIG. 26 is a functional block diagram showing a functional configuration of a gaze target region information generation unit according to the embodiment.
Figure 27:
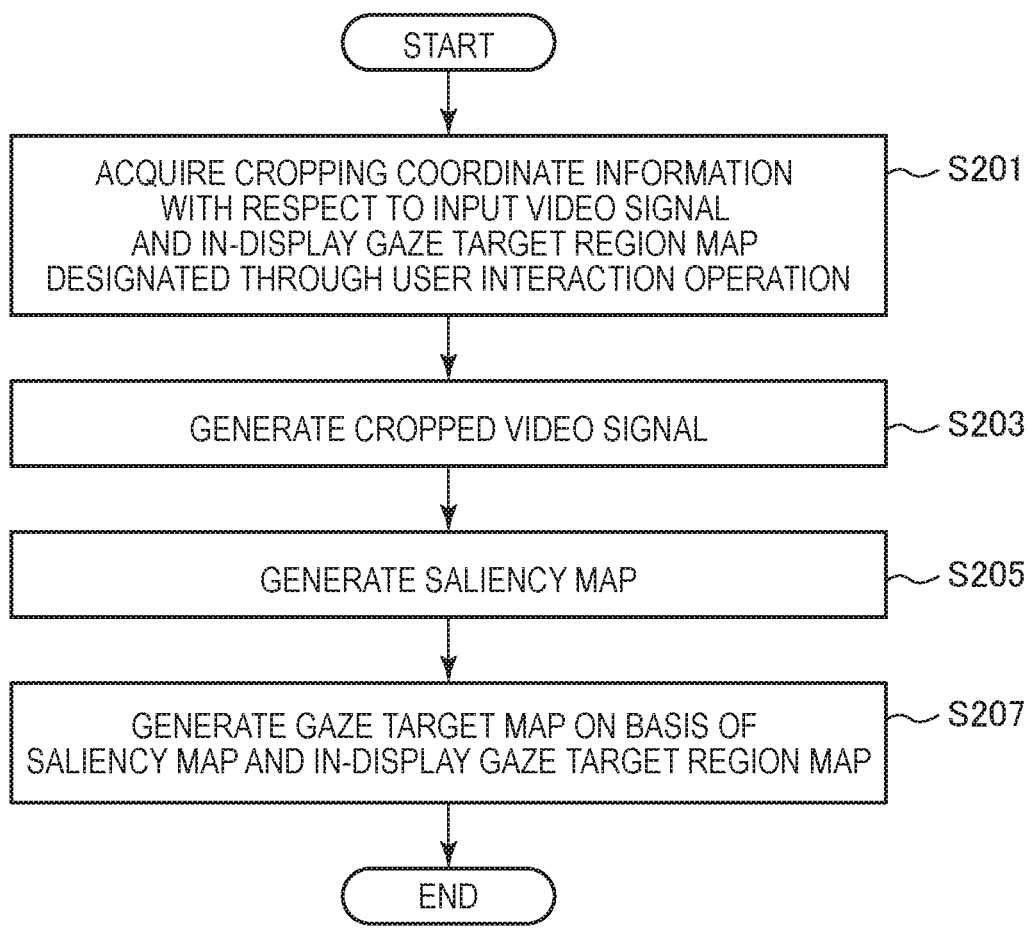
FIG. 27 is a flowchart showing a gaze target region information generation process performed by the gaze target region information generation unit according to the embodiment.

First, the gaze target region information generation unit 210 of the information processing device 200 according to the present embodiment and a process performed thereby will be described below with reference to FIGS. 26 and 27. Note that FIG. 26 is a functional block diagram showing a functional configuration of the gaze target region information generation unit 210 according to the present embodiment. FIG. 27 is a flowchart showing a gaze target region information generation process performed by the gaze target region information generation unit 210 according to the present embodiment.

(1) Functional Configuration

The gaze target region information generation unit 210 according to the present embodiment includes an external signal decoder 211, a cropped video generation unit 213, a saliency map generation unit 215, and a gaze target map generation unit 217, as shown in FIG. 26.

The external signal decoder 211 acquires cropping coordinate information and an in-display gaze target region map, which is gaze target region information on a display from an external signal, and outputs the information and the map to the cropped video generation unit 213 or the gaze target map generation unit 217. The cropping coordinate information and the in-display gaze target region information are information included in the external signal.

The cropped video generation unit 213 uses an input video signal to generate trimmed partial image data on the basis of the cropping coordinate information. The cropped video generation unit 213 performs a predetermined process on the partial image data, generates a cropped video signal, and then outputs the signal to the saliency map generation unit 215.

The saliency map generation unit 215 detects a characteristic subject region that easily draws attention from people from the cropped video signal, and thus generates a saliency map which represents a subject region detected in the video. The saliency map generation unit 215 can operate like the saliency map generation unit 111 of the first embodiment except for generating a saliency map from a cropped video signal instead of an input video signal. The saliency map generation unit 215 outputs the saliency map created using the detected subject region to the gaze target map generation unit 217 as a saliency map signal.

The gaze target map generation unit 217 generates a gaze target map (gaze target region information) that represents a region to be gazed at by a viewer on the basis of the saliency map and the in-display gaze target region information. The gaze target map generation unit 217 can operate similarly to the gaze target map generation unit 115 according to the first embodiment except for generating the gaze target map from the in-display gaze target region information instead of a signal identification map signal.

(2) Process Details

First, the external signal decoder 211 of the gaze target region information generation unit 210 shown in FIG. 26 first acquires cropping coordinate information and an in-display gaze target region map, which is in-display gaze target region information from an input external signal (S201). The in-display gaze target region map may have, for example, a binary signal expressed by 1 and 0 or consecutive values of 0 to 255. The external signal decoder 211 outputs the cropping coordinate information to the cropped video generation unit 213 and outputs the in-display gaze target region map to the gaze target map generation unit 217.

Then, the cropped video generation unit 213 generates a cropped video signal on the basis of an input video signal and the cropping coordinate information (S203). The cropped video generation unit 213 trims a region specified with the cropping coordinate information from a wide-field video indicated by the input video signal as partial image data. The cropped video generation unit 213 performs a scaling process on the partial image data in accordance with a resolution of the display to generate a cropped video signal. Note that the scaling process may be executed in accordance with a resolution of a display as well as with, for example, a pre-set resolution in a system to which a scaler, which performs an output with a resolution of a display, is likely to be connected in a later stage. The cropped video signal generated by the cropped video generation unit 213 is output to the saliency map generation unit 215.

Then, the saliency map generation unit 215 detects a subject region that easily draws attention of people from the cropped video signal and generates a saliency map (S205). The saliency map generation unit 215 detects a position and a size of the subject region as in the first embodiment, and then generates the saliency map on the basis of values of and likelihoods of the position and the size. The saliency map generation unit 215 outputs the generated saliency map to the gaze target map generation unit 217 as a saliency map signal.

Then, the gaze target map generation unit 217 generates a gaze target map on the basis of the saliency map and the in-display gaze target region map (S207). The gaze target map generation unit 217 generates a smoothing filter and creates the gaze target map by performing a smoothing process on the in-display gaze target region map as in the first embodiment. Note that the gaze target region map generated in the present embodiment is an in-display gaze target region map designated through a user interaction operation, and thus the map is not necessarily disposed at the center of a display and a size thereof may be specified by a user. Thus, when the in-display gaze target region map is the same signal identification map signal as that of FIG. 8, the gaze target region information (the gaze target map) is the same as the gaze target map shown in FIG. 8.

The configuration of the gaze target region information generation unit 210 according to the present embodiment and the process performed thereby have been described above.

[2.3. Video Viewing Quality Analysis Process]

Figure 28:
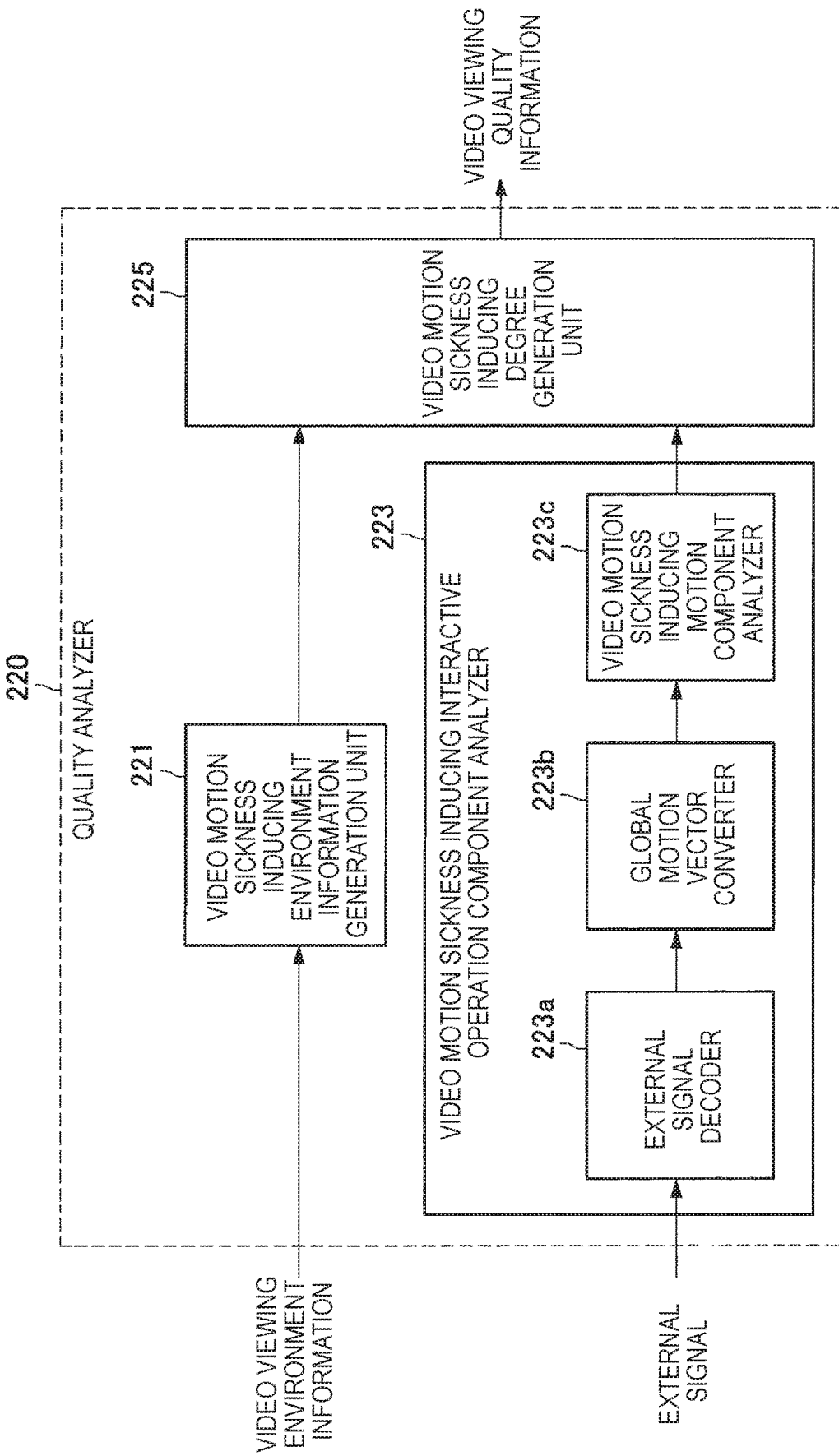
FIG. 28 is a functional block diagram showing a functional configuration of a quality analyzer according to the embodiment.
Figure 29:
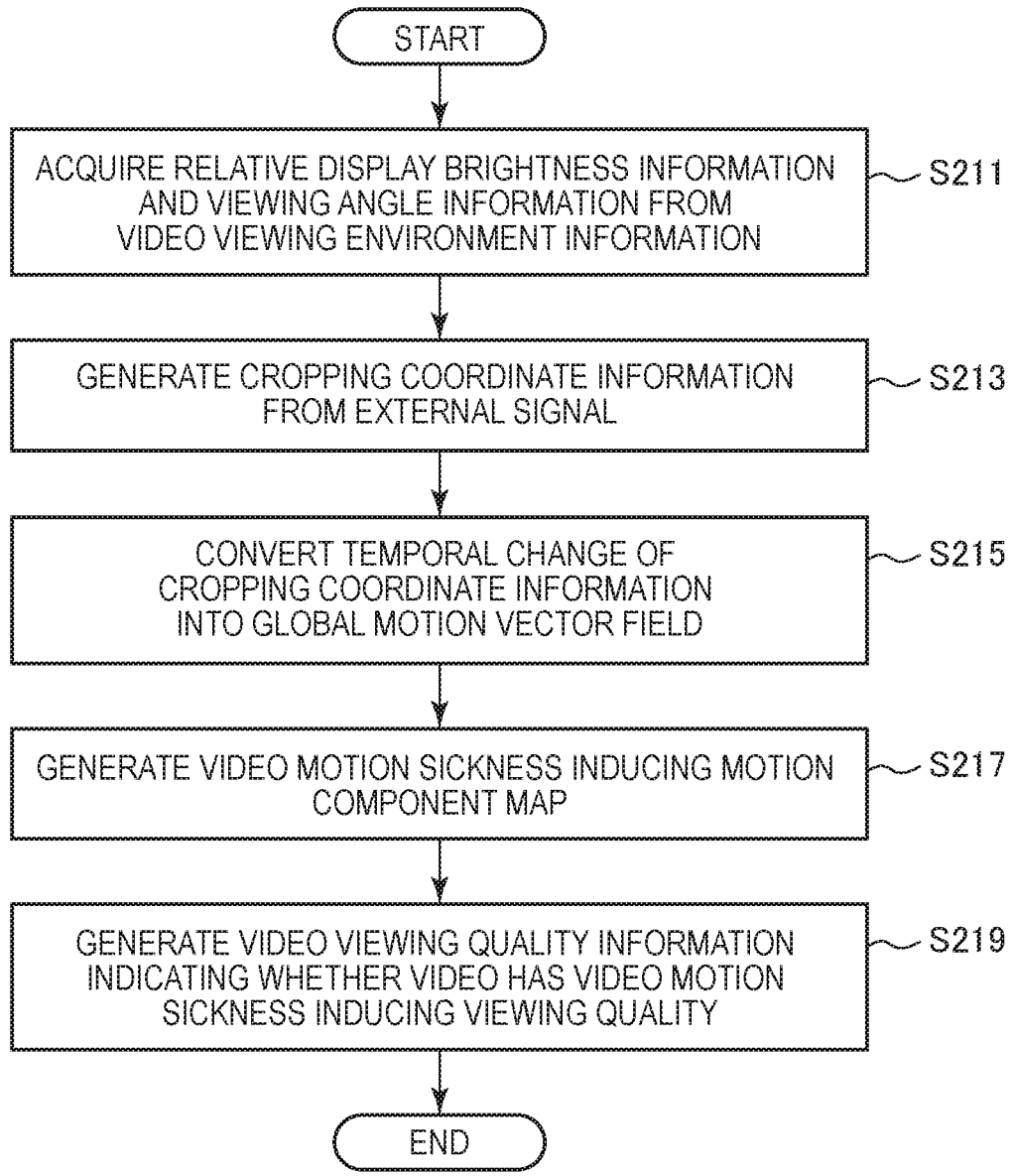
FIG. 29 is a flowchart showing a video viewing quality analysis process performed by the quality analyzer according to the embodiment.
Figure 30:
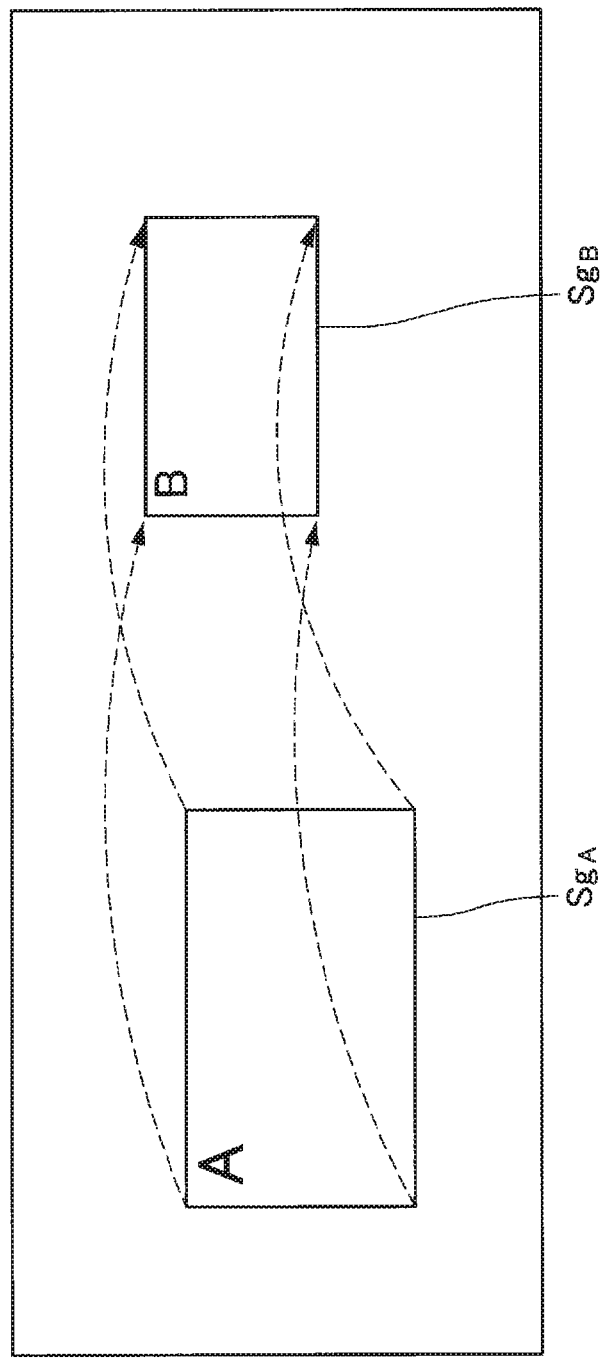
FIG. 30 is an illustrative diagram for describing a conversion process from a temporal change of cropping coordinate information into a global motion vector field.

Next, a configuration of the quality analyzer 220 of the information processing device 200 according to the present embodiment and a process performed thereby will be described with reference to FIGS. 28 to 30. Note that FIG. 28 is a functional block diagram showing a functional configuration of the quality analyzer 220 according to the present embodiment. FIG. 29 is a flowchart showing a video viewing quality analysis process performed by the quality analyzer 220 according to the present embodiment. FIG. 30 is an illustrative diagram for describing a conversion process from a temporal change of cropping coordinate information into a global motion vector field.

(1) Functional Configuration

The quality analyzer 220 according to the present embodiment includes a video motion sickness inducing environment information generation unit 221, a video motion sickness inducing interactive operation component analyzer 223, and a video motion sickness inducing degree generation unit 225, as shown in FIG. 28.

The video motion sickness inducing environment information generation unit 221 generates relative display brightness information and viewing angle information on the basis of video environment information. The video motion sickness inducing environment information generation unit 221 operates similarly to the video motion sickness inducing environment information generation unit 121 of the first embodiment. The video motion sickness inducing environment information generation unit 221 outputs the generated relative display brightness information and viewing angle information to the video motion sickness inducing degree generation unit 225.

The video motion sickness inducing interactive operation component analyzer 223 analyzes a characteristic of a motion vector of a video from a control signal of an interactive operation on the basis of an external signal, and then generates a video motion sickness inducing motion component map. The video motion sickness inducing interactive operation component analyzer 223 includes an external signal decoder 223a, a global motion vector converter 223b, and a video motion sickness inducing motion component analyzer 223c, as shown in FIG. 28.

The external signal decoder 223a acquires cropping coordinate information from the external signal. The external signal decoder 223a operates similarly to the external signal decoder 211 of the gaze target region information generation unit 210 shown in FIG. 26.

The global motion vector converter 223b converts a temporal change of the cropping coordinate information into a global motion vector field. The global motion vector converter 223b regards the temporal change of the cropping coordinate information as a motion of an entire screen with respect to a cropping video signal (e.g., a global motion), and calculates a motion vector at each position on a display screen. These motion vectors facilitate the generation of the global motion vector field.

The video motion sickness inducing motion component analyzer 223c generates a video motion sickness inducing motion component map on the basis of the global motion vector field generated by the global motion vector converter 223b. The video motion sickness inducing motion component analyzer 223c outputs the generated video motion sickness inducing motion component map to the video motion sickness inducing degree generation unit 225.

The video motion sickness inducing degree generation unit 225 generates video viewing quality information indicating whether the video has video motion sickness inducing viewing quality. The video motion sickness inducing degree generation unit 225 operates similarly to the video motion sickness inducing degree generation unit 125 of the first embodiment.

(2) Process Details

First, the video motion sickness inducing environment information generation unit 221 of the quality analyzer 220 shown in FIG. 28 first generates relative display brightness information and viewing angle information from video viewing environment information as shown in FIG. 29 (S211). The process of Step S211 is performed similarly to that of Step S111 of FIG. 11. The video motion sickness inducing environment information generation unit 221 outputs the generated relative display brightness information and viewing angle information to the video motion sickness inducing degree generation unit 225.

Next, the video motion sickness inducing interactive operation component analyzer 223 generates a video motion sickness inducing motion component map. The video motion sickness inducing interactive operation component analyzer 223 acquires cropping coordinate information from an external signal using the external signal decoder 223a (S213). Then, the global motion vector converter 223b converts a temporal change of the cropping coordinate information into a global motion vector field (S215). The global motion vector converter 223b regards the temporal change of the cropping coordinate information as a motion of an entire screen with respect to a cropping video signal (e.g., a global motion) and calculates a motion vector at each position on a display screen.

For example, the global motion vector converter 223b decides a motion parameter from the temporal change of the cropping coordinate information (a mapping correspondence between four vertexes of each of a rectangle SgA and a rectangle SgB of FIG. 30) using an affine transformation, a projective transformation, or the like, as shown in FIG. 30 and calculates a motion vector at each position on the display screen. These motion vectors facilitate the generation of the global motion vector field.

When the global motion vector field is generated in Step S215, the video motion sickness inducing motion component analyzer 223c generates a video motion sickness inducing motion component map on the basis of the global motion vector field (S217). The video motion sickness inducing motion component analyzer 223c may generate the video motion sickness inducing motion component map similarly to, for example, the video motion sickness inducing motion component analyzer 123 of the first embodiment. Note that this process of the video motion sickness inducing motion component analyzer 223c is equivalent to a process obtained by excluding detection of a motion vector by using a video signal from the process of the video motion sickness inducing motion component analyzer 123 of the first embodiment. That is, the video motion sickness inducing motion component analyzer 223c acquires a motion vector from a control signal of an interactive operation instead of a video signal. The video motion sickness inducing motion component analyzer 223c outputs the generated video motion sickness inducing motion component map to the video motion sickness inducing degree generation unit 225.

Then, the video motion sickness inducing degree generation unit 225 generates video viewing quality information indicating whether a video has video motion sickness inducing viewing quality on the basis of the relative display brightness information, the viewing angle information, and the video motion sickness inducing motion component map (S219). The process of Step S219 is performed similarly to that of Step S115 of FIG. 11.

The configuration of the quality analyzer 220 according to the present embodiment and the process performed thereby have been described above.

[2.4. Video Viewing Quality Improvement Processing Unit]

Next, the quality improvement processing unit 230 of information processing device 200 according to the present embodiment will be described. The quality improvement processing unit 230 according to the present embodiment can be configured similarly to that of the first embodiment, as shown in FIG. 14. However, there is a difference with respect to the gaze-inducing pattern map generation unit 133 in that an in-display gaze target region of the present embodiment corresponds to the region representing the original video of the gaze-inducing pattern map 18 of the first embodiment (the dotted-lined region 18o representing the original video of the gaze-inducing pattern map 18 shown in FIGS. 16 and 17). Other processes thereof are similar to those of the first embodiment.

The configuration of the quality improvement processing unit 230 according to the present embodiment and the process performed thereby have been described above.

[2.5. Conclusion]

The information processing device 200 according to the second embodiment of the present disclosure and image signal processing performed thereby have been described above. According to the present embodiment, when a wide-field video is viewed in accordance with a user interaction operation, a viewing environment and the user interaction operation are analyzed, and the video is likely to induce video motion sickness, a gaze target region displayed on a display is made to be conspicuous through image quality adjustment and superimposition of a pattern. Accordingly, video motion sickness that a viewer who is not operating the user interaction operation may suffer can be suppressed and viewing quality can be improved.

Note that the case in which a wide-field video is viewed through the user interaction operation is assumed in the above description, but the present disclosure is not limited thereto. For example, information of a user interaction operation may be generated by a content producer in advance or generated by analyzing a line of sight of another viewer in advance. (e.g., Non-Patent Literature: "Gaze-driven Video Re-editing," Eakta Jain, Yaser Sheikh, Ariel Shamir, Jessica Hodgins, ACM Transactions on Graphics (TOG), 2014). Alternatively, information generated with an external video analyzing block that realizes automatic camera work may be used as the information of a user interaction operation (e.g., Non-Patent Literature: "Video retargeting: automating pan and scan," MULTIMEDIA '06 Proceedings of the 14th annual ACM international conference on Multimedia, Pages 241 to 250). In this case, this information can be added to a wide-field video as metadata.

<3. Third Embodiment>

Next, an information processing device according to a third embodiment of the present disclosure and image signal processing performed thereby will be described with reference to FIGS. 31 to 40. In the present embodiment, an input video signal is assumed to be of a video produced at a wide angle of view (a wide-angle captured video, a panoramic video, a whole-sky video, an entire-celestial-sphere video, a free view point video, a game content video, and the like, which will be referred to as a "wide-field video") as in the second embodiment. In addition, an external signal includes, with respect to wide-field video data, cropping coordinate information for designating a region to be displayed on a display through a user interaction operation and gaze target region information on the display designated through a user interaction operation. In the present embodiment, a case in which, in order to avoid video motion sickness, a video motion sickness prevention process is executed on a wide-field video that is likely to induce video motion sickness when displayed as instructed by a user interaction operation of a viewer instead of the video being displayed as instructed by the user interaction operation will be described.

[3.1. Schematic Configuration of Information Processing Device]

Figure 31:
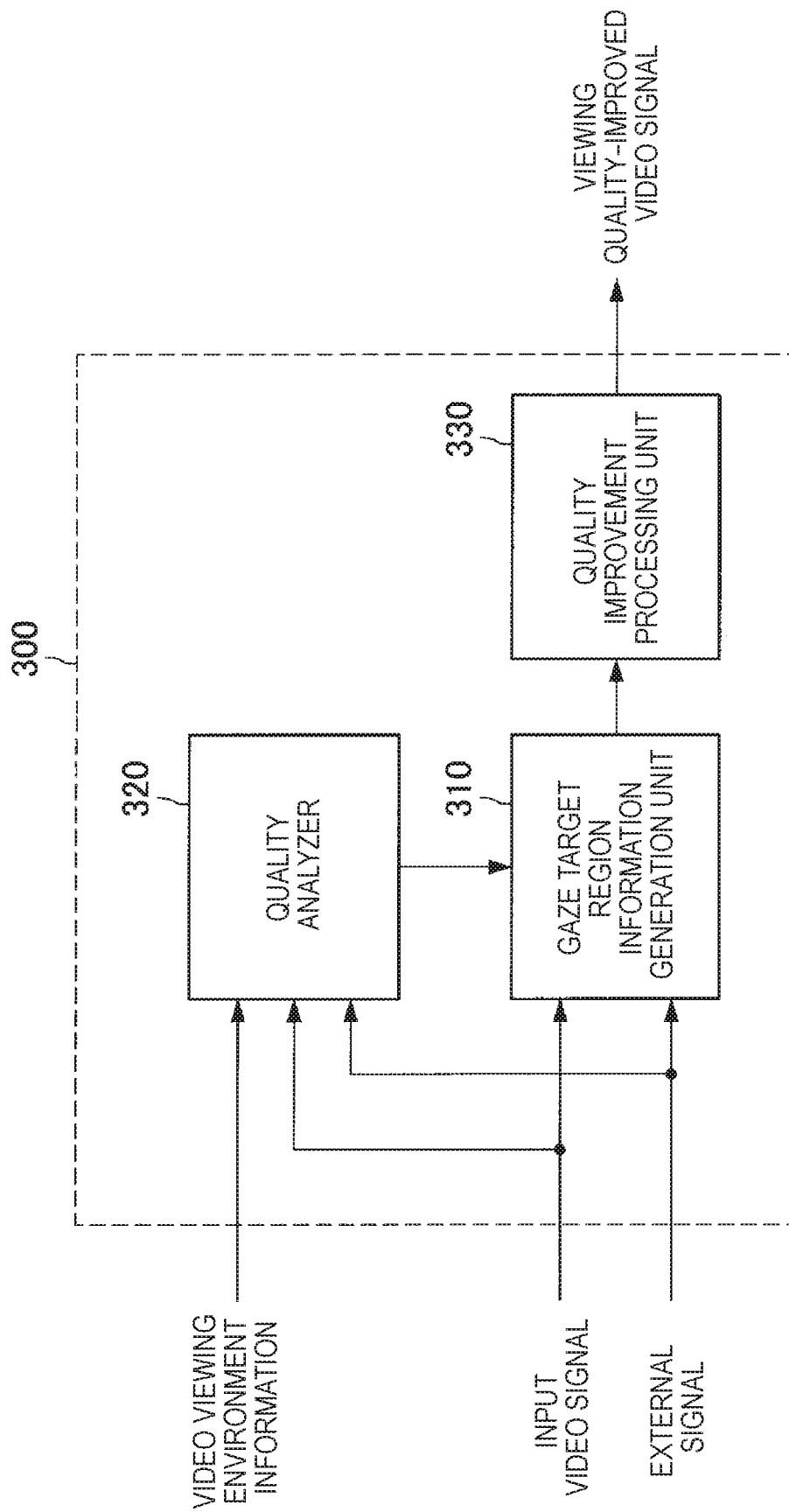
FIG. 31 is a functional block diagram showing a schematic configuration of an information processing device according to a third embodiment of the present disclosure.
Figure 32:
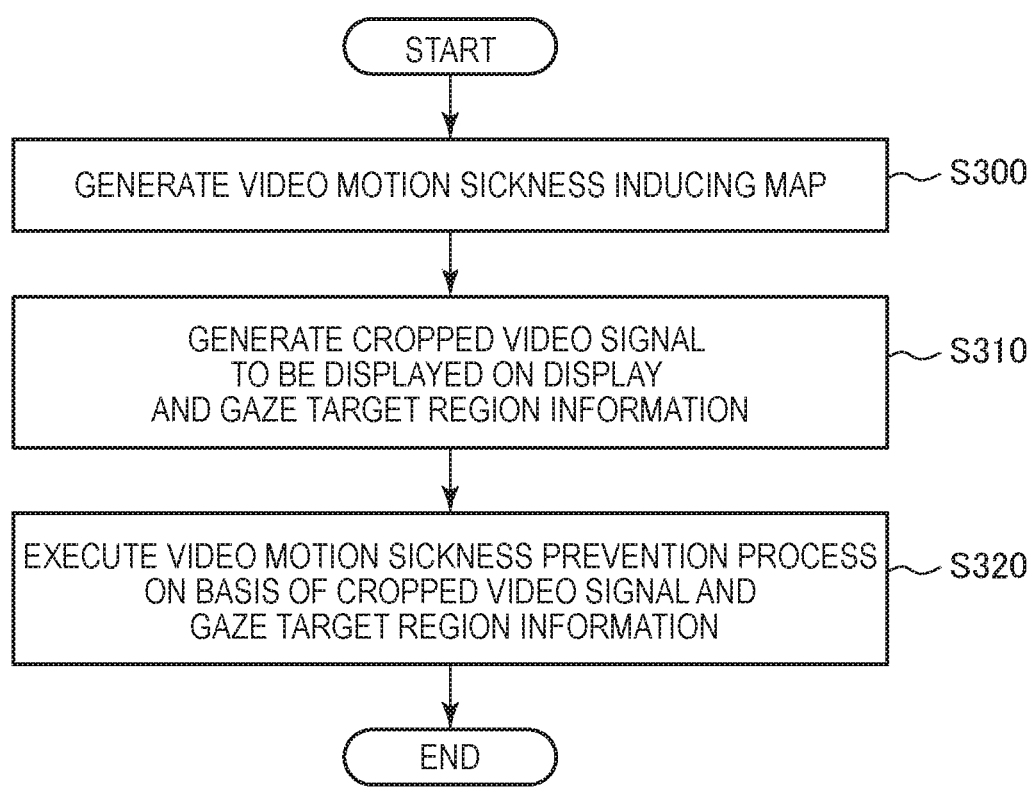
FIG. 32 is a flowchart showing an overview of image signal processing performed by the information processing device according to the embodiment.

First, a schematic configuration of an information processing device according to a third embodiment of the present disclosure will be described with reference to FIGS. 31 and 32. Note that FIG. 31 is the schematic configuration of the information processing device 300 according to the present embodiment. FIG. 32 is a flowchart showing an overview of image signal processing performed by the information processing device 300 according to the present embodiment. Detailed description on the same configuration and the same functions as the information processing devices 100 and 200 according to the first and second embodiments will be omitted.

The information processing device 300 according to the present embodiment includes a gaze target region information generation unit 310, a quality analyzer 320, and a quality improvement processing unit 330, as shown in FIG. 31.

The gaze target region information generation unit 310 outputs a cropped video signal indicating a region of a wide-field video to be displayed on a display and gaze target region information on the basis of an input video signal, an external signal, and a video motion sickness inducing degree map generated by the quality analyzer 320, which will be described below. The gaze target region information generation unit 310 outputs the generated cropped video signal and gaze target region information to the quality improvement processing unit 330.

The quality analyzer 320 generates a video motion sickness inducing degree map which represents levels of ease with which regions of the video displayed on the display may induce video motion sickness due to a user interaction operation of a viewer on the basis of the input video signal, the external signal, and video viewing environment information. The quality analyzer 320 outputs the generated video motion sickness inducing degree map to the gaze target region information generation unit 310.

The quality improvement processing unit 330 executes the video motion sickness prevention process on the basis of the cropped video signal and the gaze target region information so that video motion sickness is not induced, and generates a viewing quality-improved video signal. In the video motion sickness prevention process, for example, a forced mask display in which a video region that is likely to easily induce video motion sickness is forcedly masked or an alarm display in which the fact that the video to be displayed on the display includes a scene that may cause video motion sickness is indicated is performed.

First, the quality analyzer 320 of the information processing device 300 generates a video motion sickness inducing degree map on the basis of an input video signal, an external signal, and video viewing environment information, as shown in FIG. 32 (S300). The quality analyzer 320 outputs the generated video motion sickness inducing degree map to the gaze target region information generation unit 310. The video motion sickness inducing degree map is an image that represents levels of ease with which regions of a video displayed on a display may induce video motion sickness due to a user interaction operation of a viewer as described above.

Next, the gaze target region information generation unit 310 generates a cropped video signal and gaze target region information on the basis of the input video signal, the external signal, and the video motion sickness inducing degree map (S310). The gaze target region information generation unit 310 outputs the generated cropped video signal and gaze target region information to the quality improvement processing unit 330.

Then, the quality improvement processing unit 330 executes the video motion sickness prevention process on the basis of the cropped video signal and gaze target region information and generates a viewing quality-improved video signal (S320).

In the image signal processing, in order to avoid video motion sickness, the video motion sickness prevention process is executed on a wide-field video that is likely to induce video motion sickness when displayed as instructed by a user interaction operation of a viewer instead of displaying the video as instructed by the user interaction operation. Accordingly, video motion sickness that the viewer may suffer due to an erroneous user interaction operation or the like can be suppressed and viewing quality can be improved. Functions of constituent elements will be described below in detail.

[3.3. Video Viewing Quality Analysis Process]

Figure 33:
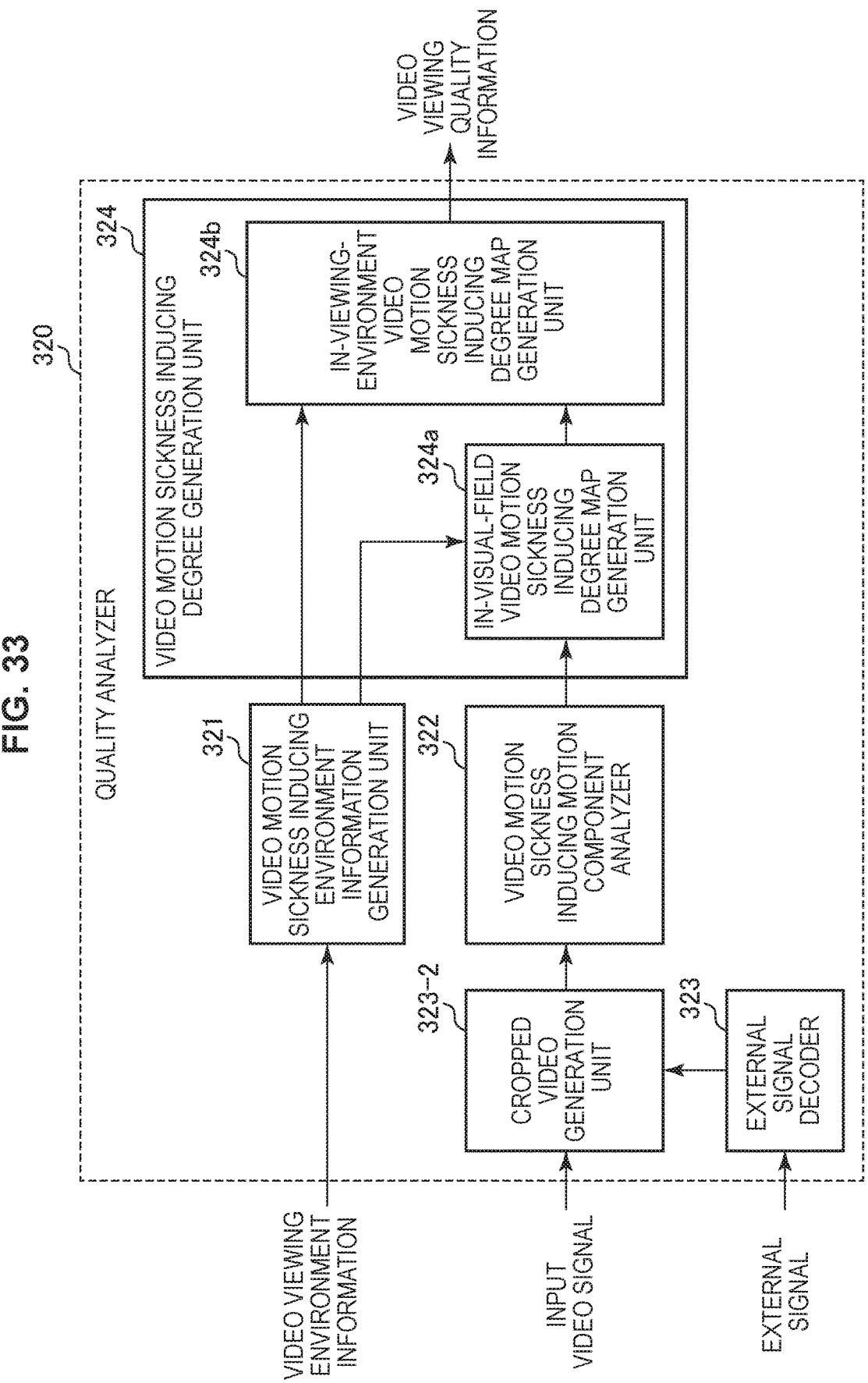
FIG. 33 is a functional block diagram showing a functional configuration of a quality analyzer according to the embodiment.
Figure 34:
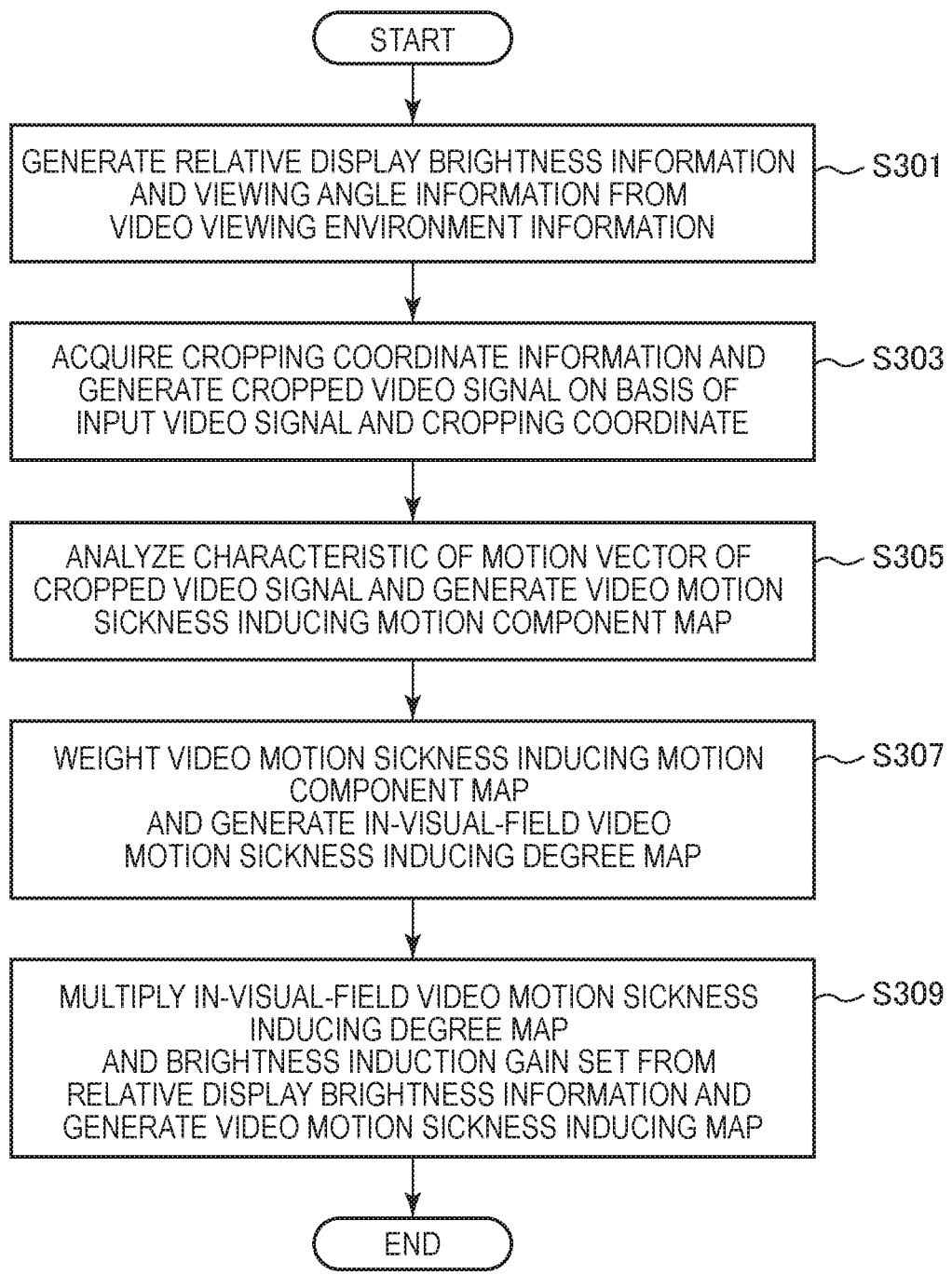
FIG. 34 is a flowchart showing a video viewing quality analysis process performed by the quality analyzer according to the embodiment.

Next, a configuration of the quality analyzer 320 of the information processing device 300 according to the present embodiment and a process performed thereby will be described with reference to FIGS. 33 and 34. Note that FIG. 33 is a functional block diagram showing a functional configuration of the quality analyzer 320 according to the present embodiment. FIG. 34 is a flowchart showing a video viewing quality analysis process performed by the quality analyzer 320 according to the present embodiment.

(1) Functional Configuration

The quality analyzer 320 according to the present embodiment includes a video motion sickness inducing environment information generation unit 321, a video motion sickness inducing motion component analyzer 322, an external signal decoder 323, a cropped video generation unit 323-2, and a video motion sickness inducing degree generation unit 324, as shown in FIG. 33.

The video motion sickness inducing environment information generation unit 321 generates relative display brightness information and viewing angle information on the basis of video environment information. The video motion sickness inducing environment information generation unit 321 operates similarly to the video motion sickness inducing environment information generation unit 121 of the first embodiment. The video motion sickness inducing environment information generation unit 321 outputs the generated relative display brightness information and viewing angle information to the video motion sickness inducing degree generation unit 324.

The video motion sickness inducing motion component analyzer 322 analyzes a characteristic of a video motion vector on the basis of the cropped video signal generated by the external signal decoder 323, which will be described below, and the cropped video generation unit 323-2 to generate a video motion sickness inducing motion component map. Although the video motion sickness inducing motion component analyzer 322 operates similarly to the video motion sickness inducing motion component analyzer 123 of the first embodiment, the video motion sickness inducing motion component analyzer 322 has a difference therefrom in that an analysis target is the cropped video signal instead of an input video signal. The video motion sickness inducing motion component analyzer 322 outputs the generated video motion sickness inducing motion component map to the video motion sickness inducing degree generation unit 324.

The external signal decoder 323 acquires cropping coordinate information from an external signal, and the cropped video generation unit 323-2 generates a cropped video signal on the basis of an input video signal and the cropping coordinate information. The external signal decoder 323 and the cropped video generation unit 323-3 operate similarly to those of the second embodiment shown in FIG. 26.

The video motion sickness inducing degree generation unit 324 generates a video motion sickness inducing degree map which represents regions of a video displayed on a display that are likely to easily induce video motion sickness as video viewing quality information. The video motion sickness inducing degree generation unit 324 includes an in-visual-field video motion sickness inducing degree map generation unit 324a and an in-viewing-environment video motion sickness inducing degree map generation unit 324b, as shown in FIG. 33.

The in-visual-field video motion sickness inducing degree map generation unit 324a generates an in-visual-field video motion sickness inducing degree map on the basis of the viewing angle information and the video motion sickness inducing motion component map. The in-visual-field video motion sickness inducing degree map is generated by weighting a video motion sickness inducing motion component map that is discretely mapped to a range of a video at a viewing angle. That is, the in-visual-field video motion sickness inducing degree map generation unit 324a operates similarly to the in-visual-field video motion sickness inducing motion component accumulation unit 125a of the first embodiment.

The in-viewing-environment video motion sickness inducing degree map generation unit 324b generates a video motion sickness inducing degree map on the basis of the relative display brightness information and the in-visual-field video motion sickness inducing degree map.

(2) Process Details

First, the video motion sickness inducing environment information generation unit 321 of the quality analyzer 320 shown in FIG. 33 first generates relative display brightness information and viewing angle information from video viewing environment information as shown in FIG. 33 (S301). This process of Step S301 is performed similarly to that of Step S111 of FIG. 11. The video motion sickness inducing environment information generation unit 321 outputs the generated relative display brightness information and viewing angle information to the video motion sickness inducing degree generation unit 324.

Next, the external signal decoder 323 acquires cropping coordinate information from an external signal, and the cropped video generation unit 313 generates a cropped video signal on the basis of an input video signal and the cropping coordinate information (S303). Further, the video motion sickness inducing motion component analyzer 322 analyzes a characteristic of a video motion vector indicated by the input cropped video signal and then generates a video motion sickness inducing motion component map (S305). This process of Step S305 is performed similarly to that of Step S113 of FIG. 11. The video motion sickness inducing motion component analyzer 322 outputs the generated video motion sickness inducing motion component map to the video motion sickness inducing degree generation unit 324.

Then, the in-visual-field video motion sickness inducing degree map generation unit 324a generates an in-visual-field video motion sickness inducing degree map on the basis of the viewing angle information and the video motion sickness inducing motion component map (S307). This process of generating the in-visual-field video motion sickness inducing degree map is performed by, for example, multiplying the video motion sickness inducing motion component map that is discretely mapped to the video range at the viewing angle and a weighting factor which increases a weight toward the center of a visual field shown in FIG. 12, similarly to the process performed by the in-visual-field video motion sickness inducing motion component accumulation unit 125a of the first embodiment.

Then, the in-viewing-environment video motion sickness inducing degree map generation unit 324b generates a video motion sickness inducing degree map on the basis of the relative display brightness information and the in-visual-field video motion sickness inducing degree map (S309). The in-viewing-environment video motion sickness inducing degree map generation unit 324b sets a brightness induction gain (LumGain) using the relative display brightness information in accordance with, for example, a characteristic, as shown in FIG. 13. Then, the in-viewing-environment video motion sickness inducing degree map generation unit 324b generates a result obtained by multiplying the in-visual-field video motion sickness inducing degree map and the set brightness induction gain as the video motion sickness inducing degree map. Note that map values of the video motion sickness inducing degree map are set to be, for example, 0 to 255, and are set to be greater values for regions that are likely to more easily induce video motion sickness.

The configuration of the quality analyzer 320 according to the present embodiment and the process performed thereby have been described above.

[3.3. Gaze Target Region Information Generation Process]

Figure 35:
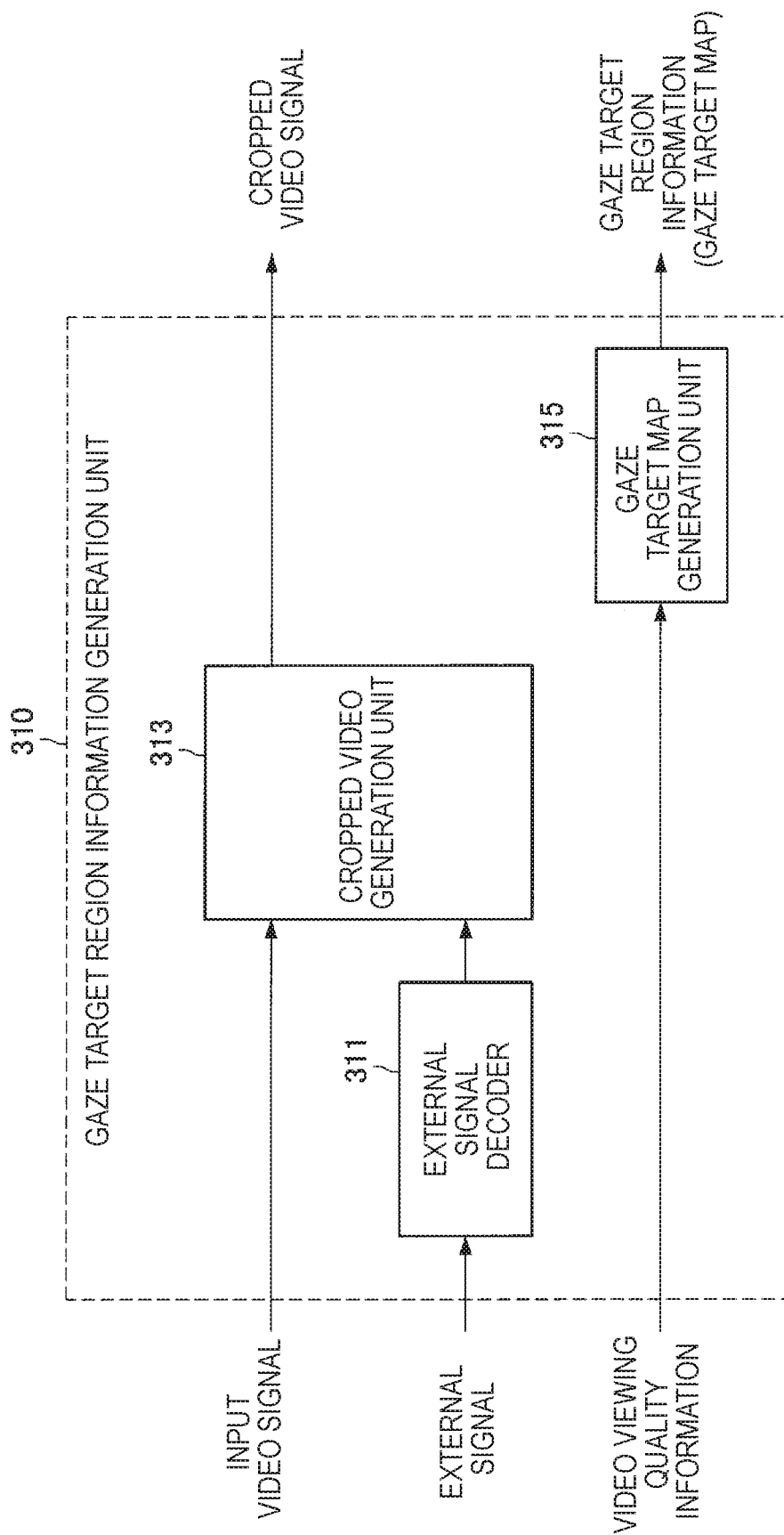
FIG. 35 is a functional block diagram showing a functional configuration of a gaze target region information generation unit according to the embodiment.
Figure 36:
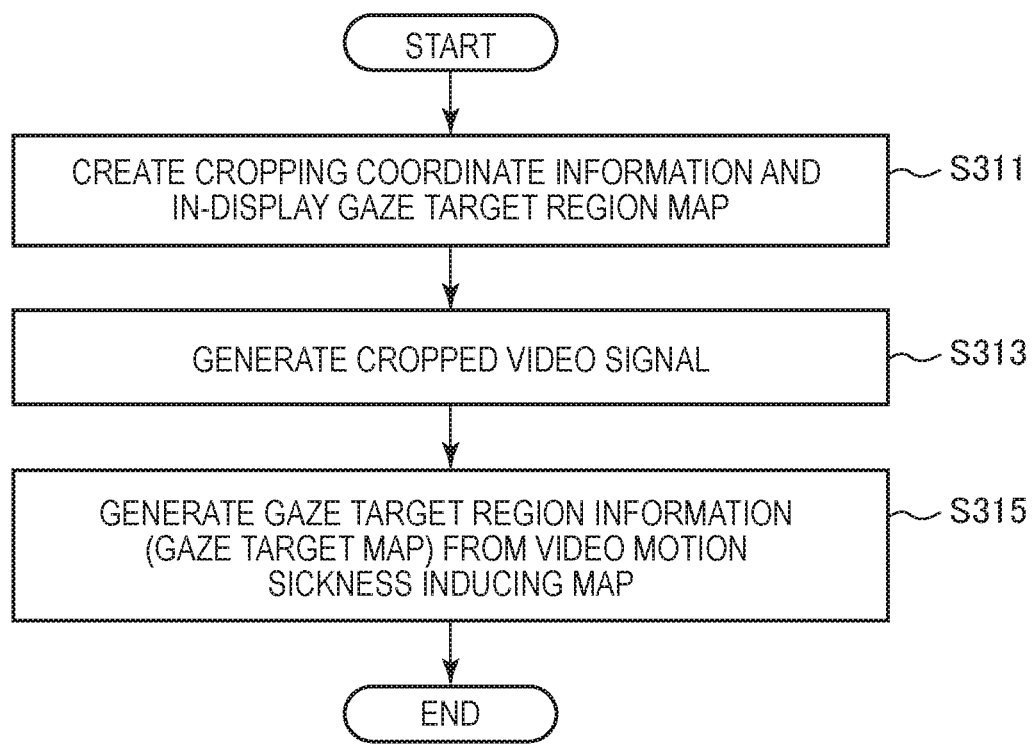
FIG. 36 is a flowchart showing a gaze target region information generation process performed by the gaze target region information generation unit according to the embodiment.

Next, a configuration of the gaze target region information generation unit 310 of the information processing device 300 according to the present embodiment and a process performed thereby will be described with reference to FIGS. 35 to 37. Note that FIG. 35 is a functional block diagram showing a functional configuration of the gaze target region information generation unit 310 according to the present embodiment. FIG. 36 is a flowchart showing a gaze target region information generation process performed by the gaze target region information generation unit 310 according to the present embodiment. FIG. 37 shows illustrative diagrams showing examples of a video motion sickness inducing degree map and a map obtained through a reversal of contrast.

(1) Functional Configuration

The gaze target region information generation unit 310 according to the present embodiment includes an external signal decoder 311, a cropped video generation unit 313, and a gaze target map generation unit 315, as shown in FIG. 35. The external signal decoder 311 and the cropped video generation unit 313 operate similarly to those of the second embodiment shown in FIG. 26.

The gaze target map generation unit 315 generates gaze target region information (a gaze target map) on the basis of a video motion sickness inducing degree map, which is input video viewing quality information. In the present embodiment, the gaze target map, which indicates regions that are likely to easily induce video motion sickness as regions not to be gazed at, is generated using the video motion sickness inducing degree map.

(2) Process Details

First, the external signal decoder 311 of the gaze target region information generation unit 310 shown in FIG. 35 acquires cropping coordinate information and an in-display gaze target region map, which is gaze target region information on a display, from an input external signal (S311). This process of Step S311 is performed similarly to that of Step S201 of FIG. 27. The external signal decoder 311 outputs the cropping coordinate information to the cropped video generation unit 313.

Next, the cropped video generation unit 313 generates a cropped video signal on the basis of an input video signal and the cropping coordinate information (S313). This process of Step S313 is performed similarly to that of Step S203 of FIG. 27. The cropped video signal generated by the cropped video generation unit 313 is output to the quality improvement processing unit 330 shown in FIG. 31.

Then, the gaze target map generation unit 315 generates a gaze target map from the video motion sickness inducing degree map (S315). For example, the gaze target map generation unit 315 generates a reversed map 36R obtained by reversing a video motion sickness inducing degree map 36, as shown in FIG. 37, and sets the map as the gaze target map. On the reversed map 36R of FIG. 37, a darker portion represents a region that is likely to easily induce video motion sickness. That is, the gaze target map is generated as the gaze target map generation unit 315 converts the video motion sickness inducing degree map 36 into gaze target region information in which regions that are likely to easily induce video motion sickness are indicated as regions not to be gazed at by viewers.

The configuration of the gaze target region information generation unit 310 according to the present embodiment and the process performed thereby have been described above.

[3.4. Video Viewing Quality Improvement Process]

Figure 38:
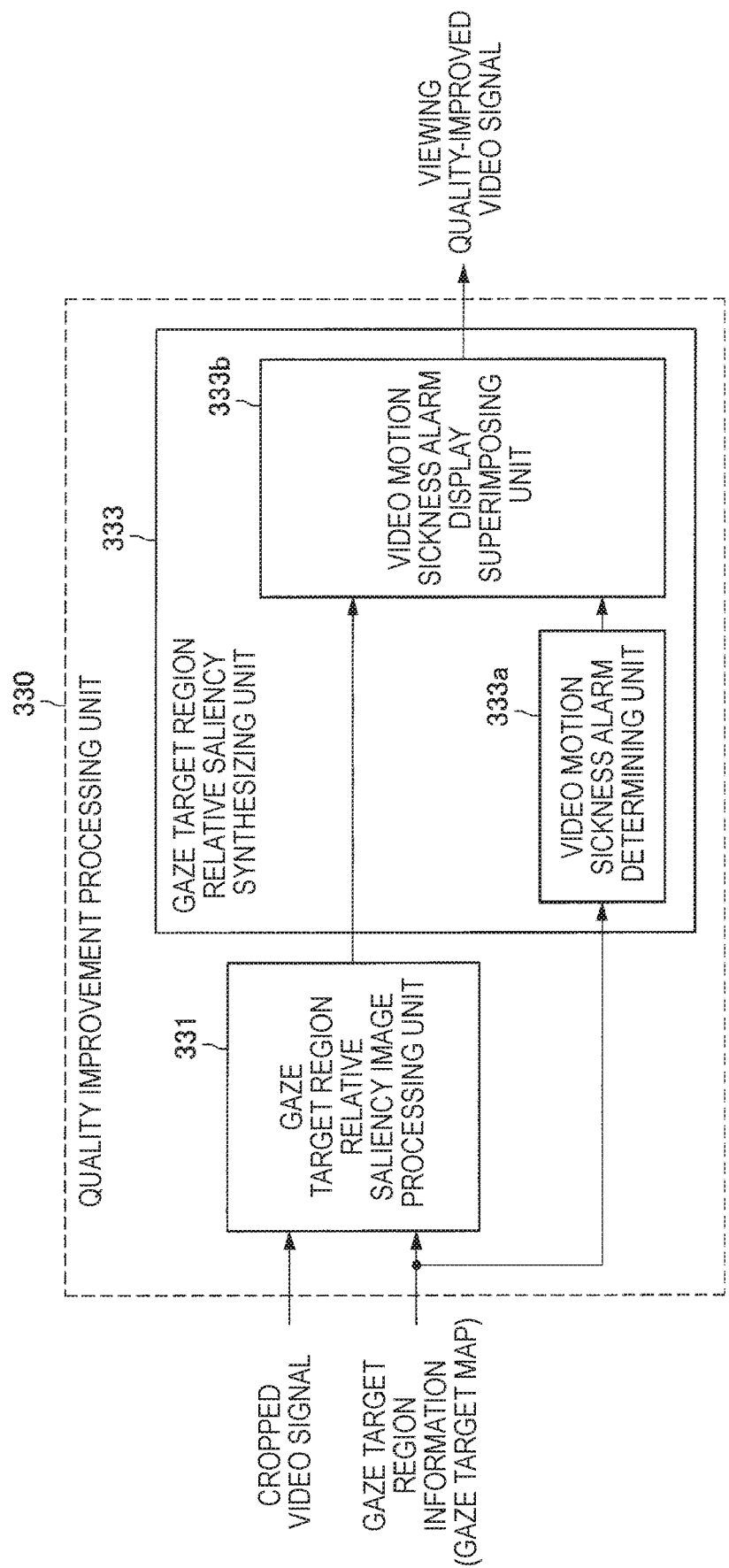
FIG. 38 is a functional block diagram showing a functional configuration of a quality improvement processing unit according to the embodiment.
Figure 39:
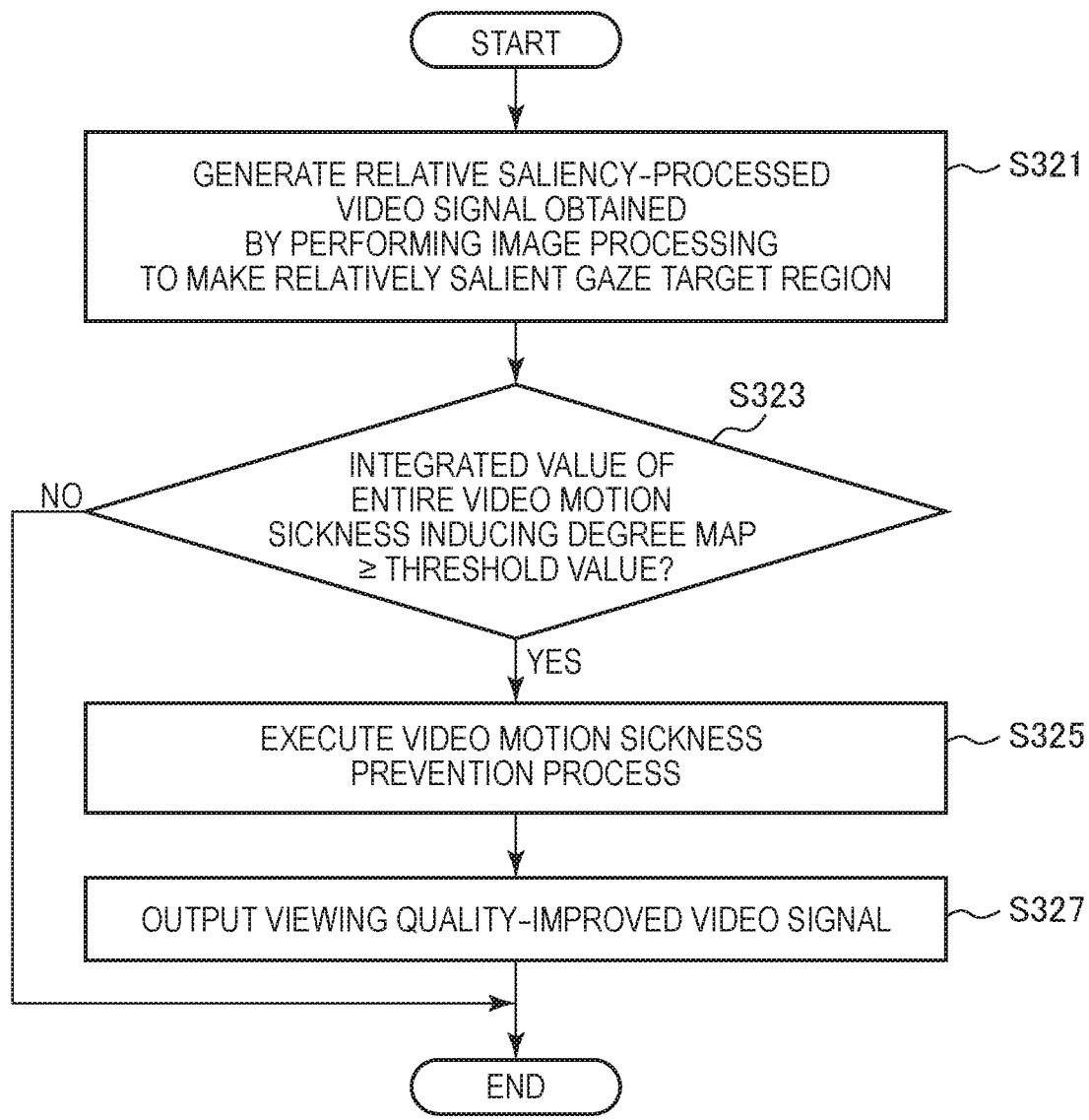
FIG. 39 is a flowchart showing a video viewing quality improvement process performed by the quality improvement processing unit according to the embodiment.
Figure 40:
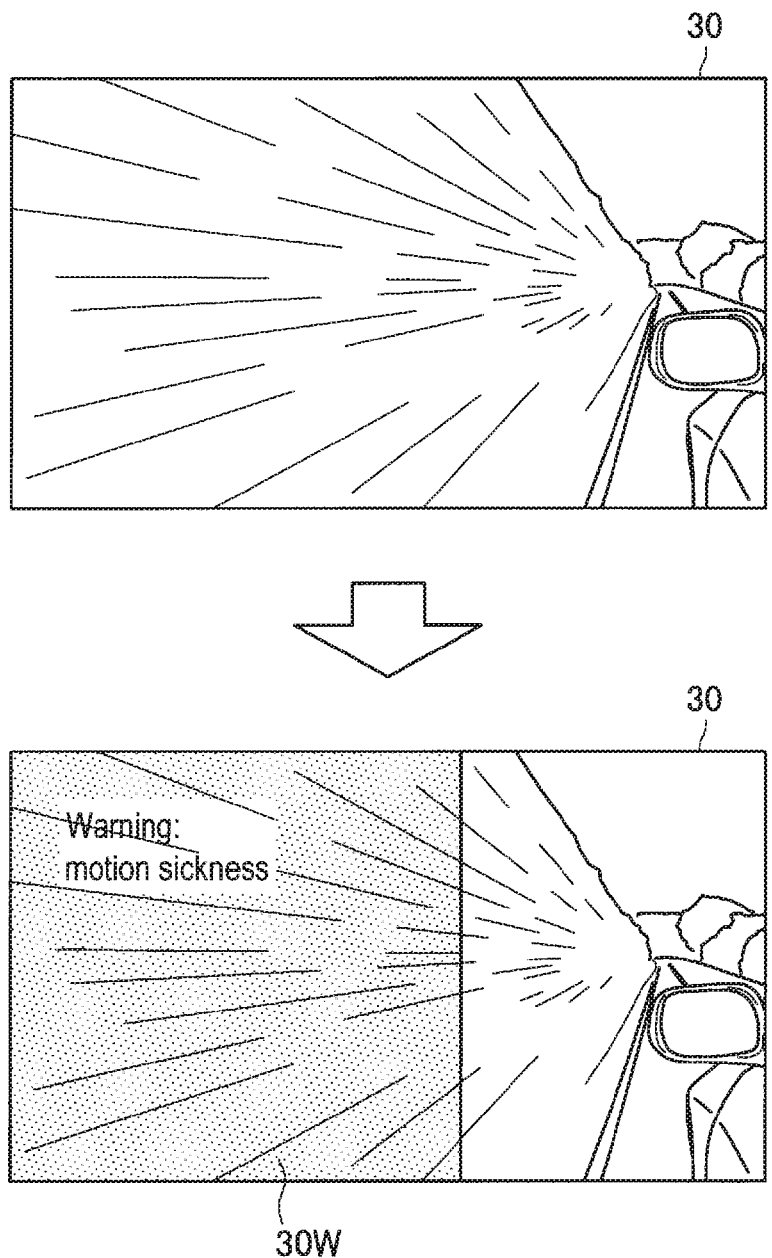
FIG. 40 is an illustrative diagram showing an example of video motion sickness alarm information.

Next, a configuration of the quality improvement processing unit 330 of the information processing device 300 according to the present embodiment and a process performed thereby will be described with reference to FIGS. 38 to 40. Note that FIG. 38 is a functional block diagram showing a functional configuration of the quality improvement processing unit 330 according to the present embodiment. FIG. 39 is a flowchart showing a video viewing quality improvement process performed by the quality improvement processing unit 330 according to the present embodiment. FIG. 40 is an illustrative diagram showing an example of video motion sickness alarm information.

(1) Functional Configuration

The quality improvement processing unit 330 according to the present embodiment includes a gaze target region relative saliency image processing unit 331, and a gaze target region relative saliency synthesizing unit 333, as shown in FIG. 38.

The gaze target region relative saliency image processing unit 331 generates a relative saliency-processed video signal that obtained by performing image processing to make a relatively salient gaze target region on the basis of a cropped video signal and gaze target region information (a gaze target map). The gaze target region relative saliency image processing unit 331 operates similarly to the gaze target region relative saliency image processing unit 131 shown in FIG. 14. Note that the cropped video signal is input thereto instead of an input video signal in the present embodiment. The gaze target region relative saliency image processing unit 331 outputs the generated relative saliency-processed video signal to the gaze target region relative saliency synthesizing unit 333.

The gaze target region relative saliency synthesizing unit 333 generates a viewing quality-improved video signal on the basis of the relative saliency-processed video signal and the gaze target region information (the gaze target map). The gaze target region relative saliency synthesizing unit 333 includes a video motion sickness alarm determining unit 333a and a video motion sickness alarm display superimposing unit 333b, as shown in FIG. 38.

The video motion sickness alarm determining unit 333a determines whether a video motion sickness alarm is to be displayed on the basis of the gaze target region information (the gaze target map), and when a video displayed on a display includes a scene that may induce video motion sickness, video motion sickness alarm information is output to the video motion sickness alarm display superimposing unit 333b.

When there is an instruction to display the video motion sickness alarm in control information, the video motion sickness alarm display superimposing unit 333b superimposes an alarm display on the relative saliency-processed video signal on the basis of the video motion sickness alarm information and outputs the result thereof as a viewing quality-improved video signal.

(2) Process Details

First, the gaze target region relative saliency image processing unit 331 of the quality improvement processing unit 330 shown in FIG. 38 generates a relative saliency-processed video signal obtained by performing image processing to make a relatively salient gaze target region on the basis of a cropped video signal and gaze target region information (a gaze target map) (S321), as shown in FIG. 39. This process of Step S321 is performed similarly to that of Step S123 of FIG. 15. That is, an image quality suppressing process in which a darker portion of the reversed map 36R shown in FIG. 37 is made to be more blurry or darker or to have a low contrast or a low saturation is performed. The cropped video signal that underwent the image processing is output to the gaze target region relative saliency synthesizing unit 333 as a relative saliency-processed video signal.

Next, video motion sickness alarm determining unit 333a determines whether or not the video motion sickness alarm is to be displayed on a wide-field video on the basis of the gaze target region information (the gaze target map). First, the video motion sickness alarm determining unit 333a performs a reversal process on the input gaze target region information (the gaze target map) to return to a state of the video motion sickness inducing degree map 36 shown in FIG. 37 and adds map values of the video motion sickness inducing degree map 36 with respect to an entire screen to acquire an integrated value. Then, whether this integrated value is a predetermined threshold value is determined (S323). This threshold value is for determining the number of regions of the wide-field video that are likely to easily induce video motion sickness, and, for example, an appropriate empirical value is set.

When the cumulative value is smaller than the threshold value, the video motion sickness alarm determining unit 333a determines that the wide-field video has few regions that are likely to easily induce video motion sickness and there is a low possibility of video motion sickness being suffered by viewers, and thereby ends the process of FIG. 39. Conversely, when the cumulative value is greater than or equal to the threshold value, the video motion sickness alarm determining unit 333a determines that the wide-field video has many regions that re likely to easily induce video motion sickness and a video displayed on a display includes a scene that may induce video motion sickness. At this time, the video motion sickness alarm determining unit 333a decides that the video motion sickness prevention process is to be performed on the wide-field video (S325).

As the video motion sickness prevention process, for example, a video motion sickness alarm information display process of displaying video motion sickness alarm information on a wide-field video, a forced masking display process of forcedly masking a video thereon, and the like exist. The video motion sickness alarm determining unit 333a generates control information indicating whether to perform the video motion sickness prevention process and outputs the information and video motion sickness alarm information indicating details of the alarm to the video motion sickness alarm display superimposing unit 333b.

Then, when the control information includes an instruction to display the video motion sickness alarm, the video motion sickness alarm display superimposing unit 333b superimposes the display of the alarm on the relative saliency-processed video signal on the basis of the video motion sickness alarm information and outputs the result thereof as the viewing quality-improved video signal (S327). Accordingly, video motion sickness alarm information 30W, as shown in, for example, FIG. 40, is displayed in a region of a wide-field video 30 that is likely to easily induce video motion sickness so that the viewer does not gaze at the region that is likely to easily induce video motion sickness.

The configuration of the quality improvement processing unit 330 according to the present embodiment and the process performed thereby have been described above.

[3.5. Conclusion]

The information processing device 300 according to the third embodiment of the present disclosure and image signal processing performed thereby have been described above. According to the present embodiment, even if a scene that is likely to induce video motion sickness is displayed when a wide-field video is viewed while a user interaction operation is performed, an image quality suppressing mask, a viewing environment, and a cropped video signal can be analyzed, and thus an alarm to warn of video motion sickness or the like can be displayed with respect to a region on a display that is likely to induce video motion sickness. Accordingly, video motion sickness that viewers may suffer can be suppressed and viewing quality can be improved.

<4. Fourth Embodiment>

Next, an information processing device according to a fourth embodiment of the present disclosure and image signal processing performed thereby will be described with reference to FIGS. 41 to 53. In the present embodiment, a case in which a quasi-wide angle video constituted by an original video and an externally inserted predictive video that is displayed around the original video is displayed on a wide screen at a wide viewing angle as described in the above-mentioned Non-Patent Literature 2 will be described as in the first embodiment. Note that the external signal is a control signal for identifying an original signal indicating an original video whose angle of view is not yet widened to be quasi-wide angle and an externally inserted predictive signal.

Figure 41:
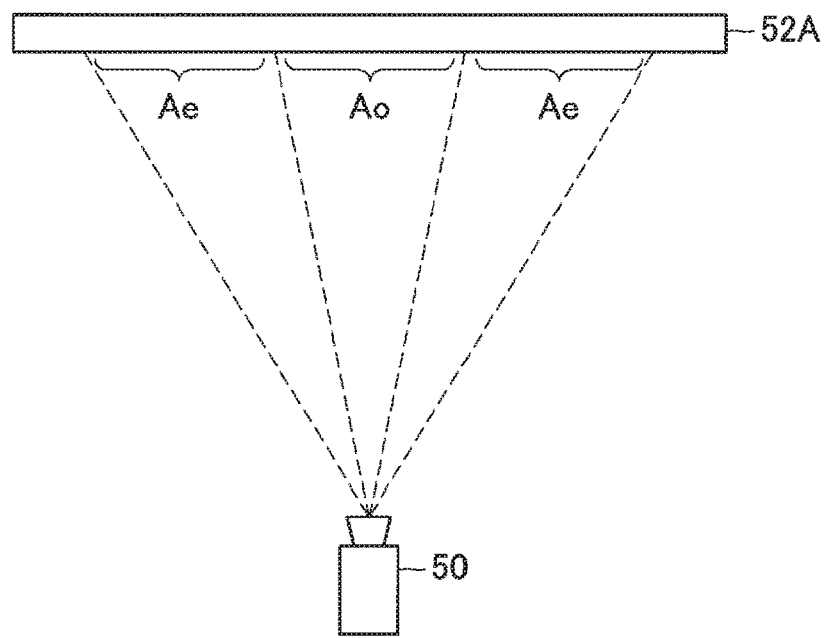
FIG. 41 is an illustrative diagram showing a state in which a projector performs projection on a single planar screen.
Figure 42:
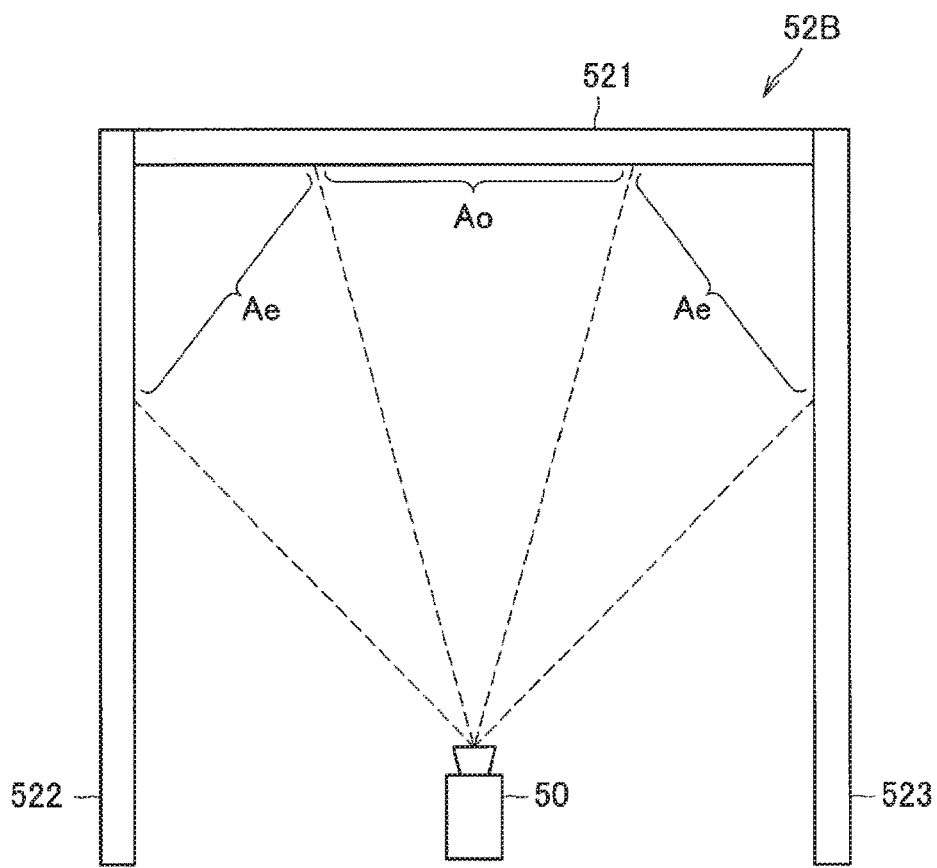
FIG. 42 is an illustrative diagram showing a state in which a projector performs projection on a plurality of planar screens.

In the present embodiment, it is assumed that a quasi-wide angle video is projected using a projector 50. It is also assumed that, for example, a single-plane screen 52A, as shown in FIG. 41, as well as a plural-plane screen 52B constituted by a plurality of planes 521, 522, and 523 surrounding the projector 52, as shown in FIG. 42, are used as screens on which the quasi-wide angle video is projected. In this case, an original video Ao is displayed at the centers of the single-plane screen 52A and the plural-plane screen 52B and externally inserted predictive videos Ae are displayed on both sides (outer perimeters) each thereof.

[4.1. Schematic Configuration of Information Processing Device]

Figure 43:
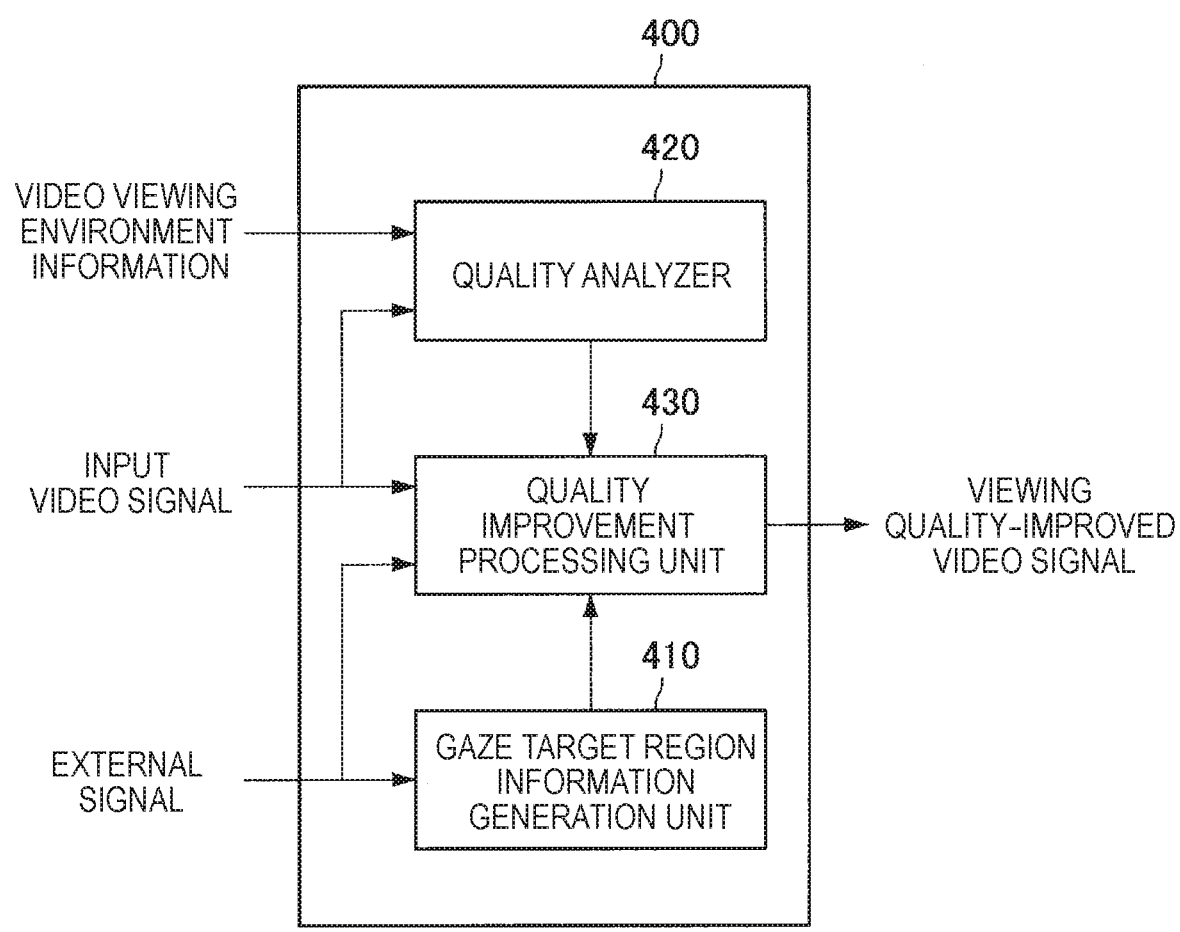
FIG. 43 is a functional block diagram showing a schematic configuration of an information processing device according to a fourth embodiment of the present disclosure.
Figure 44:
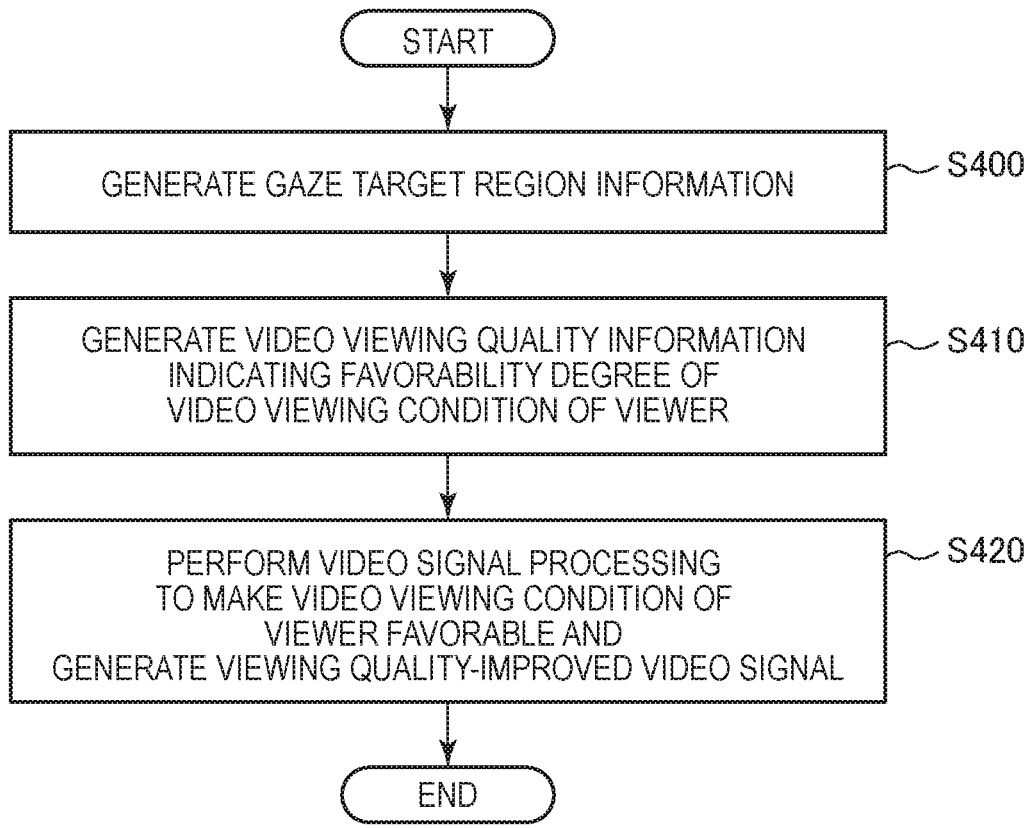
FIG. 44 is a flowchart showing an overview of image signal processing performed by the information processing device according to the embodiment.

First, a schematic configuration of the information processing device according to the fourth embodiment of the present disclosure will be described with reference to FIGS. 43 and 44. Note that FIG. 43 is a functional block diagram showing the schematic configuration of the information processing device 400 according to the present embodiment. FIG. 44 is a flowchart showing an overview of image signal processing performed by the information processing device 400 according to the present embodiment.

The information processing device 400 according to the present embodiment includes a gaze target region information generation unit 410, a quality analyzer 420, and a quality improvement processing unit 430, as shown in FIG. 43. The information processing device 400 according to the present embodiment is different from the information processing device 100 of the first embodiment shown in FIG. 1 in that the gaze target region information generation unit 410 receives no input video signal.

The gaze target region information generation unit 410 estimates a gaze target region to be gazed at by a viewer on the basis of an external signal and sets gaze target region information. The quality analyzer 420 generates video viewing quality information indicating a favorability degree of a video viewing condition of the viewer on the basis of an input video signal and video viewing environment information. The quality improvement processing unit 430 performs video signal processing to make a video viewing condition of the viewer favorable on the basis of the input video signal, the external signal, the gaze target region information, and the video viewing quality information, and thereby generates a viewing quality-improved video signal.

First, the gaze target region information generation unit 110 of the information processing device 400 estimates a gaze target region from an external signal and generates gaze target region information, as shown in FIG. 44 (S400). The gaze target region information generation unit 410 outputs the generated gaze target region information to the quality improvement processing unit 430.

Meanwhile, the quality analyzer 420 generates video viewing quality information indicating a favorability degree of a video viewing condition of a viewer from an input video signal and video viewing environment information input from the outside (S410). The quality analyzer 420 outputs the generated video viewing quality information to the quality improvement processing unit 430.

Then, the quality improvement processing unit 430 performs video signal processing using the input video signal and external signal input from the outside, the gaze target region information, and the video viewing quality information to make a of a video viewing condition of the viewer favorable, and finally generates a viewing quality-improved video signal (S420).

By performing image signal processing as described above, when a quasi-wide angle video obtained by inserting an externally inserted predictive video around an original video is viewed, a viewing environment and a video signal are analyzed, and when the quasi-wide angle video is likely to induce video motion sickness, the original video is made to be more conspicuous than the externally inserted predictive video, and thus video motion sickness can be suppressed and viewing quality can be improved. In addition, even when the quasi-wide angle video is displayed and viewed by projecting the video on a plurality of planes using a projector, a phenomenon in which contrast of an original signal part is lowered due to interreflection can be suppressed. Functions of constituent elements will be described below in detail.

[4.2. Gaze Target Region Information Generation Process]

First, a configuration of the gaze target region information generation unit 410 of the information processing device 400 according to the present embodiment and a process performed thereby will be described with reference to FIG. 45. Note that FIG. 45 is a functional block diagram showing a functional configuration of the gaze target region information generation unit 410 according to the present embodiment.

Figure 45:
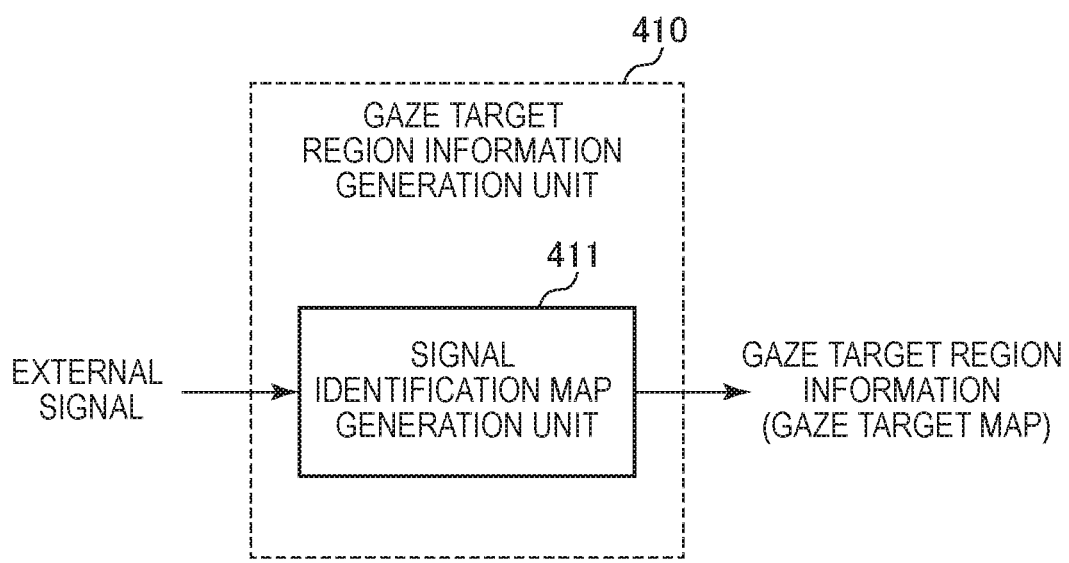
FIG. 45 is a functional block diagram showing a functional configuration of a gaze target region information generation unit according to the embodiment.

The gaze target region information generation unit 410 according to the present embodiment includes a signal identification map generation unit 411, as shown in FIG. 45. That is, the signal identification map generation unit 411 outputs a signal identification map signal input without change as an external signal as gaze target region information (a gaze target map).

[4.3. Video Viewing Quality Analysis Process]

Figure 46:
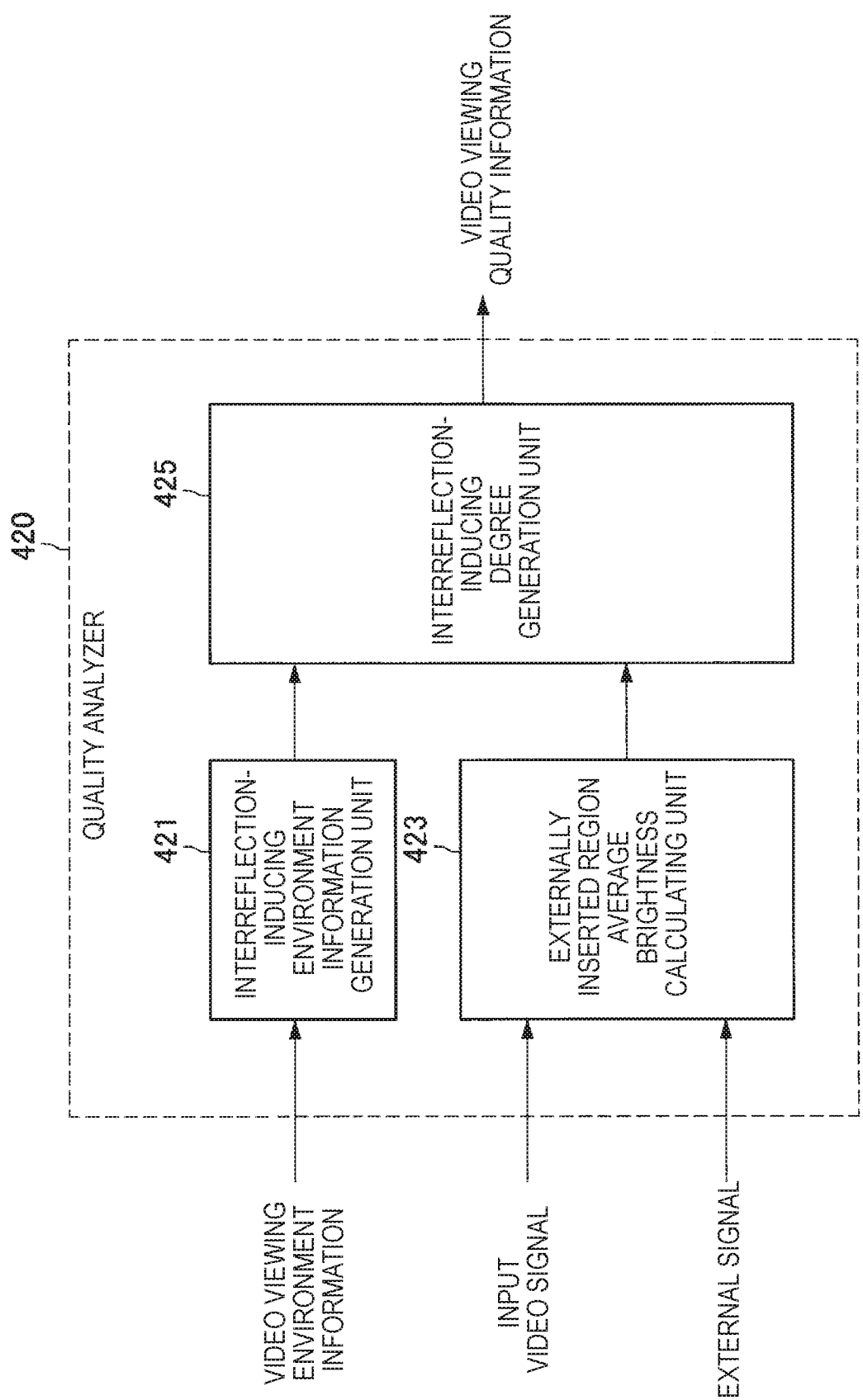
FIG. 46 is a functional block diagram showing a functional configuration of a quality analyzer according to the embodiment.
Figure 47:
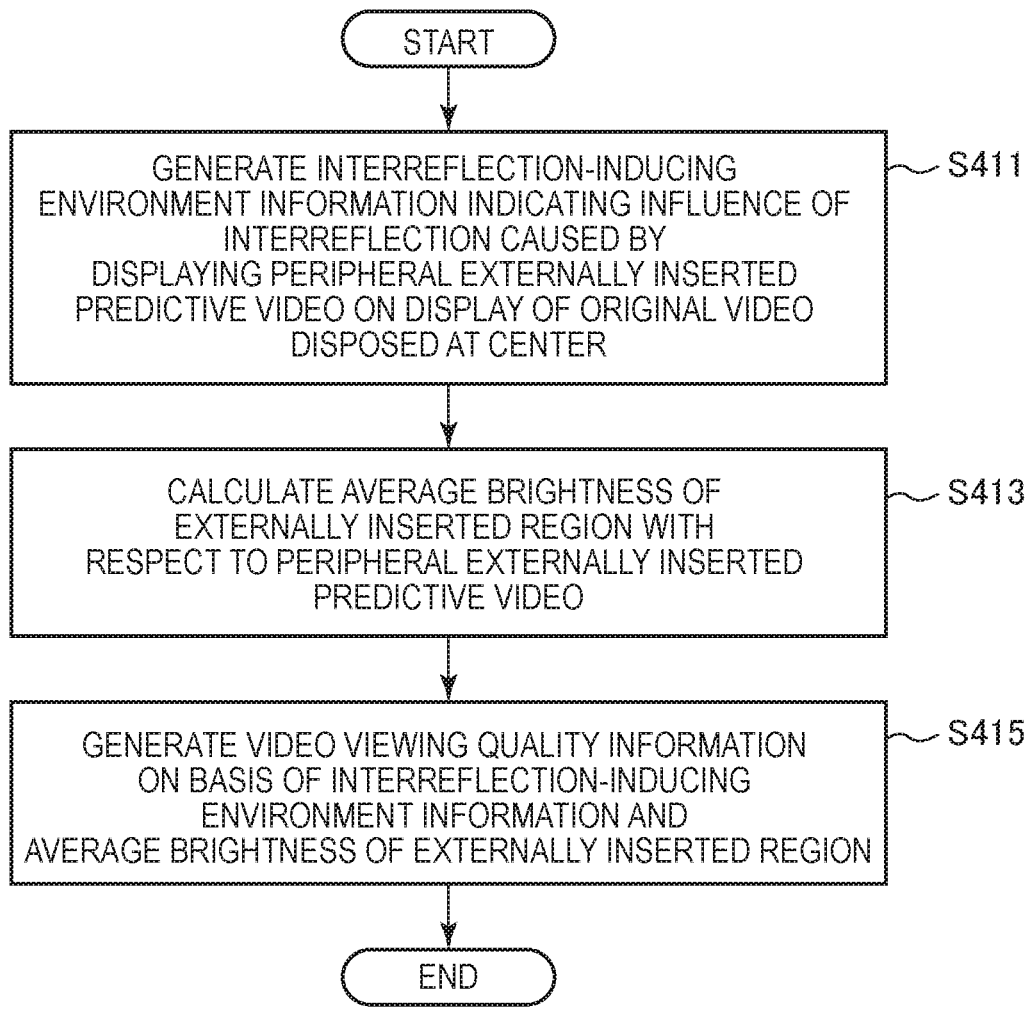
FIG. 47 is a flowchart showing a video viewing quality analysis process performed by the quality analyzer according to the embodiment.
Figure 48:
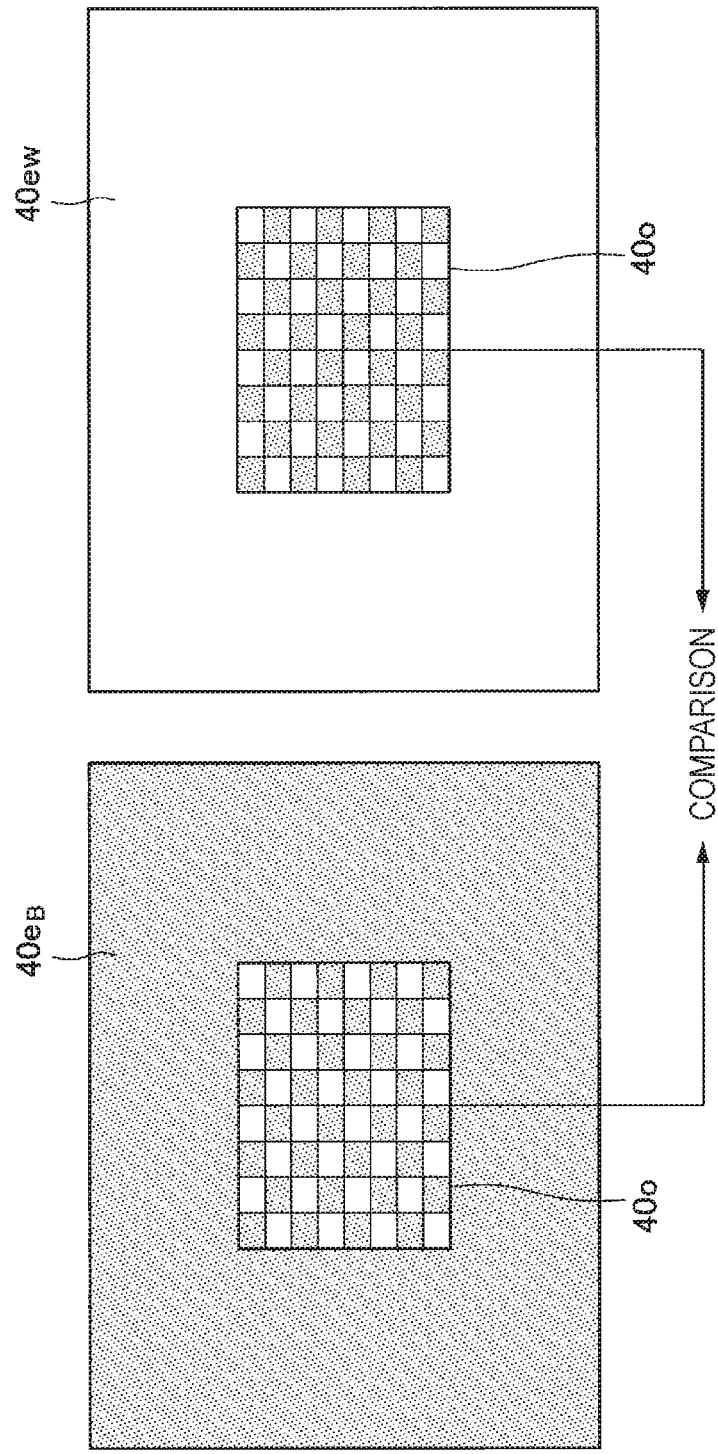
FIG. 48 is an illustrative diagram showing an example of video viewing environment information according to the embodiment.
Figure 49:
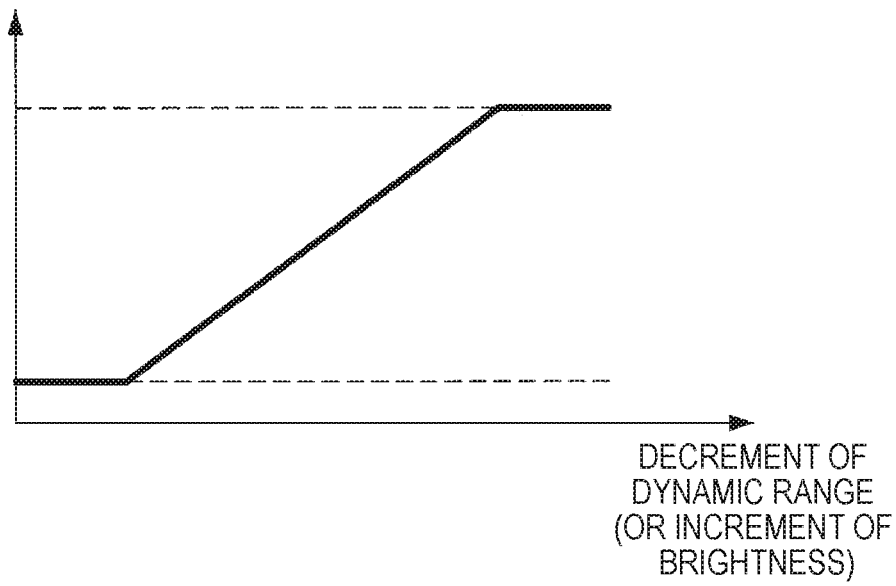
FIG. 49 is a graph showing a relation between a decrement of a dynamic range and interreflection inducing environment information.
Figure 50:
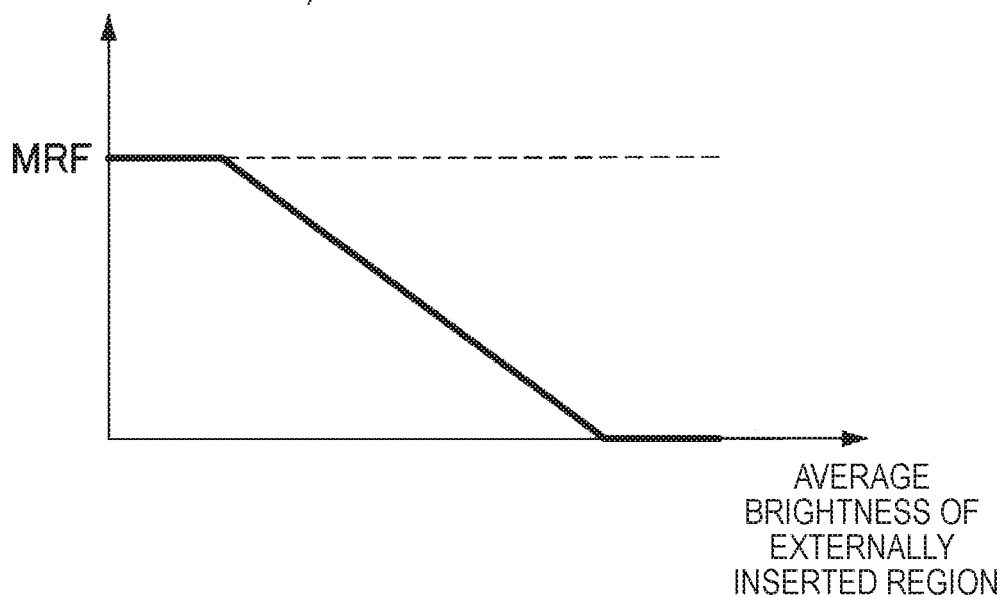
FIG. 50 is a graph showing a relation between an average brightness of an externally inserted region and video environment quality information.

Next, a configuration of the quality analyzer 420 of the information processing device 400 according to the present embodiment and a process performed thereby will be described with reference to FIGS. 46 to 50. Note that FIG. 46 is a functional block diagram showing a functional configuration of the quality analyzer 420 according to the present embodiment. FIG. 47 is a flowchart showing a video viewing quality analysis process performed by the quality analyzer 420 according to the present embodiment. FIG. 48 is an illustrative diagram showing an example of video viewing environment information according to the present embodiment. FIG. 49 is an illustrative diagram showing a relation between a decrement of a dynamic range and interreflection-inducing environment information. FIG. 50 is a graph showing a relation between an average brightness of an externally inserted region and video environment quality information.

(1) Functional Configuration

The quality analyzer 420 according to the present embodiment includes an interreflection-inducing environment information generation unit 421, an externally inserted region average brightness calculating unit 423, and an interreflection-inducing degree generation unit 425, as shown in FIG. 46.

The interreflection-inducing environment information generation unit 421 generates interreflection-inducing environment information on the basis of video environment information. The interreflection-inducing environment information is information indicating an influence degree of interreflection caused by displaying an externally inserted predictive video that is inserted around an original video on a display of the original video disposed at the center. A process of computing the interreflection-inducing environment information will be described below. The interreflection-inducing environment information generation unit 421 outputs the generated interreflection-inducing environment information to the interreflection-inducing degree generation unit 425.

The externally inserted region average brightness calculating unit 423 calculates average brightness (luminance or lightness) of an externally inserted predictive video 6*e* that is inserted around an original video 6*o* shown in FIG. 58 using an input video signal on the basis of the input video signal and an external signal, and outputs the value to the interreflection-inducing degree generation unit 425 as an average brightness of the externally inserted region.

The interreflection-inducing degree generation unit 425 outputs video viewing quality information indicating displayed image quality affected by interreflection on the basis of the interreflection-inducing environment information and the average brightness of the externally inserted region.

(2) Process Details

First, the interreflection-inducing environment information generation unit 421 of the quality analyzer 420 shown in FIG. 46 generates interreflection-inducing environment information on the basis of video environment information, as shown in FIG. 47 (S411). The interreflection-inducing environment information is information indicating an influence degree of interreflection caused by displaying an externally inserted predictive video that is inserted around an original video on a display of the original video disposed at the center.

In the present embodiment, for example, environment viewing environment information is two types of image data obtained when an image, which is composed of a display test pattern 40*o* corresponding to the original video at the center and a peripheral image 40*e*B corresponding to a peripheral externally inserted predictive video colored all black, and an image, which is composed of another display test pattern 40*o* and a peripheral image 40*e*W corresponding to an externally inserted predictive video colored all white, are displayed, as shown in FIG. 48. This image data is acquired in advance to perform projection.

The interreflection-inducing environment information generation unit 421 measures dynamic ranges of the two types of image data, and obtains a decrement (or an increment of brightness) of the dynamic ranges. Then, an interreflection-inducing environment factor (MRF) is set using the decrement of the dynamic ranges in accordance with, for example, a characteristic shown in FIG. 49 to be interreflection-inducing environment information. Note that, as another example, for example, an average brightness (luminance or lightness) may be calculated for each of the two types of image data shown in FIG. 48, and a difference in the average brightnesses of the image data (an increment of brightness) may be set as the interreflection-inducing environment information.

Next, the externally inserted region average brightness calculating unit 423 calculates an average brightness (luminance or lightness) of the externally inserted predictive video inserted around the original video with respect to an input video signal on the basis of the input video signal and an external signal (S413). The externally inserted region average brightness calculating unit 423 outputs the calculated value to the interreflection-inducing degree generation unit 425 as an average brightness of the externally inserted region.

Then, the interreflection-inducing degree generation unit 425 outputs video viewing quality information indicating displayed image quality affected by interreflection on the basis of the interreflection-inducing environment information and the average brightness of the externally inserted region (S415). For example, the interreflection-inducing degree generation unit 425 sets the video viewing quality information (i.e., displayed image quality) to have a value closer to 0 as the average brightness of the peripheral externally inserted region has an increased value, as shown in FIG. 50.

The configuration of the quality analyzer 420 according to the present embodiment and the process performed thereby have been described as above.

[4.4. Video Viewing Quality Improvement Process]

Figure 51:
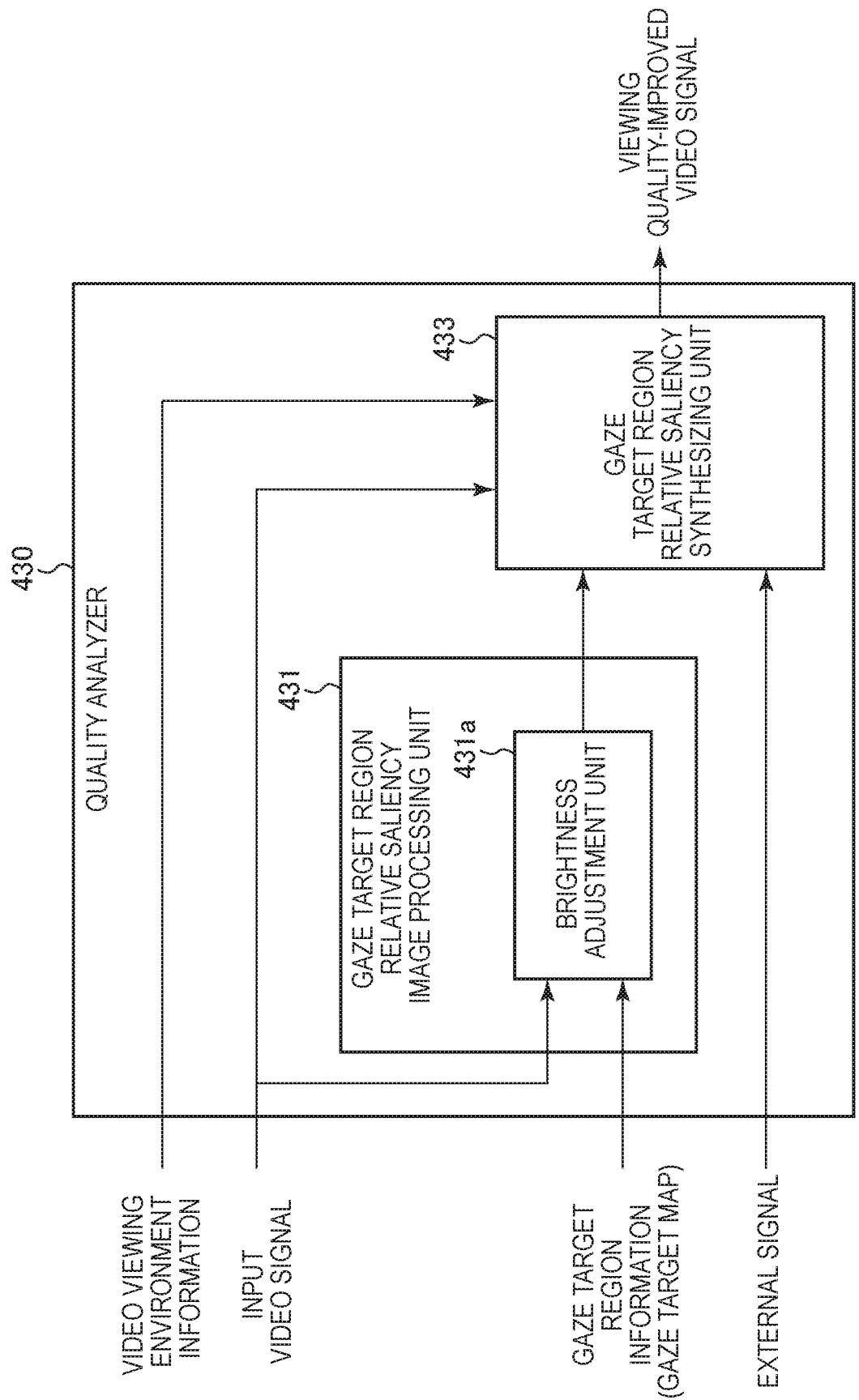
FIG. 51 is a functional block diagram showing a functional configuration of a quality improvement processing unit according to the embodiment.
Figure 52:
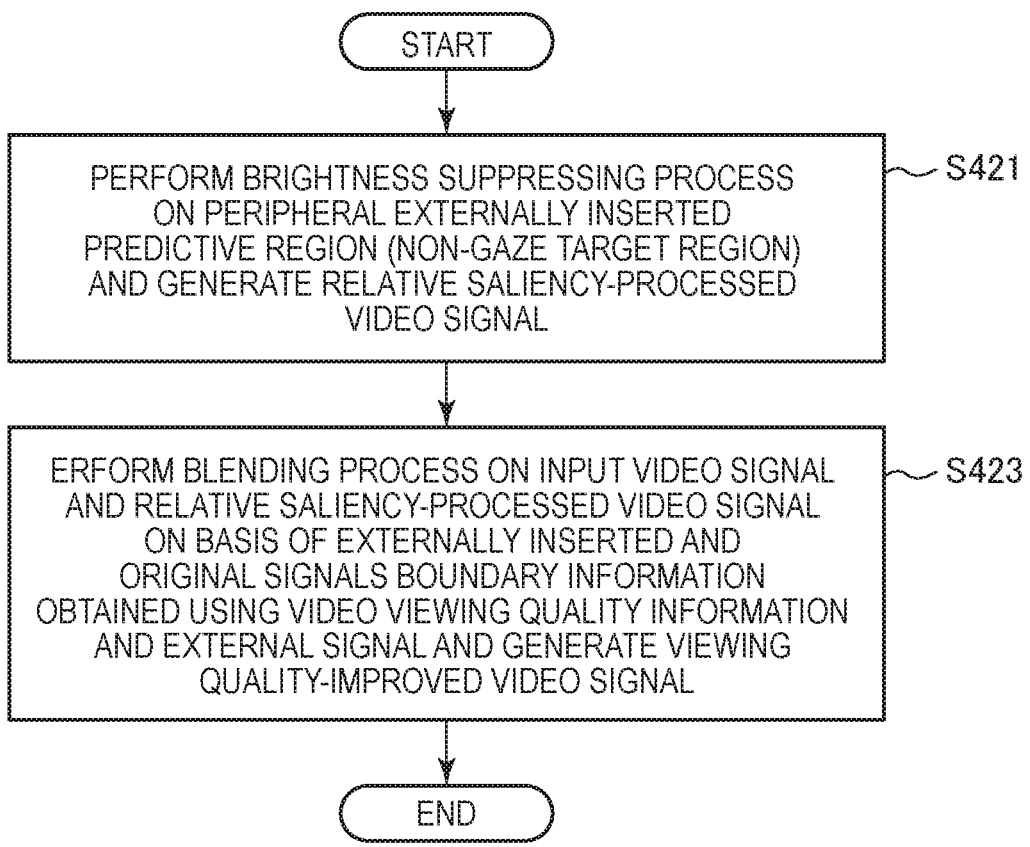
FIG. 52 is a flowchart showing a video viewing quality improvement process performed by the quality improvement processing unit according to the embodiment.
Figure 53:
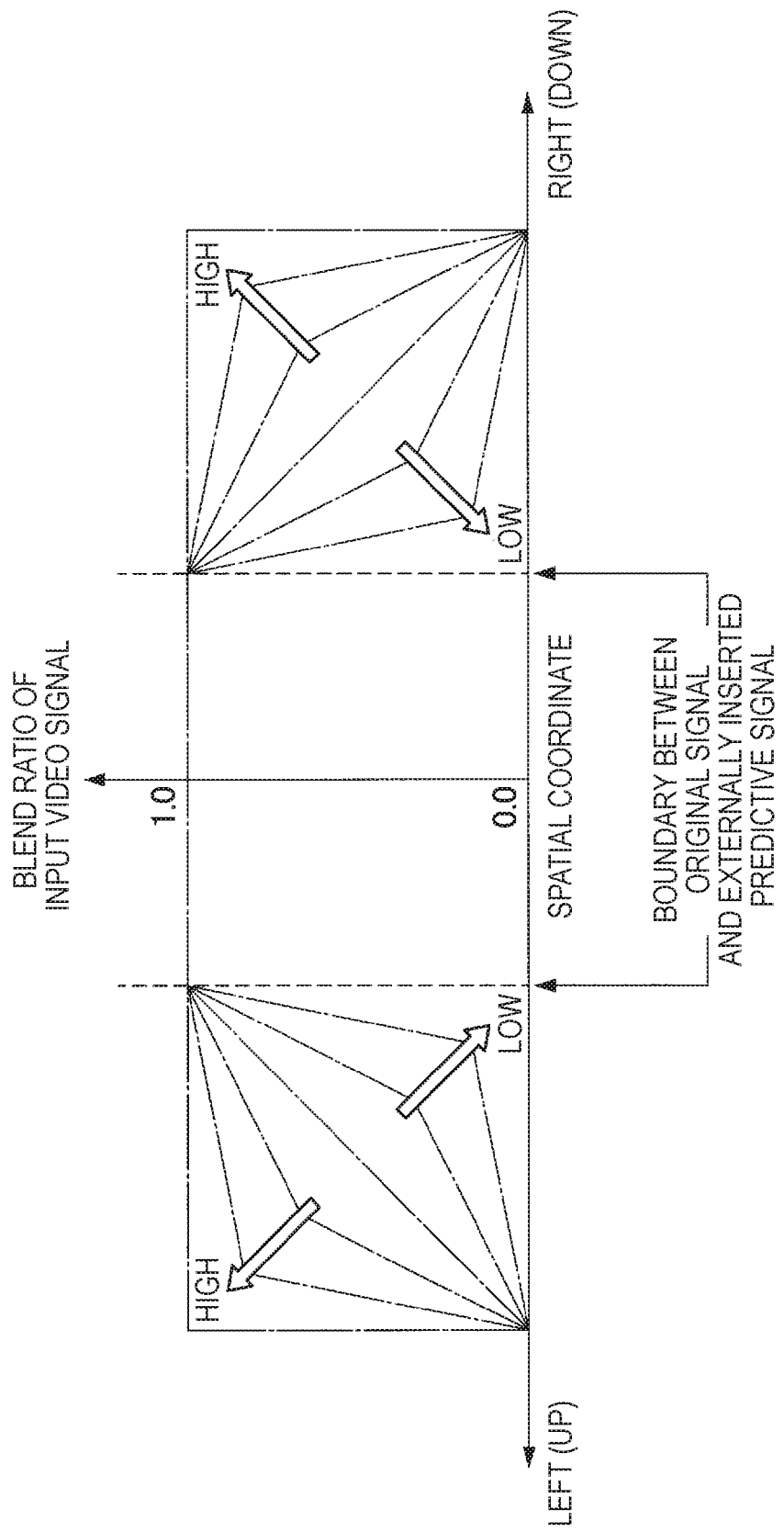
FIG. 53 is an illustrative diagram showing a blending process of an input video signal and a relative saliency-processed video signal.

Next, a configuration of the quality improvement processing unit 430 of the information processing device 400 according to the present embodiment and a process performed thereby will be described with reference to FIGS. 51 to 53. Note that FIG. 51 is a functional block diagram showing a functional configuration of the quality improvement processing unit 430 according to the present embodiment. FIG. 52 is a flowchart showing a video viewing quality improvement process performed by the quality improvement processing unit 430 according to the present embodiment. FIG. 53 is an illustrative diagram showing a blending process of an input video signal and a relative saliency-processed video signal.

(1) Functional Configuration

The quality improvement processing unit 430 according to the present embodiment includes a gaze target region relative saliency image processing unit 431 and a gaze target region relative saliency synthesizing unit 433, as shown in FIG. 51.

The gaze target region relative saliency image processing unit 431 generates a relative saliency-processed video signal on the basis of an input video signal and gaze target region information (a gaze target map). The gaze target region relative saliency image processing unit 431 according to the present embodiment only includes a brightness adjustment unit 431a, as shown in FIG. 51. The brightness adjustment unit 431a only performs a brightness suppressing process on a peripheral externally inserted predictive region (a non-gaze target region) to generate a relative saliency-processed video signal.

The gaze target region relative saliency synthesizing unit 433 generates a viewing quality-improved video signal on the basis of the relative saliency-processed video signal, the input video signal, an external signal, and video viewing quality information. The gaze target region relative saliency synthesizing unit 433 performs a blending process on the input video signal and the relative saliency-processed video signal on the basis of externally inserted and original signals boundary information using the video viewing quality information indicating a displayed image quality affected by interreflection and the external signal, and thereby generates a viewing quality-improved video signal.

(2) Process Details

First, a brightness adjustment unit 431a of the gaze target region relative saliency image processing unit 431 of the quality improvement processing unit 430 shown in FIG. 51 performs a brightness suppressing process on a peripheral externally inserted predictive region (a non-gaze target region) and then generates a relative saliency-processed video signal, as shown in FIG. 52 (S421).

Next, the gaze target region relative saliency synthesizing unit 433 generates a viewing quality-improved video signal on the basis of the relative saliency-processed video signal, an input video signal, an external signal, and video viewing quality information (S423). The gaze target region relative saliency synthesizing unit 433 performs a blending process on the input video signal and the relative saliency-processed video signal on the basis of externally inserted and original signals boundary information obtained using the video viewing quality information indicating a displayed image quality affected by interreflection and the external signal.

Specifically, when a value (indicating a displayed image quality) of the video viewing quality information is higher, a blend ratio of the input video signal is set to be higher so that the input video signal is displayed at peripheries of the displayed video, as shown in FIG. 53. Conversely, when the value (indicating the displayed image quality) of the video viewing quality information is lower, the peripheries become darker, and thus the blending process is performed with a blend ratio of the relative saliency-processed video signal set to be high. The gaze target region relative saliency synthesizing unit 433 outputs a signal generated using the blending process of the input video signal and the relative saliency-processed video signal as a final viewing quality-improved video signal.

The configuration of the quality improvement processing unit 430 according to the present embodiment and the process performed thereby have been described above.

[4.5. Conclusion]

The information processing device 400 according to the fourth embodiment of the present disclosure and image signal processing performed thereby have been described above. According to the present embodiment, even when a quasi-wide angle video to be viewed is displayed by being projected on a plurality of planes using a projector and viewed, a phenomenon in which contrast of an original signal part is lowered due to interreflection can be suppressed and viewing quality can be improved.

<5. Final Conclusion>

According to the embodiments described above, when a so-called wide-field video such as a video captured at a wide angle of view (e.g., a video captured at a wide angle, a panoramic video, a whole-sky video, an entire-celestial-sphere video, a free view point video, game content, and the like), or a video whose angle of view is widened to be a quasi-wide angle (an externally inserted image and a mosaic image) is viewed on a wide screen at a wide viewing angle, video motion sickness induced by a motion included in a video signal or a motion of a user interaction and a decrease in contrast caused by interreflection when a video is projected on a plurality of planes by a projector are suppressed, and thus viewers can enjoy viewing a high quality video.

<6. Hardware Configuration>

Figure 54:
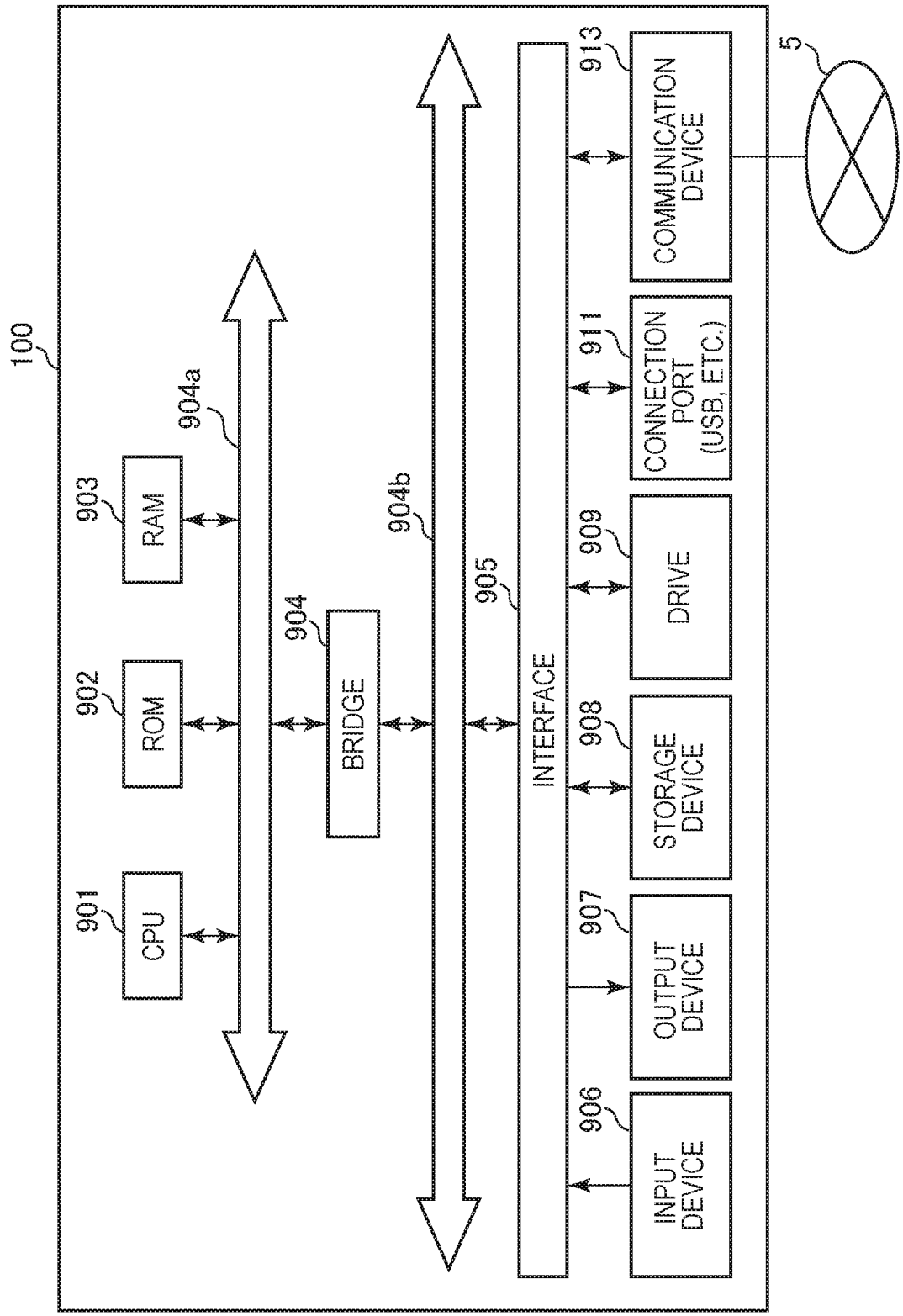
FIG. 54 is a hardware configuration diagram showing a hardware configuration of the information processing device according to the embodiment.
Figure 55:
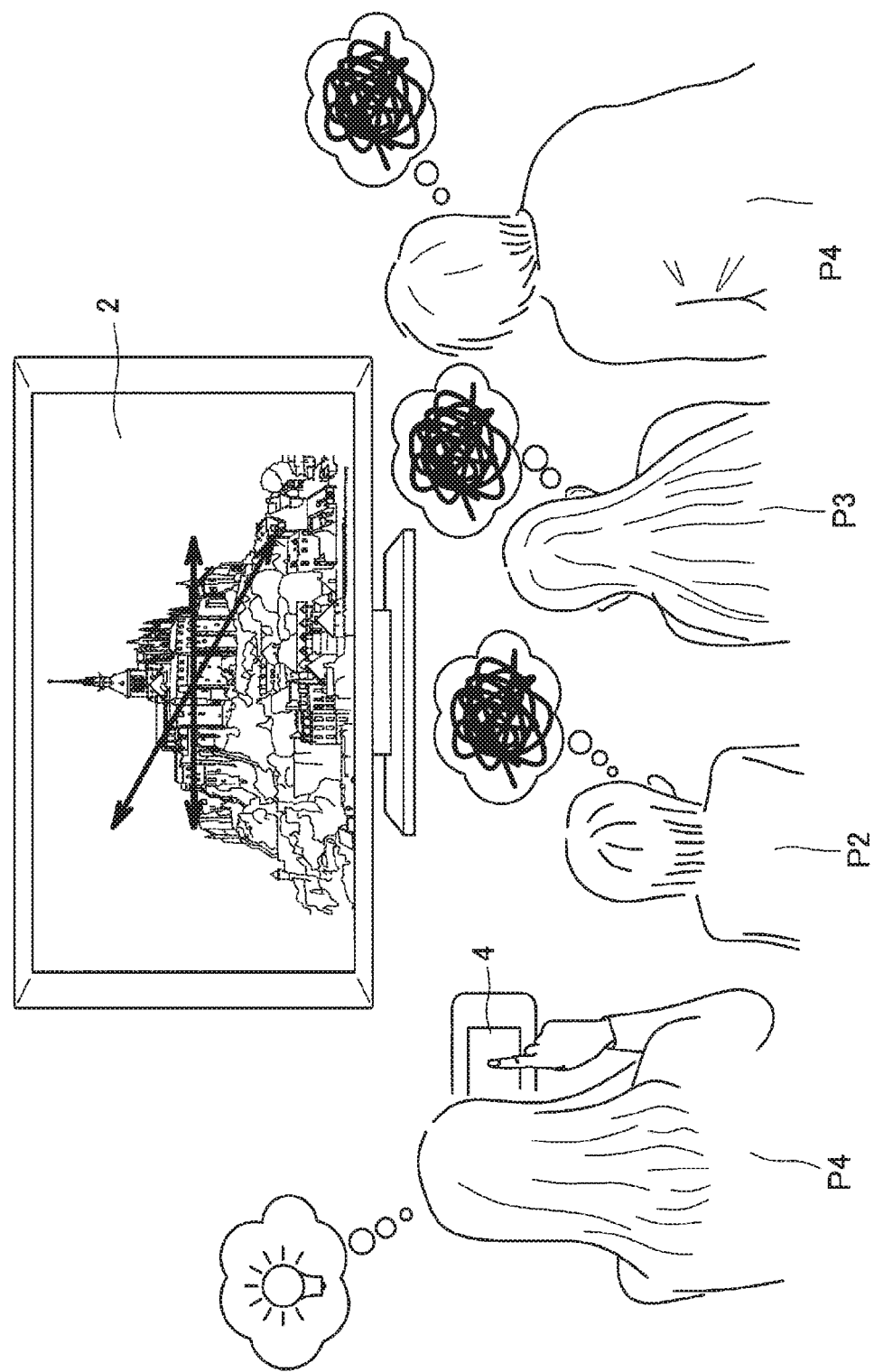
FIG. 55 is an illustrative diagram showing a situation in which one viewer is operating a controller to manipulate a video displayed on a large screen when a plurality of viewers are viewing the video.
Figure 56:
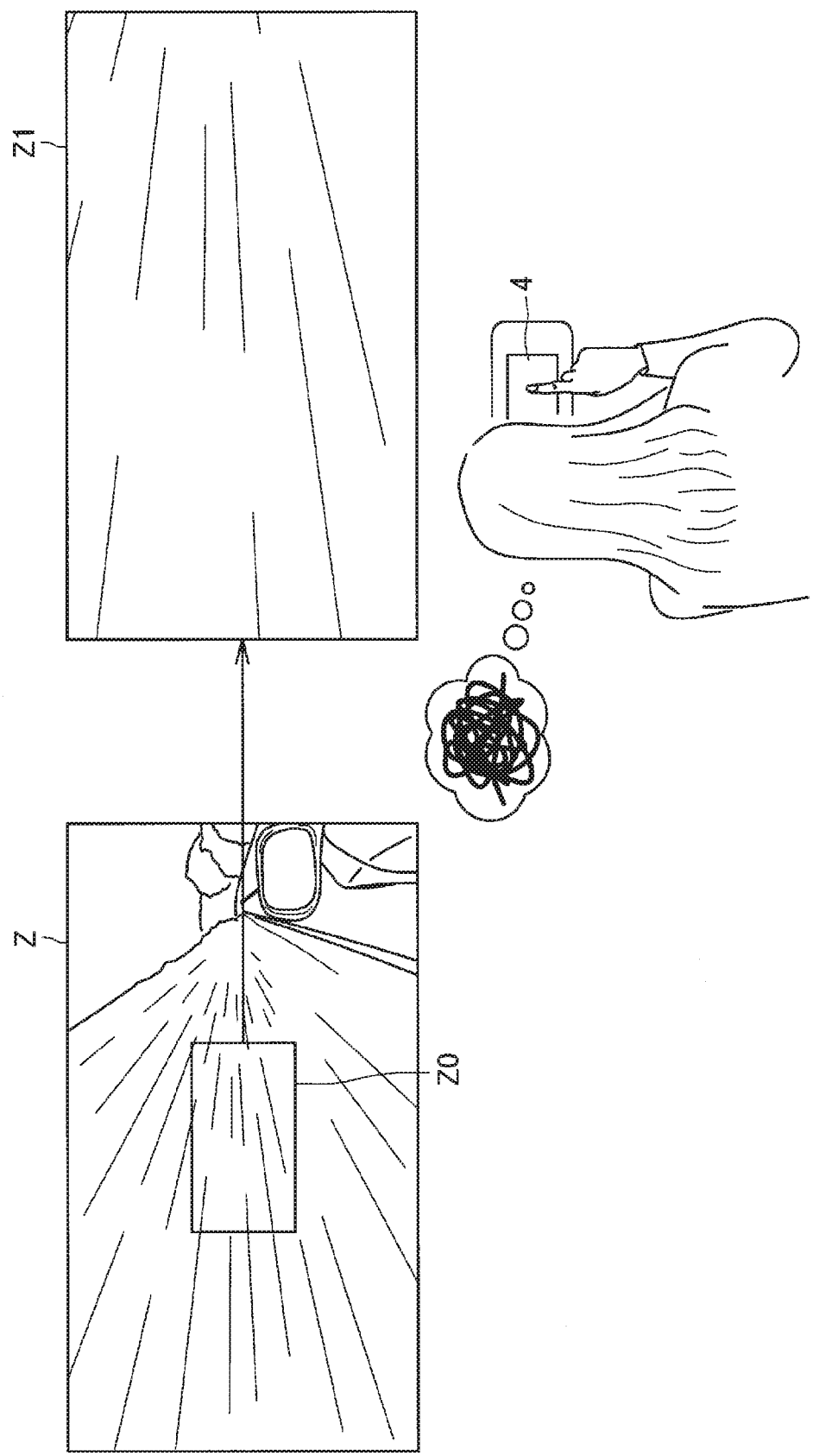
FIG. 56 is an illustrative diagram showing a situation in which a region in which a motion that is likely to cause video motion sickness is included is erroneously enlarged and displayed.
Figure 57:
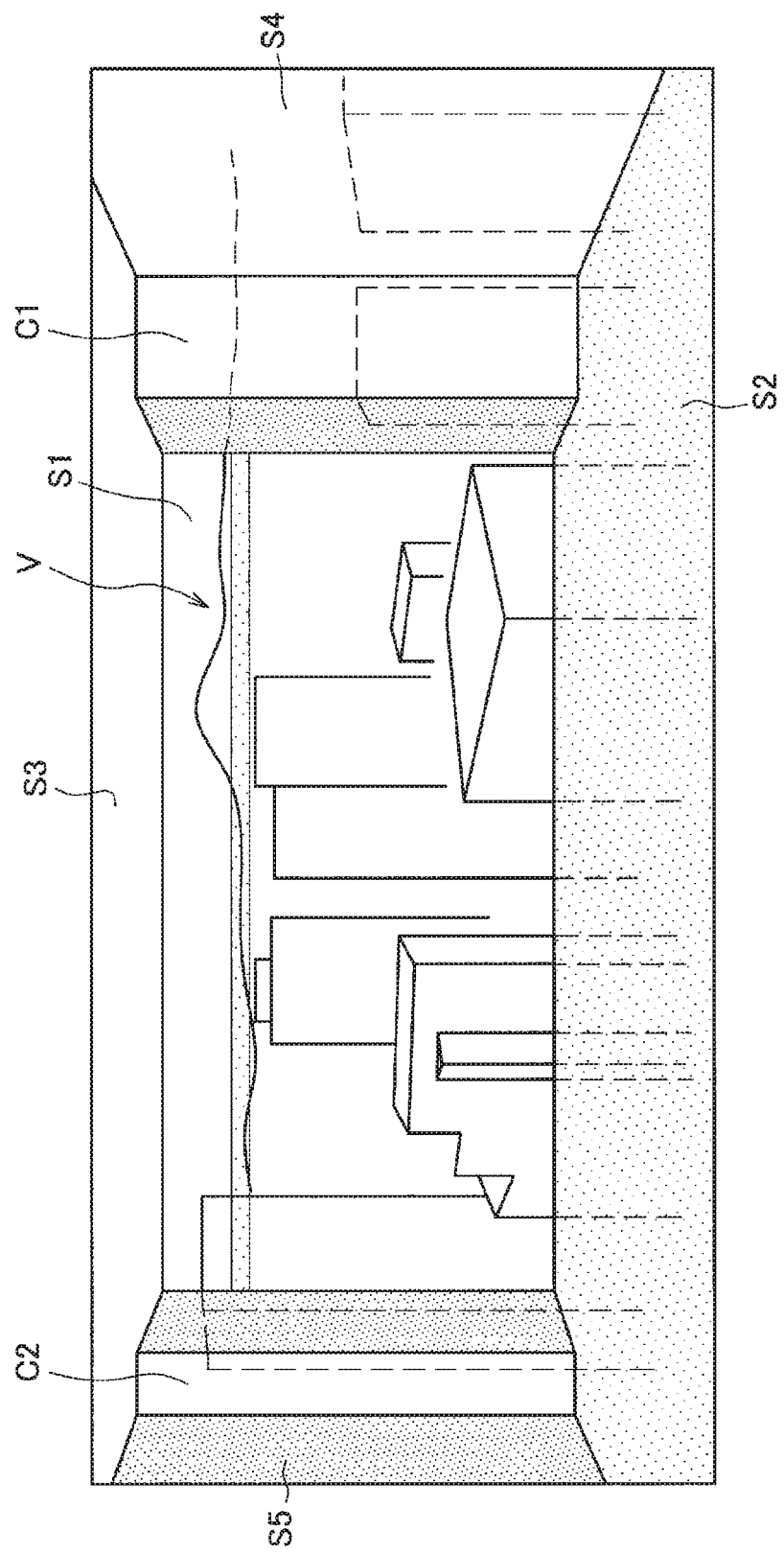
FIG. 57 is an illustrative diagram showing a state in which a wide-field video is projected by a projector using walls of an indoor space as screens.

Lastly, a hardware configuration example of the information processing device according to the present embodiment is described. FIG. 54 is a hardware configuration diagram showing a hardware configuration of the information processing device according to the present embodiment.

As described above, the information processing device according to the present embodiment can be implemented by a processing apparatus such as a computer, as described above. As illustrated in FIG. 54, the information processing device includes a central processing unit (CPU) 901, a read only memory (ROM) 902, a random access memory (RAM) 903, and a host bus 904a. The information processing device also includes a bridge 904, an external bus 904b, an interface 905, an input device 906, an output device 907, a storage device (hard disk drive) 908, a drive 909, a connection port 911, and a communication device 913.

The CPU 901 functions as an arithmetic processing unit and a controller and controls the overall operation in the information processing device in accordance with various programs. Furthermore, the CPU 901 may be a microprocessor. The ROM 902 stores, for example, programs or operation parameters used by the CPU 901. The RAM 903 temporarily stores programs used in the execution by the CPU 901 and stores the parameters and the like that appropriately changes during the execution. These components are interconnected via the host bus 904a composed of a CPU bus.

The host bus 904a is connected to the external bus 904b, such as a peripheral component interconnect/interface (PCI) bus, through the bridge 904. Moreover, the host bus 904a, the bridge 904, and the external bus 904b are not necessarily configured as different components, and the functions of them may be implemented in a single bus.

The input device 906 is configured to include input means through which the user can input information and an input control circuit that generates an input signal on the basis of the input by the user and outputs it to the CPU 901. Examples of the input means include a mouse, a keyboard, a touch panel, a button, a microphone, a switch, and a lever. The output device 907 includes, for example, a display device such as a liquid crystal display (LCD) device, an organic light emitting diode (OLED) device, or a lamp, and a speech output device such as a loudspeaker.

The storage device 908 is an example of the storage unit of the information processing device and is a device for storing data. The storage device 908 may include a recording medium, a recording device that records data in the recording medium, a readout device that reads out data from the recording medium, and a deletion device that deletes data recoded in the recording medium. The storage device 908 drives a hard disk and stores programs that the CPU 901 executes and various kinds of data.

The drive 909 is a reader-writer for a recording medium, and is built-in the information processing device or is externally attached. The drive 909 reads out information recorded in a magnetic disk, an optical disk, or a magneto-optical disc that is mounted thereto or a removable storage medium such as a semiconductor memory, and outputs the information to the RAM 903.

The connection port 911 is an interface connected to an external device and is a port for connecting an external device that is capable of transmitting data through, for example, a universal serial bus (USB). Furthermore, the communication device 913 is, for example, a communication interface composed of a communication device or the like for connecting to a communication network 5. Furthermore, the communication device 913 may be a communication device compatible with a wireless local area network (LAN), a communication device compatible with a wireless USB, or a wired communication device that communicates with wire.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a quality analyzer configured to generate video viewing quality information indicating a favorability degree of a video viewing condition of a viewer;

a gaze target region information generation unit configured to generate gaze target region information indicating a gaze target region to be gazed at by the viewer in a video to be viewed; and a quality improvement processing unit configured to improve viewing quality of the gaze target region on the basis of the video viewing quality information.

(2)

The information processing device according to (1), in which the video viewing quality information is information indicating a level of ease with which a video signal induces video motion sickness.

(3)

The information processing device according to (2), in which the quality analyzer determines a scene that induces video motion sickness from the video signal on the basis of information on motion distribution of the video within a visual field of the viewer for the video and generates the video viewing quality information.

(4)

The information processing device according to (1), in which the video viewing quality information is information indicating a decrease in image quality caused by interreflection on a projected display screen.

(5)

The information processing device according to (4), in which the quality analyzer analyzes image qualities of captured images signals of the gaze target region with respect to a case in which only the gaze target region is displayed and a case in which a whole screen is displayed, and generates the video viewing quality information.

(6)

The information processing device according to (1), in which the quality analyzer generates viewing environment determination information obtained by determining whether an environment is a video viewing environment in which the video induces video motion sickness.

(7)
The information processing device according to (6), in which the quality analyzer generates the viewing environment determination information on the basis of a viewing angle decided in accordance with a size of a display on which the video is displayed and a visual range from the viewer to the display.

(8)
The information processing device according to (6), in which the quality analyzer generates the viewing environment determination information on the basis of a relation between display of a display on which the video is displayed and brightness of an indoor place at which the video is viewed.

(9)
The information processing device according to any one of (1) to (8), in which the gaze target region information generation unit generates the gaze target region information on the basis of a control signal of an interactive operation of the viewer.

(10)
The information processing device according to any one of (1) to (8),
in which the gaze target region is a region in which a video based on an original signal of an input video is displayed, and
a non-gaze target region is a region in which a video based on a signal predicted to be externally inserted on the basis of the original signal of the input video is displayed.

(11)
The information processing device according to any one of (1) to (8), in which the gaze target region information generation unit generates the gaze target region information on the basis of a saliency degree map generated from an input video.

(12)
The information processing device according to any one of (1) to (8), in which the gaze target region information generation unit generates the gaze target region information on the basis of a depth map generated from an input video.

(13) The information processing device according to any one of (1) to (8), in which the gaze target region information generation unit generates the gaze target region information on the basis of metadata added to an input video.

(14)
The information processing device according to any one of (1) to (8), in which the gaze target region information generation unit generates the gaze target region information on the basis of a line-of-sight analysis result of the viewer.

(15)
The information processing device according to any one of (1) to (8), in which the gaze target region information is represented on a map having consecutive values.

(16)
The information processing device according to any one of (1) to (15), in which the quality improvement processing unit performs a process of relatively emphasizing saliency of the gaze target region in the video on the basis of the video viewing quality information.

(17)
The information processing device according to (16), in which the quality improvement processing unit superimposes a reference pattern on the gaze target region to relatively emphasize the saliency of the gaze target region in the video.

(18)
The information processing device according to (16), in which the quality improvement processing unit relatively emphasizes the saliency of the gaze target region in the video by performing at least one of a contrast emphasizing process, a resolution emphasizing process, a saturation emphasizing process, and a brightness emphasizing process on the gaze target region.

(19)
The information processing device according to (16), in which the quality improvement processing unit relatively emphasizes the saliency of the gaze target region in the video by performing at least one of a contrast suppressing process, a smoothing process, a saturation suppressing process, and a brightness suppressing process on a non-gaze target region other than the gaze target region.

(20)
The information processing device according to any one of (1) to (19), in which, in a case where video viewing quality of the gaze target region is lower than a reference value, the quality improvement processing unit gives an alarm to the viewer.

(21)
The information processing device according to any one of (1) to (19), in which, in a case where video viewing quality of the gaze target region is lower than a reference value, the quality improvement processing unit displays a mask image for masking the gaze target region.

(22)
An information processing method including:
generating video viewing quality information indicating a favorability degree of a video viewing condition of a viewer;
generating gaze target region information indicating a gaze target region to be gazed at by the viewer in a video to be viewed; and
improving viewing quality of the gaze target region on the basis of the video viewing quality information.

(23)
A program causing a computer to function as an information processing device including
a quality analyzer configured to generate video viewing quality information indicating a favorability degree of a video viewing condition of a viewer,
a gaze target region information generation unit configured to generate gaze target region information indicating a gaze target region to be gazed at by the viewer in a video to be viewed, and
a quality improvement processing unit configured to improve viewing quality of the gaze target region on the basis of the video viewing quality information.

(24)
A computer readable recording medium having a program recorded thereon, the program causing a computer to function as an information processing device which including
a quality analyzer configured to generate video viewing quality information indicating a favorability degree of a video viewing condition of a viewer,
a gaze target region information generation unit configured to generate gaze target region information indicating a gaze target region to be gazed at by the viewer in a video to be viewed, and
a quality improvement processing unit configured to improve viewing quality of the gaze target region on the basis of the video viewing quality information.

REFERENCE SIGNS LIST

100 to 400 information processing device
110 gaze target region information generation unit 111 saliency map generation unit
113 signal identification map generation unit
115 gaze target map generation unit
120 quality analyzer
121 inducing environment information generation unit
123 component analyzer
125 inducting degree generation unit
130 quality improvement processing unit
131 gaze target region relative saliency image processing unit
133 gaze-inducing pattern map generation unit
135 gaze target region relative saliency synthesizing unit
210 gaze target region information generation unit
211 external signal decoder
213 cropped video generation unit
215 saliency map generation unit
217 gaze target map generation unit
220 quality analyzer
221 inducing environment information generation unit
223 inducing interactive operation component analyzer
225 inducing degree generation unit
230 quality improvement processing unit
310 gaze target region information generation unit
311 external signal decoder
313 cropped video generation unit
315 gaze target map generation unit
320 quality analyzer
321 inducing environment information generation unit
322 component analyzer
323 external signal decoder
324 inducing degree generation unit
325 inducing degree generation unit
330 quality improvement processing unit
331 gaze target region relative saliency image processing unit
333 gaze target region relative saliency synthesizing unit
410 gaze target region information generation unit
411 signal identification map generation unit
420 quality analyzer
421 interreflection-inducing environment information generation unit
423 externally inserted region average brightness calculating unit
425 interreflection-inducing degree generation unit
430 quality improvement processing unit
431 gaze target region relative saliency image processing unit
433 gaze target region relative saliency synthesizing unit

The invention claimed is:

1. An information processing device, comprising:
circuitry configured to:
generate video viewing quality information that indicates a favorability degree of a video viewing condition of a viewer;
generate gaze target region information that indicates a gaze target region to be gazed at by the viewer in a video to be viewed; and
generate a viewing quality-improved video signal in which saliency of the gaze target region is emphasized in the video, wherein the viewing quality-improved video signal is generated based on the video viewing quality information, wherein
the saliency of the gaze target region is emphasized by superimposition of a reference pattern on the gaze target region, and
the emphasis of the saliency of the gaze target region is increased based on a decrease in image quality of the video.

2. The information processing device according to claim 1, wherein the video viewing quality information indicates a level of ease with which a video signal induces video motion sickness.

3. The information processing device according to claim 2, wherein the circuitry is further configured to:
determine a scene that induces the video motion sickness from the video signal based on information on motion distribution of the video within a visual field of the viewer for the video; and
generate the video viewing quality information based on the determination.

4. The information processing device according to claim 1, wherein the circuitry further configured to:
capture image signals of the gaze target region;
analyze image qualities of the image signals of the gaze target region with respect to a case in which the gaze target region is displayed and a case in which a whole screen is displayed; and
generate the video viewing quality information based on the analysis.

5. The information processing device according to claim 1, wherein the circuitry is further configured to generate viewing environment determination information based on a determination whether an environment is a video viewing environment in which the video induces video motion sickness.

6. The information processing device according to claim 5, wherein
the circuitry is further configured to generate the viewing environment determination information based on a viewing angle, and
the viewing angle is determined based on a size of a display screen on which the video is displayed and a visual range from the viewer to the display screen.

7. The information processing device according to claim 5, wherein the circuitry is further configured to generate the viewing environment determination information based on a relation between display of a display screen on which the video is displayed and brightness of an indoor place at which the video is viewed.

8. The information processing device according to claim 1, wherein the circuitry is further configured to generate the gaze target region information based on a control signal of an interactive operation of the viewer.

9. The information processing device according to claim 1, wherein
the gaze target region is a first region in which a first video based on an original signal of an input video is displayed,
a non-gaze target region is a second region in which a second video based on a signal is displayed, and
the signal is predicted to be externally inserted based on the original signal of the input video.

10. The information processing device according to claim 1, wherein the circuitry is further configured to generate the gaze target region information based on a saliency degree map generated from an input video.

11. The information processing device according to claim 1, wherein the circuitry is further configured to generate the gaze target region information based on a depth map generated from an input video.

12. The information processing device according to claim 1, wherein the circuitry is further configured to emphasize the saliency of the gaze target region in the video based on at least one of a contrast emphasizing process, a resolution emphasizing process, a saturation emphasizing process, or a brightness emphasizing process on the gaze target region.

13. The information processing device according to claim 1, wherein the circuitry is further configured to emphasize the saliency of the gaze target region in the video based on at least one of a contrast suppressing process, a smoothing process, a saturation suppressing process, or a brightness suppressing process on a non-gaze target region other than the gaze target region.

14. The information processing device according to claim 1, wherein, in a case where video viewing quality of the gaze target region is lower than a reference value, the circuitry is further configured to output an alarm to the viewer.

15. The information processing device according to claim 1, wherein, in a case where video viewing quality of the gaze target region is lower than a reference value, the circuitry is further configured to display a mask image that masks the gaze target region.

16. The information processing device according to claim 1, wherein the circuitry is further configured to:
generate an image quality emphasizing signal based on the gaze target region information;
increase a signal value of the gaze target region information based on an increase in a blend ratio of the image quality emphasizing signal; and
generate the viewing quality-improved video signal further based on the increased signal value of the gaze target region.

17. An information processing method, comprising:
in an information processing device:
generating video viewing quality information indicating a favorability degree of a video viewing condition of a viewer;
generating gaze target region information indicating a gaze target region to be gazed at by the viewer in a video to be viewed; and
generating a viewing quality-improved video signal in which saliency of the gaze target region is emphasized in the video, wherein the viewing quality-improved video signal is generated based on the video viewing quality information, wherein
the saliency of the gaze target region is emphasized by superimposition of a reference pattern on the gaze target region, and
the emphasis of the saliency of the gaze target region is increased based on a decrease in image quality of the video.

18. A non-transitory computer readable medium having stored thereon, computer-executable instructions, which when executed by a computer, cause the computer to execute operations, the operations comprising:
generating video viewing quality information indicating a favorability degree of a video viewing condition of a viewer;
generating gaze target region information indicating a gaze target region to be gazed at by the viewer in a video to be viewed; and
generating a viewing quality-improved video signal in which saliency of the gaze target region is emphasized in the video, wherein the viewing quality-improved video signal is generated based on the video viewing quality information, wherein
the saliency of the gaze target region is emphasized by superimposition of a reference pattern on the gaze target region, and
the emphasis of the saliency of the gaze target region is increased based on a decrease in image quality of the video.

19. An information processing device, comprising: circuitry configured to:
generate video viewing quality information that indicates a favorability degree of a video viewing condition of a viewer;
generate gaze target region information that indicates a gaze target region to be gazed at by the viewer in a video to be viewed on a projected display screen; and
improve viewing quality of the gaze target region based on emphasizing saliency of the gaze target region in the video, wherein a viewing quality-improved video signal is generated based on the video viewing quality information,
wherein the video viewing quality information further indicates a decrease in image quality caused by inter-reflection on the projected display screen, and the emphasis of the saliency of the gaze target region is increased based on the decrease in the image quality of the video.

20. An information processing device, comprising: circuitry configured to:
generate video viewing quality information that indicates a favorability degree of a video viewing condition of a viewer;
generate gaze target region information that indicates a gaze target region to be gazed at by the viewer in a video to be viewed; and
emphasize saliency of the gaze target region in the video based on superimposing the saliency of the gaze target region in the video, wherein a viewing quality-improved video signal is generated based on the video viewing quality information,
wherein the saliency of the gaze target region is emphasized based on at least one of a contrast suppressing process, a smoothing process, a saturation suppressing process, or a brightness suppressing process on a non-gaze target region other than the gaze target region, and the emphasis of the saliency of the gaze target region is increased based on a decrease in image quality of the video.

* * * * *